(12) United States Patent
Nozu et al.

(10) Patent No.: US 8,596,162 B2
(45) Date of Patent: Dec. 3, 2013

(54) PEDAL-OPERATED DEVICE

(75) Inventors: Kazuo Nozu, Numazu (JP); Norihiro Nishiumi, Mishima (JP); Hiroyuki Hanamura, Gotenba (JP); Toshio Tanahashi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 688 days.

(21) Appl. No.: 12/602,633

(22) PCT Filed: Jun. 12, 2008

(86) PCT No.: PCT/JP2008/061179
§ 371 (c)(1),
(2), (4) Date: Dec. 1, 2009

(87) PCT Pub. No.: WO2008/153204
PCT Pub. Date: Dec. 18, 2008

(65) Prior Publication Data
US 2010/0175497 A1    Jul. 15, 2010

(30) Foreign Application Priority Data

Jun. 12, 2007 (JP) ................................. 2007-154705
Aug. 31, 2007 (JP) ................................. 2007-226415

(51) Int. Cl.
*B60K 20/02* (2006.01)
*G05G 1/30* (2008.04)

(52) U.S. Cl.
USPC ............................................ 74/512; 74/513

(58) Field of Classification Search
USPC ........................................ 74/512–514, 560

IPC ............................. G05G 5/03, 1/44; B60K 26/02
See application file for complete search history.

(56) References Cited

U.S. PATENT DOCUMENTS

| 6,070,490 | A | 6/2000 | Aschoff et al. |
| 6,109,133 | A * | 8/2000 | Kohlen ........................ 74/512 |
| 6,142,036 | A | 11/2000 | Mizuma et al. |
| 6,250,176 | B1 | 6/2001 | Reimann et al. |
| 6,276,229 | B1 * | 8/2001 | Gohring et al. ............. 74/513 |

(Continued)

FOREIGN PATENT DOCUMENTS

| DE | 100 21 532 A1 | 11/2001 |
| EP | 0 924 591 A2 | 6/1999 |

(Continued)

OTHER PUBLICATIONS

Extended Search Report issued May 27, 2011 in Europe Application No. 08765739.1.

*Primary Examiner* — Thomas Diaz
(74) *Attorney, Agent, or Firm* — Oblon, Spivak, McClelland, Maier & Neustadt, L.L.P.

(57) ABSTRACT

An object of the present invention is to improve the easiness of steadily maintaining the magnitude of treading on a foot-operated operating element while mitigating a feeling of treading on a wall at the time of start of treading on the operating element. A pedal-operated operation device includes a pedal arm, a support housing, a spring for urging the pedal arm in a direction of return, a first shim and a second shim. A frictional engagement portion of the second shim is higher in maximum static friction force than a frictional engagement portion of the first shim. The second shim has a region in which the elastic modulus of the second elastic deformation portion is lower than that of the first shim, in terms of elastic deformation at the time when the pedal arm moves relative to the support housing.

6 Claims, 31 Drawing Sheets

(56) References Cited

U.S. PATENT DOCUMENTS

| | | |
|---|---|---|
| 6,745,642 B2 * | 6/2004 | Kumamoto et al. ............ 74/512 |
| 2004/0045393 A1 | 3/2004 | DeForest |

FOREIGN PATENT DOCUMENTS

| | | |
|---|---|---|
| EP | 0 924 591 A3 | 6/1999 |
| EP | 0 928 727 A2 | 7/1999 |
| EP | 0 928 727 A3 | 7/1999 |
| JP | 10 510499 | 10/1998 |
| JP | 2002 36904 | 2/2002 |
| JP | 2002 114052 | 4/2002 |
| JP | 2005 14896 | 1/2005 |
| WO | WO 02/08009 A1 | 1/2002 |

* cited by examiner

PEDAL-OPERATED DEVICE

TECHNICAL FIELD

The present invention relates to an operation device and, more particularly, to a pedal-operated operation device.

BACKGROUND ART

A well-known drive-by-wire-type accelerator pedal device, which is a pedal-operated operation device, for use in a vehicle, such as an automobile, has a pedal, which serves as an operating element to be foot-operated; a housing, which serves as support means for supporting the pedal in a pivotally movable manner; a return-urging spring for urging the pedal relative to the housing in a direction opposite the direction in which the magnitude of operation of the pedal is increased; a sensor for detecting the amount of pivotal displacement of the pedal relative to the housing; and a slide portion for imposing a hysteresis load on a pivotal movement of the pedal by means of a friction force. Such an accelerator pedal device is described in, for example, Japanese Patent Application Laid-Open (kokai) No. 2005-14896.

According to an accelerator pedal device of this kind, the slide portion generates a friction force, and a hysteresis load induced by the friction force reliably imparts hysteresis to the relation between a tread force imposed on the pedal and the amount of pivotal displacement of the pedal. Thus, as compared with an accelerator pedal device whose hysteresis is low, a driver can more readily control a vehicular drive force through his/her treading on an accelerator pedal.

In an accelerator pedal device of the above-mentioned type, when a hysteresis load is set high so that a driver can readily maintain the magnitude of treading on an accelerator pedal at a constant value, a tread force required for starting a pivotal movement of the accelerator pedal becomes excessively high; thus, the driver feels a so-called feeling of treading on a wall when he/she starts treading on the accelerator pedal. Also, since the accelerator pedal does not return unless the tread force is reduced greatly, when the driver eases off the accelerator pedal, he/she feels a feeling of defective return of the accelerator pedal.

By contrast, when the hysteresis load is set low, there can be mitigated a feeling of treading on a wall at the time of start of treading on the accelerator pedal and a feeling of defective return of the accelerator pedal at the time of easing off the accelerator pedal. However, in this case, for example, even when the tread force varies slightly in association with vibration or the like of a vehicle, the stroke of treading on the accelerator pedal varies; thus, the driver encounters difficulty in maintaining the magnitude of treading on the accelerator pedal at a constant value.

DISCLOSURE OF THE INVENTION

A primary object of the present invention is to provide a pedal-operated operation device which can improve the easiness of steadily maintaining the magnitude of treading on a foot-operated operating element, such as an accelerator pedal, while mitigating a feeling of treading on a wall at the time of start of treading on the operating element and a feeling of defective return of the operating element at the time of easing off the operating element, by means of generation of hysteresis by a friction force and a reaction force of elastic deformation associated with relative displacement of the operating element relative to support means.

The present invention provides a pedal-operated operation device comprising an operating element to be foot-operated, support means for supporting the operating element in such a manner that the operating element can undergo relative displacement relative to the support means, a first friction surface pair and a second friction surface pair each of which includes paired friction surfaces for generating a resistance force against the relative displacement of the operating element by means of a friction force generated between the paired friction surfaces and which differ from each other in coefficient of static friction, and a displacement member which allows the first or second friction surface pair higher in coefficient of static friction to move together with the operating element in association with the relative displacement thereof. The present invention also provides a pedal-operated operation device comprising an operating element to be foot-operated, support means for supporting the operating element in such a manner that the operating element can undergo relative displacement relative to the support means, a first friction surface pair and a second friction surface pair each of which includes paired friction surfaces for generating a resistance force against the relative displacement of the operating element by means of a friction force generated between the paired friction surfaces and which differ from each other in coefficient of static friction, and an elastic body which allows the first or second friction surface pair higher in coefficient of static friction to move together with the operating element in association with the relative displacement thereof.

According to these configurations, when an operation force imposed on the operating element increases to such an extent that a force to cause relative displacement between the friction surfaces of the first or second friction surface pair lower in coefficient of static friction exceeds the maximum static friction force between the friction surfaces, the first or second friction surface pair higher in coefficient of static friction moves in association with the relative displacement of the operating element. Then, when the operation force imposed on the operating element further increases to such an extent that a force to cause relative displacement between the friction surfaces of the first or second friction surface pair higher in coefficient of static friction exceeds the maximum static friction force between the friction surfaces, the friction surfaces of the first or second friction surface pair higher in coefficient of static friction undergo relative displacement. Thus, in a process of either increase or decrease in the operation force imposed on the operating element, the relation between the operation force and the relative displacement of the operating element can exhibit a two-bend characteristic.

Thus, as compared with a conventional pedal-operated operation device having only a region in which a resistance force is generated through a static friction force and a region in which a resistance force is generated through a dynamic friction force, the pedal-operated operation device of the present invention can improve the easiness of steadily maintaining the magnitude of treading on the operating element while mitigating a feeling of treading on a wall at the time of start of treading on the operating element and an odd feeling at the time of easing off the operating element.

The above-mentioned configuration may be such that: the elastic body defines one of the friction surfaces of the first or second friction surface pair higher in coefficient of static friction.

According to this configuration, one of the friction surfaces of the first or second friction surface pair higher in coefficient of static friction is the surface of the elastic body. Thus, as compared with the case where the elastic body does not define one of the friction surfaces of the first or second friction surface pair higher in coefficient of static friction, the structure of the pedal-operated operation device can be simplified.

The present invention also provides a vehicular operation device in which a ratio of relative displacement of an operating element to an operation input to the operating element varies to at least three values, and, in a process of increase in the operation input subsequent to start of increasing, the ratio is set to a high value at a time when the operation input is of large magnitude as compared with a time when the operation input is of small magnitude.

According to this configuration, the relation between the operation input to the operating element and the relative displacement of the operating element in a process of increase in the operation input subsequent to start of increasing can exhibit such a two-bend characteristic that, in a process in which the operation input increases, the ratio of the relative displacement of the operating element to the operation input is higher at a time when the operation input is of large magnitude as compared with a time when the operation input is of small magnitude.

The present invention also provides a vehicular operation device in which a ratio of relative displacement of an operating element to an operation input to the operating element varies to at least three values, and, in a process of decrease in the operation input subsequent to start of decreasing, the ratio is set to a low value at a time when the operation input is of large magnitude as compared with a time when the operation input is of small magnitude.

According to this configuration, the relation between the operation input to the operating element and the relative displacement of the operating element in a process of decrease in the operation input subsequent to start of decreasing can exhibit such a two-bend characteristic that, in a process in which the operation input decreases, the ratio of the relative displacement of the operating element to the operation input is lower at a time when the operation input is of large magnitude as compared with a time when the operation input is of small magnitude.

The present invention also provides a pedal-operated operation device comprising an operating element to be foot-operated, support means for supporting the operating element in such a manner that the operating element can undergo relative displacement relative to the support means, return-urging means for urging the operating element a direction opposite the direction in which the magnitude of operation of the operating element is increased, first resistance force generation means for generating, at a time of relative displacement of the operating element, a first resistance force against the relative displacement by means of a friction force of a first slide friction portion and a spring force of a first elastic deformation portion, and second resistance force generation means for generating, at a time of relative displacement of the operating element, a second resistance force against the relative displacement by means of a friction force of a second slide friction portion and a spring force of a second elastic deformation portion, wherein a maximum static friction force of the second slide friction portion is greater than that of the first slide friction portion, and the second elastic deformation portion has a region in which the elastic modulus of the second elastic deformation portion is lower than that of the first elastic deformation portion.

According to this configuration, the maximum static friction force of the second slide friction portion is greater than that of the first slide friction portion, and the second elastic deformation portion has a region in which the elastic modulus of the second elastic deformation portion is lower than that of the first elastic deformation portion. Thus, the amount of elastic deformation of the second elastic deformation portion is greater than that of the first elastic deformation portion.

Thus, when the urging force of the return-urging mean is excluded from consideration, there can be formed a first region in which a resistance force is generated through static friction forces of the first and second slide friction portions, a second region in which a resistance force is generated through a dynamic friction force of the first slide friction portion and a reaction force of elastic deformation of the second elastic deformation portion, and a third region in which a resistance force is generated through dynamic friction forces of the first and second slide friction portions.

Thus, in the second region, the increase rate of relative displacement of the operating element relative to the support means in association with increase in the operation force imposed on the operating element can be rendered higher than in the first region; and in the third region, the increase rate of relative displacement of the operating element relative to the support means in association with increase in the operation force imposed on the operating element can be rendered higher than in the second region. Accordingly, as compared with a conventional pedal-operated operation device having only a region in which a resistance force is generated through a static friction force and a region in which a resistance force is generated through a dynamic friction force, the pedal-operated operation device of the present invention can improve the easiness of steadily maintaining the magnitude of treading on the operating element while mitigating a feeling of treading on a wall at the time of start of treading on the operating element and an odd feeling at the time of easing off the operating element.

The above-mentioned configuration may be such that: even when an operation force imposed on the operating element varies within a range of not greater than an operation force corresponding to the maximum static friction force of the first slide friction portion, the operating element does not undergo relative displacement to such an extent as to be sensible by an operator.

According to this configuration, even when an operation force imposed on the operating element varies within a range of not greater than an operation force corresponding to the maximum static friction force of the first slide friction portion, the operating element does not undergo relative displacement relative to the support means to such an extent as to be sensible by an operator. Thus, when an operation force imposed on the operating element falls within a range of not greater than an operation force corresponding to the maximum static friction force of the first slide friction portion, there can be reliably restrained a relative displacement of the operating element relative to the support means in association with fluctuations in the operation force imposed on the operating element. Therefore, the easiness of steadily maintaining the magnitude of treading on the operating element can be reliably improved. Also, a sufficiently large hysteresis width can be reliably imparted to hysteresis associated with increase and decrease in the operation force.

The above-mentioned configuration may be such that: the characteristic of the relation between an operation force imposed on the operating element and a relative displacement of the operating element is a two-bend characteristic having a first bend point, and a second bend point at which an operation force imposed on the operating element is greater than that at the first bend point, and the operation force at the first bend point is one-half or more of that at the second bend point.

According to this configuration, the characteristic of the relation between an operation force imposed on the operating element and a relative displacement of the operating element relative to the support means is a two-bend characteristic, and the operation force at the first bend point is one-half or more of that at the second bend point. Thus, the range of operation force in the first region can be rendered equal to or greater than that in the second region. Accordingly, as compared with the case where the operation force at the first bend point is less than one-half of that at the second bend point, the easiness of steadily maintaining the magnitude of treading on the operating element can be improved.

The above-mentioned configuration may be such that: operation-magnitude detection means for detecting the magnitude of operation of the operating element by an operator is provided; the operation-magnitude detection means detects a relative displacement of the operating element equal to or greater than a preset reference value; and the reference value is set to a relative displacement at the second bend point or greater.

According to this configuration, a region in which the operation-magnitude detection means detects a relative displacement can be limited to the third region, in which the operation force imposed on the operating element and the relative displacement of the operating element relative to the support means reliably assume a linear relation. Thus, the magnitude of operation of the operating element can be accurately detected.

The above-mentioned configuration may be such that: a ratio of an amount of change in the relative displacement to an amount of change in the operation force in a region in which the operation force imposed on the operating element is greater than the operation force at the second bend point is higher than a ratio of an amount of change in the relative displacement to an amount of change in the operation force in a region in which the operation force imposed on the operating element is greater than the operation force at the first bend point and equal to or less than the operation force at the second bend point.

According to this configuration, the ratio of the amount of change in the relative displacement of the operating element to the amount of change in the operation force in the third region is higher than that in the second region. Accordingly, in a process of increase in the operation force imposed on the operating element subsequent to start of treading on the operating element, there can be reliably prevented a sudden, abrupt increase in relative displacement of the operating element relative to the support means and an associated sudden, abrupt increase in a control variable to be controlled by the operation of treading on the operating element.

The above-mentioned configuration may be such that: as the operation force imposed on the operating element increases, at least a pressing force between members in sliding contact with each other of the second slide friction portion increases.

According to this configuration, as the operation force imposed on the operating element increases, at least a pressing force between the members in sliding contact with each other of the second slide friction portion increases. Thus, as compared with a configuration in which, even when the operation force imposed on the operating element increases, a pressing force between the members in sliding contact with each other of the second slide friction portion does not increase, the configuration of the present invention can lower the ratio of the amount of change in relative displacement of the operating element to the amount of change in the operation force at the time of increase in the operation force in the third region. Accordingly, the hysteresis width between the operation force imposed on the operating element and the relative displacement of the operating element can be increased with the operation force imposed on the operating element.

The above-mentioned configuration may be such that: the pressing force increases with the operation force imposed on the operating element through action of an urging force of the return-urging means between the members in sliding contact with each other of the second slide friction portion.

According to this configuration, the pressing force increases with the operation force imposed on the operating element through action of an urging force of the return-urging means between the members in sliding contact with each other of the second slide friction portion. Accordingly, through effective utilization of the urging force of the return-urging means which increases with the operation force imposed on the operating element, the pressing force can be reliably increased with the operation force imposed on the operating element.

The above-mentioned configuration may be such that: the first resistance force generation means is supported by one of the operating element and the support means and is in sliding contact with the other one of the operating element and the support means, thereby forming the first slide friction portion, and the second resistance force generation means is supported by one of the operating element and the support means and is in sliding contact with the other one of the operating element and the support means, thereby forming the second slide friction portion.

According to this configuration, the first resistance force generation means is supported by one of the operating element and the support means and is in sliding contact with the other one of the operating element and the support means, thereby forming the first slide friction portion, and the second resistance force generation means is supported by one of the operating element and the support means and is in sliding contact with the other one of the operating element and the support means, thereby forming the second slide friction portion. Thus, the elastic characteristics of the first and second elastic deformation portions can be set according to required resistance forces and independently of the elastic characteristic of the return-urging means. Therefore, as compared with the configuration in which the first and second resistance force generation means are in sliding contact with the return-urging means, initial setting of the first and second resistance force generation means; i.e., setting of the first and second resistance force generation means in a state in which no operation force is imposed on the operating element, can be readily performed.

The above-mentioned configuration may be such that: the return-urging means has first and second return-urging means; the first resistance force generation means is supported by one of the operating element and the support means and is in sliding contact with the first return-urging means, thereby forming the first slide friction portion; and the second resistance force generation means is supported by one of the operating element and the support means and is in sliding contact with the second return-urging means, thereby forming the second slide friction portion.

According to this configuration, the return-urging means has the first and second return-urging means; the first resistance force generation means is supported by one of the operating element and the support means and is in sliding contact with the first return-urging means, thereby forming the first slide friction portion; and the second resistance force generation means is supported by one of the operating element and the support means and is in sliding contact with the second return-urging means, thereby forming the second slide friction portion. Thus, as compared with the aforementioned configuration having a single return-urging means, the characteristic of the relation between the operation force imposed on the operating element and the relative displacement of the operating element relative to the support means can have a higher degree of freedom in setting thereof.

The above-mentioned configuration may be such that: the first resistance force generation means is supported by one of the operating element and the support means and is in sliding contact with the return-urging means, thereby forming the first slide friction portion, and the second resistance force generation means is supported by one of the operating element and the support means and is in sliding contact with the return-urging means, thereby forming the second slide friction portion.

According to this configuration, the first resistance force generation means is supported by one of the operating element and the support means and is in sliding contact with the return-urging means, thereby forming the first slide friction portion, and the second resistance force generation means is supported by one of the operating element and the support means and is in sliding contact with the return-urging means, thereby forming the second slide friction portion. Thus, as compared with the aforementioned configuration, the number of required components can be reduced, so that the structure of the pedal-operated operation device can be simplified.

As compared with the aforementioned configuration, this configuration can reduce the degree of propagation, to the first and second resistance force generation means, of an adverse effect of a force that acts between the operating element and the support means in such a manner as to attempt to displace the operating element and the support means in a direction other than that in which the operating element can undergo relative displacement relative to the support means.

The above-mentioned configuration may be such that: when a friction force of the first slide friction portion is equal to or less than the maximum static friction force, the first resistance force generation means prevents the return-urging means from being elastically deformed in excess of the amount of elastic deformation of the first elastic deformation portion, and, when a friction force of the second slide friction portion is equal to or less than the maximum static friction force, the second resistance force generation means prevents the return-urging means from being elastically deformed in excess of the amount of elastic deformation of the second elastic deformation portion.

According to this configuration, when a friction force of the first slide friction portion is equal to or less than the maximum static friction force, the first resistance force generation means can prevent the return-urging means from being elastically deformed in excess of the amount of elastic deformation of the first elastic deformation portion, and, when a friction force of the second slide friction portion is equal to or less than the maximum static friction force, the second resistance force generation means can prevent the return-urging means from being elastically deformed in excess of the amount of elastic deformation of the second elastic deformation portion. Therefore, the above-mentioned configuration can reliably achieve a two-bend characteristic.

The above-mentioned configuration may be such that: when a friction force of the first slide friction portion is equal to or less than the maximum static friction force, the first resistance force generation means prevents the first return-urging means from being elastically deformed in excess of the amount of elastic deformation of the first elastic deformation portion, and, when a friction force of the second slide friction portion is equal to or less than the maximum static friction force, the second resistance force generation means prevents the second return-urging means from being elastically deformed in excess of the amount of elastic deformation of the second elastic deformation portion.

According to this configuration, when a friction force of the first slide friction portion is equal to or less than the maximum static friction force, the first resistance force generation means can prevent the first return-urging means from being elastically deformed in excess of the amount of elastic deformation of the first elastic deformation portion, and, when a friction force of the second slide friction portion is equal to or less than the maximum static friction force, the second resistance force generation means can prevent the second return-urging means from being elastically deformed in excess of the amount of elastic deformation of the second elastic deformation portion. Therefore, the above-mentioned configuration can reliably achieve a two-bend characteristic.

The above-mentioned configuration may be such that: the operating element can pivotally move about a pivotal axis, and the first and second resistance force generation means are spaced apart from each other in a direction along the pivotal axis.

According to this configuration, the operating element can pivotally move about the pivotal axis, and the first and second resistance force generation means are spaced apart from each other along the pivotal axis of the operating element. Thus, friction forces to be generated by the first and second resistance force generation means can be exerted at respective positions spaced apart from each other along the pivotal axis, and reaction forces of elastic deformations can be exerted at respective positions spaced apart from each other along the pivotal axis. Therefore, as compared with the case where the first and second resistance force generation means are not spaced apart from each other in a direction along the pivotal axis of the operating element, the concentration of resistance force can be lowered.

The above-mentioned configuration may be such that: the operating element has a pivot; the support means has bearing portions for rotatably supporting the pivot; the first resistance force generation means has a first shim interposed between one end surface of the pivot and the corresponding bearing portion; and the second resistance force generation means has a second shim interposed between the other end surface of the pivot and the corresponding bearing portion.

According to this configuration, the actions and effects of the above-mentioned configurations can be reliably yielded by means of appropriately setting the coefficient of friction and the contact surface pressure between one end surface of the pivot and the first shim, the coefficient of friction and the contact surface pressure between the other end surface of the pivot and the second shim, and the elastic modulus of at least a portion of the first or second shim.

According to the above-mentioned configuration, even when a load is imposed on the operating element in a direction along the pivot, one of the contact surface pressure between one end surface of the pivot and the first shim and the contact surface pressure between the other end surface of the pivot and the second shim increases, but the other contact surface pressure decreases. Thus, as compared with a structure in which, when one contact surface pressure increases, the other contact surface pressure does not decrease, there can be reliably reduced the magnitude of fluctuation of a total friction force exerted on the operating element, the fluctuation stemming from the load which is imposed on the operating element in the direction along the pivot.

The above-mentioned configuration may be such that: surface pressure adjustment means is provided for adjusting at least one of a contact surface pressure of the first shim against one end surface of the pivot and a contact surface pressure of the second shim against the other end surface of the pivot.

According to this configuration, the surface pressure adjustment means is provided for adjusting at least one of a contact surface pressure of the first shim against one end surface of the pivot and a contact surface pressure of the second shim against the other end surface of the pivot. Thus, through adjustment of the contact surface pressure by the surface pressure adjustment means, the friction force between the shim and the corresponding end surface of the pivot can be reliably adjusted.

The above-mentioned configuration may be such that: the operating element has a pivot, and the first and second resistance force generation means are provided at respective positions spaced apart from the pivot in a direction perpendicular to an axis of the pivot.

According to this configuration, the operating element has a pivot, and the first and second resistance force generation means are provided at respective positions spaced apart from the pivot in a direction perpendicular to the axis of the pivot; thus, friction forces, and reaction forces of elastic deformations can be exerted in association with a relative arcuate motion of the operating element about the axis of the pivot.

The above-mentioned configuration may be such that: each of the first and second return-urging means has an easy elastic deformation portion and a less easy elastic deformation portion, and the first and second resistance force generation means are in sliding contact with less easy elastic deformation portions of the first and second return-urging means, respectively.

According to this configuration, each of the first and second return-urging means has the easy elastic deformation portion and the less easy elastic deformation portion, and first and second resistance force generation means are in sliding contact with the less easy elastic deformation portions of the first and second return-urging means, respectively. Thus, as compared with a configuration in which the first and second resistance force generation means are in sliding contact with the easy elastic deformation portions of the first and second return-urging means, respectively, resistance forces can be stably generated through friction forces of the first and second slide friction portions. Accordingly, the pedal-operated operation device can be stably operated.

The above-mentioned configuration may be such that: the return-urging means has an easy elastic deformation portion and a less easy elastic deformation portion, and the first and second resistance force generation means are in sliding contact with the less easy elastic deformation portion.

According to this configuration, the return-urging means has an easy elastic deformation portion and a less easy elastic deformation portion, and the first and second resistance force generation means are in sliding contact with the less easy elastic deformation portion. Thus, as in the case of the above-mentioned configuration, as compared with a configuration in which the first and second resistance force generation means are in sliding contact with the easy elastic deformation portion of the return-urging means, resistance forces can be stably generated through friction forces of the first and second slide friction portions. Accordingly, the pedal-operated operation device can be stably operated.

The above-mentioned configuration may be such that: a portion of the return-urging means is in sliding contact with another portion of the return-urging means, thereby defining the first slide friction portion.

According to this configuration, a portion of the return-urging means is in sliding contact with another portion of the return-urging means, thereby defining the first slide friction portion. Thus, the first slide friction portion does not need to have an independent member in sliding contact with the return-urging means. As compared with a configuration in which an independent second member is provided, the number of required components can be reduced.

The above-mentioned configuration may be such that: the operating element is a pivotal pedal which is pivotally supported by the support means.

According to this configuration, the operating element is a pivotal pedal which is pivotally supported by the support means; thus, the actions and effects of the above-mentioned configurations can be achieved with respect to the pivotal pedal, such as an accelerator pedal of an automobile.

The above-mentioned configuration may be such that: the second elastic deformation portion is elastically deformed by a friction force of the second slide friction portion at a time when the operation element undergoes relative displacement relative to the support means.

The above-mentioned configuration may be such that: the coefficient of static friction of the second slide friction portion is higher than that of the first slide friction portion.

The above-mentioned configuration may be such that: even when an operation force imposed on the operating element varies within a range of not greater than an operation force corresponding to the maximum static friction force of the first slide friction portion, the second elastic deformation portion does not substantially undergo elastic deformation.

The above-mentioned configuration may be such that: as an operation force imposed on the operating element increases, a pressing force between the members in sliding contact with each other of the first slide friction portion increases.

The above-mentioned configuration may be such that: as an operation force imposed on the operating element increases, a pressing force between the members in sliding contact with each other of the first slide friction portion increases through elastic deformation of the first elastic deformation portion.

The above-mentioned configuration may be such that: a pressing force between the members in frictional sliding contact with each other of the first and second slide friction portions is substantially constant, irrespective of an operation force imposed on the operating element.

The above-mentioned configuration may be such that: an operation force at the first bend point is from one-half to two-thirds inclusive of that at the second bend point.

The above-mentioned configuration may be such that: the operation-magnitude detection means detects a tread force which an operator applies to the operating element.

The above-mentioned configuration may be such that: the first and second resistance force generation means are disposed on opposite sides, respectively, of a center axis of the pivotal pedal perpendicular to the pivotal axis.

The above-mentioned configuration may be such that: the first and second resistance force generation means have a first friction plate and a second friction plate, respectively, which define a first frictional engagement portion and a second frictional engagement portion, respectively, for frictional engagement with the operating element or the support means, and the first and second friction plates are fixed to the operating element or to the support means.

The above-mentioned configuration may be such that: as an operation force imposed on the operating element increases, a pressing force between the first friction contact means and the first return-urging means and a pressing force between the second friction contact means and the second return-urging means increase.

The above-mentioned configuration may be such that: as an operation force imposed on the operating element increases, a pressing force between the first friction contact means and the first elastic deformation portion and a pressing force between the second friction contact means and the second elastic deformation portion increase.

The above-mentioned configuration may be such that: the pedal-operated operation device is a drive-by-wire-type accelerator pedal device of an automobile.

The above-mentioned configuration may be such that: the pedal-operated operation device is a brake-by-wire-type brake pedal device of an automobile.

The above-mentioned configuration may be such that: the operating element is a reciprocal-movement pedal which is supported in a reciprocally movable manner by the support means.

BEST MODE FOR CARRYING OUT THE INVENTION

Preferred embodiments of the present invention will next be described with reference to the appended drawings.

First Embodiment

Figure 1:
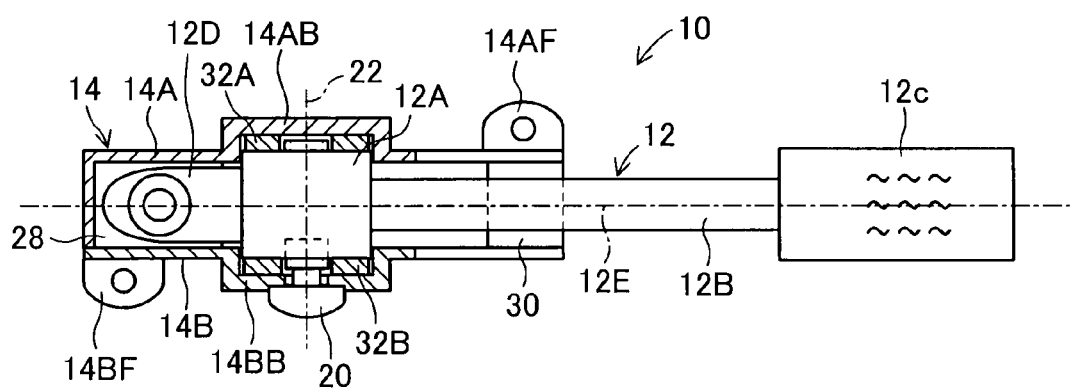
FIG. 1 is a horizontal sectional view showing a first embodiment of a pedal-operated operation device according to the present invention, the device being embodied as a drive-by-wire-type accelerator pedal device of an automobile.
Figure 2:
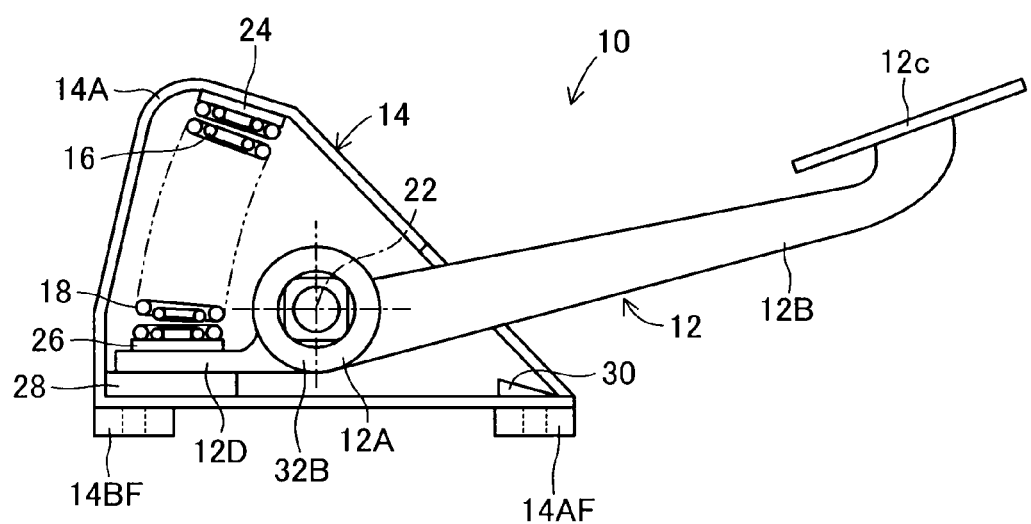
FIG. 2 is a side view showing the first embodiment with a sub-housing member removed.

FIG. 1 is a horizontal sectional view showing a first embodiment of a pedal-operated operation device according to the present invention, the device being embodied as a drive-by-wire-type accelerator pedal device of an automobile. FIG. 2 is a side view showing the first embodiment with a sub-housing member removed.

In these drawings, reference numeral 10 denotes an entire accelerator pedal device. The accelerator pedal device 10 has a pedal arm 12, which serves as an operating element to be foot-operated; a support housing 14, which serves as support means for supporting the pedal arm 12 in a pivotally movable manner; an inner spring 16 and an outer spring 18, which collectively serve as return-urging means for pivotally urging the pedal arm 12 relative to the support housing 14 in a reverse direction of increase in the magnitude of operation of the pedal arm 12; and an opening sensor 20, which serves as means for detecting the magnitude of operation of the pedal arm 12.

The pedal arm 12 has a cylindrical shaft portion 12A extending along an axis 22 of the pedal arm 12; a first arm portion 12B formed integral with the shaft portion 12A, having a shape resembling the letter J, and extending in a direction crossing the axis 22; a pedal portion 12C formed integral with an end of the first arm portion 12B and on which a driver's foot imposes a tread force; and a second arm portion 12D located on a side opposite the first arm portion 12B with respect to the shaft portion 12A and extending in a direction crossing the axis 22. In the illustrated first embodiment, the entire pedal arm 12 is formed of resin. However, a portion of the pedal arm 12, such as the pedal portion 12C, may be formed of metal. In FIG. 1, reference numeral 12E denotes the centerline of width of the pedal arm 12.

The support housing 14 includes a main housing member 14A and a sub-housing member 14B. The main housing member 14A has a substantially triangular side wall portion and a peripheral wall portion formed integral with an outer peripheral portion of the side wall portion and extending perpendicularly to the side wall portion. The sub-housing member 14B has a form similar to that of the side wall portion of the main housing member 14A. In the illustrated first embodiment, the main housing member 14A and the sub-housing member 14B are formed of resin. However, these housing members may be formed partially or entirely of metal.

The main housing member 14A and the sub-housing member 14B are fixed to each other with unillustrated screws and nuts such that an outer peripheral portion of the sub-housing member 14B is in contact with the end surface of the peripheral wall portion of the main housing member 14A. The main housing member 14A and the sub-housing member 14B have a mounting flange 14AF and a mounting flange 14BF, respectively. The mounting flanges 14AF and 14BF are attached to an unillustrated vehicle body with unillustrated bolts, whereby the housing members are fixed to the vehicle body.

The inner spring 16 and the outer spring 18 are compression coil springs disposed concentric with each other. These springs are supported at their one ends by a spring seat 24 formed on the peripheral wall portion of the main housing member 14A and are supported at their other ends by a spring seat 26 provided on the second arm portion 12D of the pedal arm 12. By this arrangement, the inner spring 16 and the outer spring 18 urge the pedal arm 12 counterclockwise about the axis 22 as viewed in FIG. 2 in such a manner that the second arm portion 12D comes into contact with a full close stopper 28 formed on the peripheral wall portion of the main housing member 14A. The return-urging means is not limited to a compression coil spring, but may be any spring known in the technical field, such as a tension coil spring, a plate spring, or a torsion spring.

Also, a full open stopper 30 is formed on the peripheral wall portion of the main housing member 14A on a side opposite the full close stopper 28 with respect to the axis 22. As a tread force imposed on the pedal portion 12C increases, the pedal arm 12 pivotally moves about the axis 22 against urging forces of the inner spring 16 and the outer spring 18. However, upon contact with the full open stopper 30 of the first arm portion 12B, the full open stopper 30 prevents further pivotal movement of the pedal arm 12.

The opening sensor 20 is a rotational angle sensor for detecting the magnitude of operation of the pedal arm 12 by means of detecting the relative rotational angle about the axis 22 of the pedal arm 12 relative to the support housing 14. In the illustrated first embodiment, the opening sensor 20 has a detection portion fixed to the main housing member 14A and maintaining a stationary state, and a rotational portion which unitarily rotates with the shaft portion 12A of the pedal arm 12 to thereby rotate about the axis 22 relative to the detection portion. The opening sensor 20 may be any sensor known in the technical field, such as a hall-IC-type rotation sensor, an electromagnetic-induction-type rotation sensor, or a rotary potentiometer, so long as it can detect the relative rotational angle about the axis 22 of the pedal arm 12 relative to the support housing 14.

The main housing member 14A and the sub-housing member 14B have a bearing portion 14AB and a bearing portion 14BB, respectively. The bearing portions 14AB and 14BB have respective inner cylindrical surfaces each having a diameter slightly greater than that of the shaft portion 12A of the pedal arm 12, and rotatably support corresponding end portions of the shaft portion 12A of the pedal arm 12. The shaft portion 12A of the pedal arm 12 and the bearing portions 14AB and 14BB are engaged with each other at the cylindrical surfaces in such a manner as to be rotatable relative to each other. These portions may be engaged with each other at truncated cone surfaces in such a manner as to be rotatable relative to each other.

A first shim 32A and a second shim 32B are disposed between opposite end surfaces of the shaft portion 12A and corresponding wall surfaces of the bearing portions 14AB and 14BB, respectively. The first shim 32A and the second shim 32B have a first frictional engagement portion and a second frictional engagement portion, respectively, for frictional engagement with the corresponding end surfaces of the shaft portion 12A. The first shim 32A and the second shim 32B function, in cooperation with the corresponding end surfaces of the shaft portion 12A, as first resistance force generation means and second resistance force generation means, respectively, for generating a first resistance force and a second resistance force against the relative pivotal displacement of the pedal arm 12 relative to the support housing 14. Thus, the first frictional engagement portion of the first shim 32A and the corresponding end surface of the shaft portion 12A define a first friction surface pair for generating the first resistance force, and the second frictional engagement portion of the second shim 32B and the corresponding end surface of the shaft portion 12A define a second friction surface pair for generating the second resistance force.

The first shim 32A and the second shim 32B are formed of the same resin and are frictionally engaged with side wall portions of the bearing portions 14AB and 14BB, respectively, in such a manner as to not rotate relative to each other. In the illustrated first embodiment, the first shim 32A and the second shim 32B each assume the form of an annular plate having an inside diameter greater than the outside diameter of cylindrical projections projecting along the axis 22 from the corresponding end surfaces of the shaft portion 12A and a thickness greater than the projecting height of the cylindrical projections.

When the surfaces of the first and second shims 32A and 32B which face the end surfaces of the shaft portion 12A are called front surfaces, at least the front surface of the first shim 32A receives surface treatment, such as Teflon (registered trademark) lining. Although unillustrated, the front surface of the second shim 32B has irregularities in the form of cross grooves formed thereon so that, when shear stresses circumferentially act on the plate surfaces of the first and second shims 32A and 32B, respectively, the second shim 32B is elastically deformed more easily than is the first shim 32A.

Through employment of the above-mentioned surface treatment, the coefficient of static friction between the first shim 32A and the corresponding end surface of the shaft portion 12A is set as a first coefficient of static friction $\mu s1$, and the coefficient of static friction between the second shim 32B and the corresponding end surface of the shaft portion 12A is set as a second coefficient of static friction $\mu s2$ higher than the first coefficient of static friction $\mu s1$. Similarly, the coefficient of dynamic friction between the first shim 32A and the corresponding end surface of the shaft portion 12A is set as a first coefficient of dynamic friction $\mu m1$, and the coefficient of dynamic friction between the second shim 32B and the corresponding end surface of the shaft portion 12A is set as a second coefficient of dynamic friction $\mu m2$ higher than the first coefficient of dynamic friction $\mu m1$. The first coefficient of static friction $\mu s1$ is higher than the first coefficient of dynamic friction $\mu m1$, and the second coefficient of static friction $\mu s2$ is higher than the second coefficient of dynamic friction $\mu m2$.

A pressing force exerted on the first shim 32A from the shaft portion 12A and a pressing force exerted on the second shim 32B from the shaft portion 12A are substantially the same. Thus, the maximum static friction force between the second shim 32B and the shaft portion 12A is greater than that between the first shim 32A and the shaft portion 12A.

Regarding elastic moduli of elastic deformations of the first and second shims 32A and 32B which depend on the presence and absence of irregularities in the form of the above-mentioned grooves; i.e., elastic moduli of circumferential elastic deformations of the first and second shims 32A and 32B caused by shear stresses acting on the respective plate surfaces of the first and second shims 32A and 32B, the elastic moduli of the first and second shims 32A and 32B are set as K1 and K2, respectively. The elastic modulus K2 of the second shim 32B is lower than the elastic modulus K1 of the first shim 32A. In order for the second shim 32B to be elastically deformed more easily than is the first shim 32A when shear stresses circumferentially act on the plate surfaces of the first and second shims 32A and 32B, respectively, the minimum elastic modulus K2 min of the second shim 32B may be set lower than the minimum elastic modulus K1 min of the first shim 32A. Means for attaining this relation between the minimum elastic moduli K1 min and K2 min is not limited to the cross grooves, but may be parallel grooves or radial grooves. Alternatively, the first shim 32A and the second shim 32B may be formed of materials of different elastic moduli.

Figure 3:
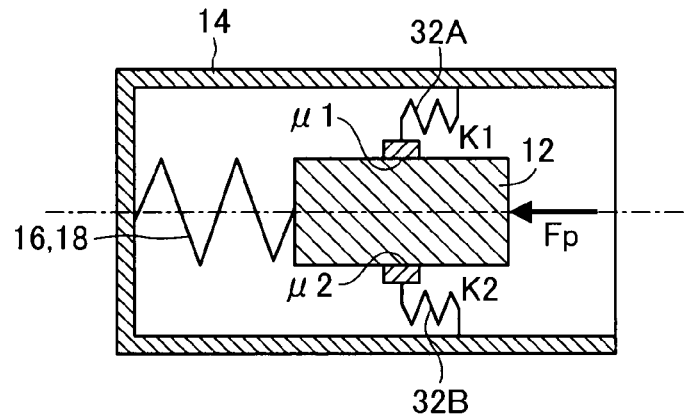
FIG. 3 is an explanatory view showing the accelerator pedal device of the first embodiment which is modeled as a device of rectilinear motion, showing a state in which a pedal arm is not displaced relative to a support housing.
Figure 4:
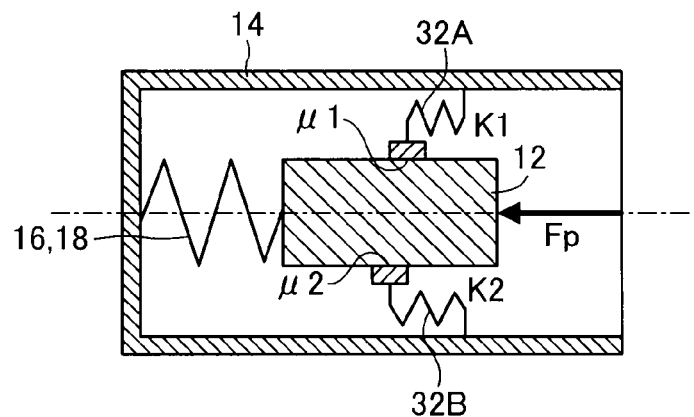
FIG. 4 is an explanatory view showing the accelerator pedal device of the first embodiment which is modeled as a device of rectilinear motion, showing a state in which the pedal arm is slightly displaced relative to the support housing.
Figure 5:
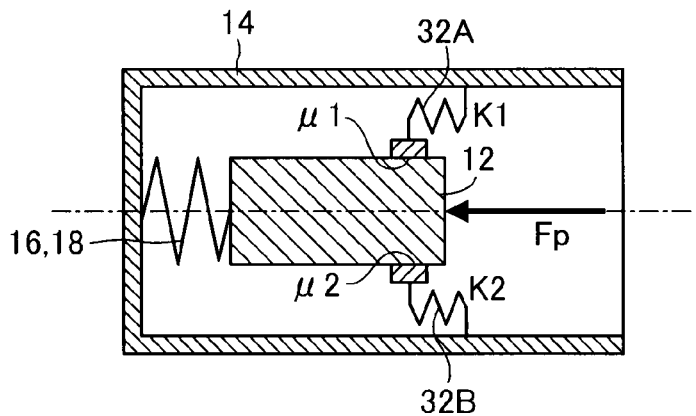
FIG. 5 is an explanatory view showing the accelerator pedal device of the first embodiment which is modeled as a device of rectilinear motion, showing a state in which the pedal arm is relatively greatly displaced relative to the support housing.

As will be understood from the above description, the accelerator pedal device 10 of the illustrated first embodiment can be modeled as a device of rectilinear motion as shown in FIGS. 3 to 5.

When a relative drive force Fp of the pedal arm 12 relative to the support housing 14 is equal to or less than maximum static friction forces Fs1max and Fs2max between the first and second shims 32A and 32B and the corresponding end surfaces, respectively, of the shaft portion 12A, as shown in FIG. 3, the pedal arm 12 is not displaced relative to the first and second shims 32A and 32B. When the elastic modulus K1 of the first shim 32A is sufficiently high, the amount of elastic deformation of the first shim 32A is very small; thus, the pedal arm 12 is also hardly displaced relative to the support housing 14.

By contrast, when the relative drive force Fp is greater than the maximum static friction force Fs1max between the first shim 32A and the corresponding end surface of the shaft portion 12A and is equal to or less than the maximum static friction force Fs2max between the second shim 32B and the corresponding end surface of the shaft portion 12A, as shown in FIG. 4, the pedal arm 12 is displaced relative to the first shim 32A, but is not displaced relative to the front surface of the second shim 32B. However, since the second shim 32B is elastically deformed, the pedal arm 12 is displaced relative to the support housing 14. The relative displacement increases in proportion to increase in the relative drive force Fp. Thus, the second shim 32B also functions as a displacement member which allows the second friction surface pair higher in coefficient of static friction than the first friction surface pair to move in association with the relative displacement of the pedal arm 12 relative to the support housing 14. In this case, the direction of elastic deformation of the displacement member is a direction of elastic deformation caused by stress which the displacement member receives in association with the relative displacement of the pedal arm 12, which serves as an operating element, while the second friction surface pair is maintained in a state of frictional engagement.

Furthermore, when the relative drive force Fp is greater than the maximum static friction force Fs2max between the second shim 32B and the corresponding end surface of the shaft portion 12A, as shown in FIG. 5, the pedal arm 12 is displaced relative to both of the first shim 32A and the second shim 32B, whereby the pedal arm 12 is displaced relative to the support housing 14 to a relatively large degree. Since friction between the pedal arm 12 and each of the first and second shims 32A and 32B is dynamic friction, the ratio of an increase in relative displacement of the pedal arm 12 to an increase in the relative drive force Fp is higher than that in a state shown in FIG. 4.

Figure 6:
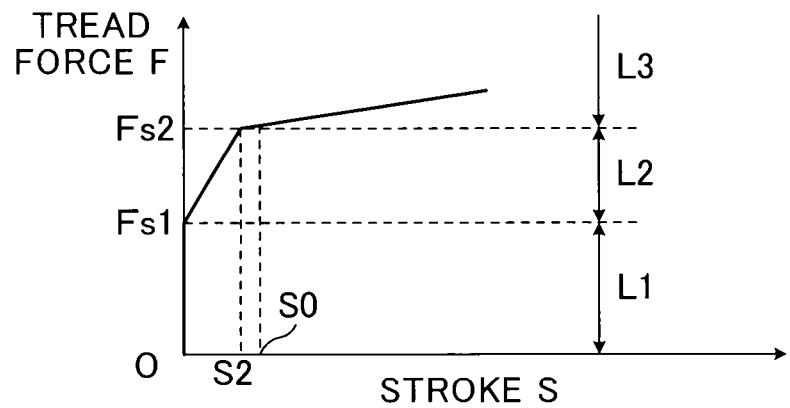
FIG. 6 is a graph showing the relation in the first embodiment between a tread force F imposed on a pedal portion of the pedal arm and a stroke S of the pedal portion about an axis (F-S characteristic curve).

Accordingly, in the illustrated first embodiment, the relation between a tread force F imposed by a driver on the pedal portion 12C of the pedal arm 12 and a stroke S of the pedal portion 12C around the axis 22; i.e., an F-S characteristic, is a two-bend characteristic in a process of increase in the tread force F as shown in FIG. 6. More specifically, the F-S characteristic curve of the first embodiment has first to third linear regions L1 to L3; a first bend point P1 between the first linear region L1 and the second linear region L2; and a second bend point P2 between the second linear region L2 and the third linear region L3.

A tread force corresponding to a maximum static friction force based on the first coefficient of static friction $\mu$s1 is taken as a first reference tread force Fs1, and a tread force corresponding to a maximum static friction force based on the second coefficient of static friction $\mu$s2 is taken as a second reference tread force Fs2 (>Fs1). The first bend point P1 corresponds to a case in which the tread force F is substantially the first reference tread force Fs1, and the second bend point P2 corresponds to a case in which the tread force F is substantially the second reference tread force Fs2. Preferably, the first reference tread force Fs1 is one-half to two-thirds inclusive of the second reference tread force Fs2.

The inclination of the F-S characteristic curve in the first linear region L1 is substantially infinite, and, when the tread force F is equal to or less than the first reference tread force Fs1, the stroke S is substantially 0 irrespective of the value of the tread force F. In other words, even when the tread force F varies within a range of not greater than the first reference tread force Fs1, the pedal arm 12 does not pivotally move relative to the support housing 14 to such an extent as to be sensible by a driver. The inclination of the F-S characteristic curve in the third linear region L3 is smaller than that in the second linear region L2. That is, the ratio of an amount of change $\Delta S$ in the stroke S to an amount of change $\Delta F$ in the tread force F; i.e., $\Delta S/\Delta F$, is higher in the third linear region L3, in which the tread force F is greater than the second reference tread force Fs2, than in the second linear region L2, in which the tread force F is greater than the first reference tread force Fs1 and less than the second reference tread force Fs2.

The ratio $\Delta S/\Delta F$ in the first linear region L1 depends on the elastic modulus K1 of the first shim 32A in such a manner as to approach 0 as the elastic modulus K1 increases and to increase as the elastic modulus K1 decreases. The ratio $\Delta S/\Delta F$ in the first linear region L1 is not necessarily 0, but may be one-half or less, preferably one-third or less, of the ratio $\Delta S/\Delta F$ in the second linear region L2, and one-fifth or less, preferably one-eighth or less, of the ratio $\Delta S/\Delta F$ in the third linear region L3. Also, the ratio $\Delta S/\Delta F$ in the second linear region L2 is two times or more, preferably three times or more, more preferably five times or more, the $\Delta S/\Delta F$ in the third linear region L3.

Generally, since the coefficient of dynamic friction is lower than the coefficient of static friction, theoretically, a resistance force momentarily drops in transition from the first linear region L1 to the second linear region L2 and in transition from the second linear region L2 to the third linear region L3. However, in the case where frictionally engaged members of resin or the like have received surface treatment, such as Teflon (registered trademark) lining, the members are frictionally engaged at a plurality of regions as viewed locally, and the transition from static friction to dynamic friction does not take place completely and simultaneously at the plurality of regions. Accordingly, in the case where the contact surface pressure between frictional engagement portions is not high, a resistance force does not momentarily drop in a marked fashion at the time of transition from static friction to dynamic friction. These remarks are also applicable to other embodiments to be described later.

As shown in FIG. 6, while taking the stroke S which is a reference value S0 greater than a stroke S2 at the second bend point P2, as a stroke Smin corresponding to a fully closed state of a throttle valve, and taking the stroke S at the time when the first arm portion 12B of the pedal arm 12 is in contact with the full open stopper 30, as a stroke Smax corresponding to a fully opened state of the throttle valve, the opening sensor 20 outputs a signal indicative of the stroke S ranging from Smin to Smax to an unillustrated engine control device.

Figure 7:
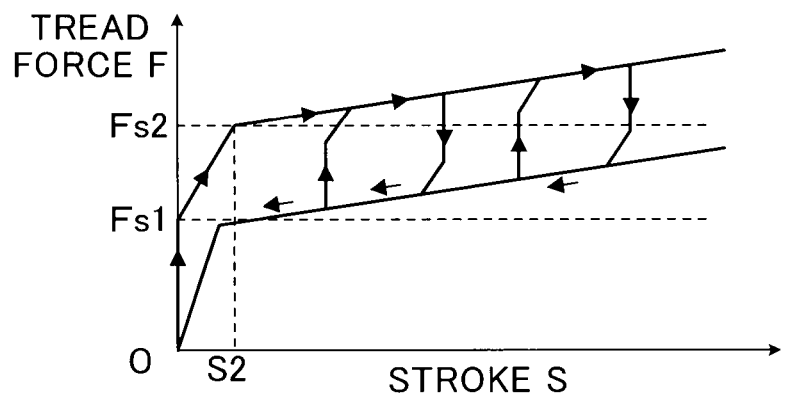
FIG. 7 is a graph showing hysteresis of the F-S characteristic curve in the first embodiment.

In the illustrated first embodiment, when the driver treads on the pedal arm 12 in such a manner that the tread force F is increased to, for example, a value in the third linear region L3, is then decreased, and is again increased, the F-S characteristic curve follows a hysteresis curve as shown in FIG. 7. The larger the first reference tread force Fs1, the larger the hysteresis width of this F-S characteristic curve. In the case where, as mentioned above, the first reference tread force Fs1 is from one-half to two-thirds inclusive of the second reference tread force Fs2, a sufficient hysteresis width can be reliably ensured as compared with the case where, for example, the first reference tread force Fs1 is less than one-half of the second reference tread force Fs2. As shown in FIG. 7, even in a process of decrease in the tread force F, the F-S characteristic curve shows a two-bend characteristic; however, the magnitude relationship of inclination between the first and third linear regions is reverse to that in a process of increase in the tread force F.

When the tread force F increases, the inner spring 16 and the outer spring 18 operate in a direction of restraining increase in the stroke S. When the tread force F decreases, the inner and outer springs 16 and 18 operate in a direction of accelerating decrease in the stroke S. Accordingly, the higher the spring constant of the inner spring 16 or the outer spring 18, the greater the inclination of the F-S characteristic curve at the time when the tread force F increases in the third linear region L3 as well as the inclination of the F-S characteristic curve at the time when the stroke S linearly decreases as a result of decrease in the tread force F.

Generally, as shown in FIG. 7, the hysteresis width of the F-S characteristic curve is smaller than the first reference tread force Fs1 at the time when the tread force F increases from 0. Conceivably, this is because of the following: when the tread force F is increased from 0, the arm ratio of the pedal arm 12 changes; however, once the arm ratio of the pedal arm 12 changes, even when the tread force F is subsequently increased or decreased, the arm ratio of the pedal arm 12 remains unchanged.

Specifically, as mentioned previously, since the shaft portion 12A of the pedal arm 12 is supported by the bearing portions 14AA and 14AB in such a manner as to be rotatable about the axis 22 relative to the bearing portions, a clearance exists between the cylindrical surface of the shaft portion 12A and the cylindrical surfaces of the bearing portions 14AA and 14AB. Accordingly, contact points between the shaft portion 12A of the pedal arm 12 and the bearing portions 14AA and 14AB change; thus, there changes the arm ratio of a lever which has a point of application at the pedal portion 12C, a fulcrum at the above-mentioned contact point, and a point of action at the end of the second arm portion 12. However, even when the tread force F is increased or decreased in a range greater than a value of the tread force F at which the arm ratio changes, the contact points between the shaft portion 12A and the bearing portions 14AA and 14AB remain unchanged, so that the arm ratio remain unchanged.

Figure 8:
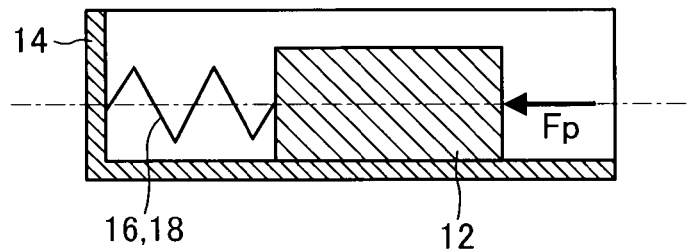
FIG. 8 is an explanatory view showing a conventional accelerator pedal device which is modeled as a device of rectilinear motion.

FIG. 8 is an explanatory view showing a conventional pedal-operated operation device which is modeled as a device of rectilinear motion. In the conventional pedal-operated operation device having only a region in which a resistance force is generated through a static friction force and a region in which a resistance force is generated through a dynamic friction force, the relation between the tread force F imposed on the pedal portion of the pedal arm 12 and the stroke S of the pedal portion about the pivotal axis; i.e., the F-S characteristic, is a one-bend characteristic as shown in FIGS. 9 and 10.

Figure 9:
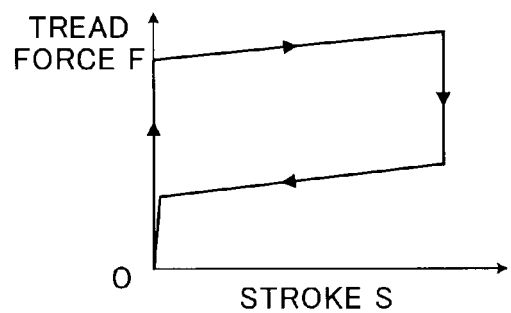
FIG. 9 is a graph showing the F-S characteristic curve of the conventional accelerator pedal device in the case of a high coefficient of friction, and hysteresis of the F-S characteristic curve.
Figure 10:
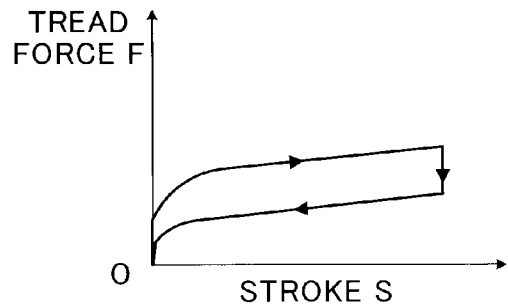
FIG. 10 is a graph showing the F-S characteristic curve of the conventional accelerator pedal device in the case of a low coefficient of friction, and hysteresis of the F-S characteristic curve.

Thus, in the conventional pedal-operated operation device, when, in order to facilitate the maintenance of the magnitude of treading on an accelerator pedal at a constant value, the coefficient of friction between the pedal arm 12 and the support housing 14 is set high, as shown in FIG. 9, a tread force required for start of pivotal movement of the accelerator pedal becomes excessively high; as a result, a driver feels a so-called feeling of treading on a wall when he/she starts treading on the accelerator pedal. Also, since the accelerator pedal fails to return unless the tread force is greatly reduced, the driver feels an odd feeling at the time of easing off the accelerator pedal.

On the contrary, when the coefficient of friction is set low, there can be mitigated a feeling of treading on a wall at the time of start of treading on the accelerator pedal and an odd feeling at the time of easing off the accelerator pedal. However, in this case, as shown in FIG. 10, the hysteresis width becomes small; as a result, for example, even when the tread force F varies slightly in association with vibration or the like of a vehicle, the stroke S of treading on the accelerator pedal varies. Therefore, the driver encounters difficulty in maintaining the magnitude of treading on the accelerator pedal at a constant value; i.e., the maintainability of steadiness is impaired.

By contrast, according to the first embodiment of the present invention, as shown in FIG. 6, the F-S characteristic in a process of increase in the tread force F is a two-bend characteristic having the first to third linear regions L1 to L3, the first bend point P1 between the first linear region L1 and the second linear region L2, and the second bend point P2 between the second linear region L2 and the third linear region L3. Also, as shown in FIG. 7, the F-S characteristic in a process of decrease in the tread force F is a two-bend characteristic. Accordingly, as compared with the conventional pedal-operated operation device, the pedal-operated operation device of the first embodiment can improve the easiness of steadily maintaining the magnitude of treading on the pedal arm 12 while mitigating a feeling of treading on a wall at the time of start of treading on the pedal arm 12 and an odd feeling at the time of easing off the pedal arm 12.

Particularly, since the accelerator pedal is longer than the brake pedal in time during which the pedal is held treaded on, a driver is apt to be fatigued with maintaining a state of treading. Also, fluctuations in tread force associated with adjustment of a driving posture and sudden fluctuations in tread force associated with sneezing or the like are apt to arise. In the case of driving on a rough road, the inertial force of a foot or the like may cause fluctuations in tread pressure applied to the accelerator pedal. According to the first embodiment of the present invention, even in these circumstances, fluctuations in stroke of the accelerator pedal can be restrained. According to the results of experimental research conducted by the inventor of the present invention, in the case where the F-S characteristic is a two-bend characteristic, if the first reference tread force Fs1 is less than one-half of the second reference tread force Fs2, the easiness of steadily maintaining the magnitude of treading on the pedal arm 12 will fail to be sufficiently improved. Also, if the first reference tread force Fs1 is in excess of two-thirds of the second reference tread force Fs2, a feeling of treading on a wall at the time of start of treading on the pedal arm 12 and a feeling of defective return of the pedal arm 12 at the time of easing off the pedal arm 12 will fail to be sufficiently mitigated.

According to the first embodiment, since the first reference tread force Fs1 is preferably one-half or more of the second reference tread force Fs2, the easiness of steadily maintaining the magnitude of treading on the pedal arm 12 can be reliably improved, and, since the first reference tread force Fs1 is preferably two-thirds or less of the second reference tread force Fs2, a feeling of treading on a wall at the time of start of treading on the pedal arm 12 and a feeling of defective return of the pedal arm 12 at the time of easing off the pedal arm 12 can be mitigated.

Also, according to the first embodiment, while taking the stroke S of the pedal portion 12C of the pedal arm 12 which is the reference value S0 greater than the stroke S2 at the second bend point P2, as the stroke 5 min corresponding to a fully closed state of a throttle valve, the opening sensor 20 detects the stroke S equal to or greater than 5 min. Accordingly, a region in which the opening sensor 20 detects the stroke S of the pedal portion 12C of the pedal arm 12 can be reliably limited to the third linear region L3, in which the tread force F and the stroke S are in proportion to each other with a fixed constant of proportionality. Thus, as compared with the case where the stroke 5 min corresponding to a fully closed state of a throttle valve is less than the stroke S2 at the second bend point P2, the opening sensor 20 can accurately detect the magnitude of operation by a driver.

Also, according to the first embodiment, the inclination of the F-S characteristic curve in the first linear region L1 is substantially infinite, and, when the tread force F is equal to or less than the first reference tread force Fs1, the stroke S is substantially 0 irrespective of the value of the tread force F. Accordingly, even when the tread force F varies within a range of not greater than the first reference tread force Fs1, the pedal arm 12 does not pivotally move relative to the support housing 14 to such an extent as to be sensible by a driver. Also, in the case where the tread force F is increased to a value greater than the second reference tread force Fs2 and is then increased or decreased, there can be set appropriately the magnitude of a region in which, even when the tread force F increases or decreases, the stroke S remains unchanged; i.e., the magnitude of a region of FIG. 7 in which only the tread force F increases or decreases without variation of the stroke S.

Thus, even when the tread force F imposed on the pedal arm 12 fluctuates against a driver's will, there can be reliably restrained an unnecessary relative pivotal displacement of the pedal arm 12 relative to the support housing 14, which could otherwise occur in association with fluctuations of the tread force. Therefore, the easiness of steadily maintaining the magnitude of treading on the pedal arm 12 can be reliably improved, and a sufficiently large value can be reliably imparted to the width of hysteresis associated with increase and decrease in the operation force.

According to the first embodiment, the inclination of the F-S characteristic curve in the third linear region L3 is smaller than that in the second linear region L2. In other words, the ratio of the amount of change $\Delta S$ in the stroke S to the amount of change $\Delta F$ in the tread force F; i.e., $\Delta S/\Delta F$, is higher in the third linear region L3, in which the tread force F is greater than the second reference tread force Fs2, than in the second linear region L2, in which the tread force F is greater than the first reference tread force Fs1 and less than the second reference tread force Fs2. Accordingly, in a process of increase in the tread force subsequent to start of treading on the pedal arm 12 and in a process of decrease in the magnitude of treading on the pedal arm 12 subsequent to start of reduction in tread force, there can be reliably prevented a sudden, abrupt increase in relative pivotal displacement of the pedal arm 12 relative to the support housing 14 and an associated sudden, abrupt increase in a variable to be controlled by the operation of treading on the pedal arm 12.

According to the first embodiment, the ratio of the amount of change in the stroke S to the amount of change in the tread force F; i.e., $\Delta S/\Delta F$, is constant in any one of the first linear region L1, the second linear region L2, and the third linear region L3. Thus, as the tread force F changes, the ratio $\Delta S/\Delta F$ changes gently; accordingly, as compared with the case where the F-S characteristic follows a curved line, the stroke S can be readily adjusted through adjustment of the tread force.

According to the first embodiment, the first shim 32A and the second shim 32B are spaced apart from each other in a direction along the axis 22 and are disposed on the respective opposite sides of the center axis 12E of the pedal arm 12 perpendicular to the axis 22. Accordingly, friction forces between the first and second shims 32A and 32B and the corresponding end surfaces of the shaft portion 12A of the pedal arm 12 and reaction forces of elastic deformations can be generated on the opposite sides of the center axis 12E. Thus, for example, as compared with the case where the first shim 32A and the second shim 32B are not spaced apart from each other in a direction along the axis 22 and the case where both the first shim 32A and the second shim 32B are disposed on one side with respect to the center axis 12E, the concentration of the friction forces and the reaction forces of elastic deformations can be reliably reduced, and moments which act on the pedal arm 12 due to the friction forces and the reaction forces of elastic deformations can be reliably reduced.

According to the first embodiment, the first shim 32A and the second shim 32B are disposed between the end surfaces of the shaft portion 12A of the pedal arm 12 and the respective bearing portions 14AB and 14BB of the support housing 14, and a desired F-S characteristic is attained through friction forces between the shims and the end surfaces of the shaft portion 12A of the pedal arm 12, elastic deformations, and reaction forces of the elastic deformations. Thus, as compared with a structure in which the first shim 32A and the second shim 32B are not disposed, and the end surfaces of the shaft portion 12A of the pedal arm 12 and the bearing portions 14AB and 14BB of the support housing 14 are directly in frictional contact with each other, the coefficient of friction and the elastic modulus can be readily and reliably set to respectively appropriate values.

When a load is imposed on the pedal arm 12 in a direction along the axis 22, one of a contact surface pressure between one end surface of the shaft portion 12A and the first shim 32A and a contact surface pressure between the other end surface of the shaft portion 12A and the second shim 32B increases, whereas the other contact surface pressure decreases. Thus, as compared with a structure in which, even when one contact surface pressure increases, the other contact surface pressure does not decrease, there can be reliably reduced the magnitude of fluctuation of a total friction force exerted on the pedal arm 12, the fluctuation stemming from the load which is imposed on the pedal arm 12 in a direction along the axis 22.

Particularly, according to the first embodiment, the first shim 32A and the second shim 32B are disposed in the proximity of the axis 22 of the pedal arm 12. Thus, as compared with a case where the first and second resistance force generation means are disposed at positions spaced apart greatly in a radial direction from the axis 22 (for example, third and fourth embodiments to be described later), when a prying action is exerted on the pedal arm 12, there can be reliably reduced the magnitude of fluctuation of contact surface pressures of the first and second shims 32A and 32B, so that the magnitude of fluctuation of friction forces can be reliably reduced.

Second Embodiment

Figure 11:
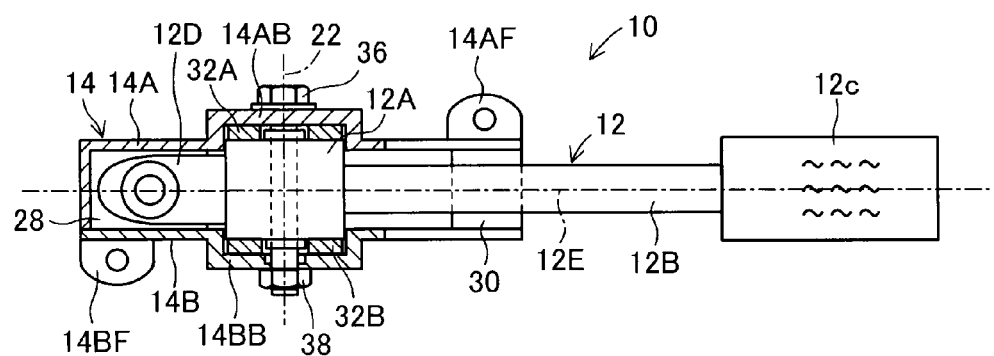
FIG. 11 is a horizontal sectional view showing a second embodiment of a pedal-operated operation device according to the present invention, the device being embodied as a drive-by-wire-type accelerator pedal device of an automobile.

FIG. 11 is a horizontal sectional view showing a second embodiment of a pedal-operated operation device according to the present invention, the device being embodied as a drive-by-wire-type accelerator pedal device of an automobile. In FIG. 11, members similar to those appearing in FIGS. 1 and 2 are denoted by like reference numerals appearing in FIGS. 1 and 2, and this applies to other embodiments to be described later.

In this second embodiment, a bolt 36 extends along the axis 22 through the main housing member 14A, the sub-housing member 14B, the shaft portion 12A of the pedal arm 12, the first shim 32A, and the second shim 32B. A nut 38 is threadingly engaged with an end portion of the bolt 36 opposite a head portion of the bolt 36. Although unillustrated in FIG. 11, an opening sensor in the present embodiment detects the angle of relative rotation, about the axis 22, of the pedal arm 12 relative to the support housing 14 at a position radially spaced apart from the axis 22, thereby detecting the magnitude of operation of the pedal arm 12.

Other configurational features of the second embodiment are similar to those of the first embodiment. Accordingly, the second embodiment operates in a manner similar to that of the first embodiment. Thus, the second embodiment can yield actions and effects similar to those of the above-described first embodiment.

Particularly, according to the second embodiment, through adjustment of the torque of tightening the bolt 36 and the nut 38 together, pressing forces exerted on the first and second shims 32A and 32B can be adjusted via the main housing member 14A and the sub-housing member 14B. Thus, through adjustment of contact surface pressures between the end surfaces of the shaft portion 12A of the pedal arm 12 and the first and second shims 32A and 32B, friction forces therebetween can be adjusted. Thus, in terms of the tread force F, the magnitude of the first linear region L1 and the magnitude of the second linear region L2 can be adjusted.

Third Embodiment

Figure 12:
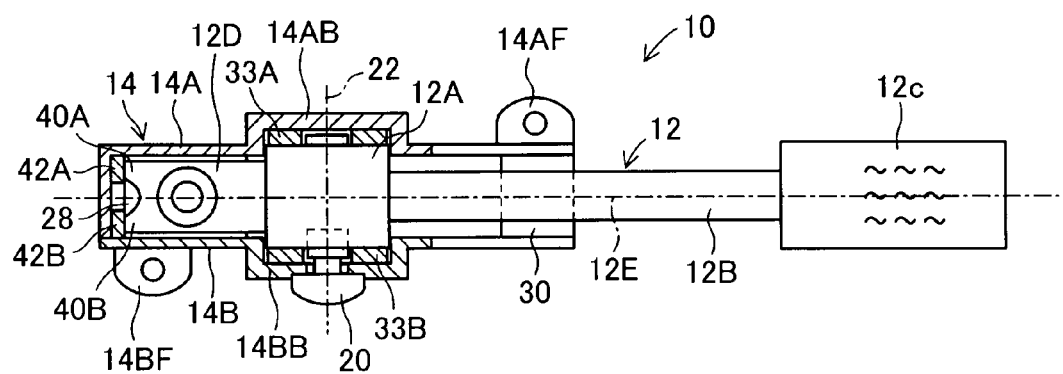
FIG. 12 is a horizontal sectional view showing a third embodiment of a pedal-operated operation device according to the present invention, the device being embodied as a drive-by-wire-type accelerator pedal device of an automobile.
Figure 13:
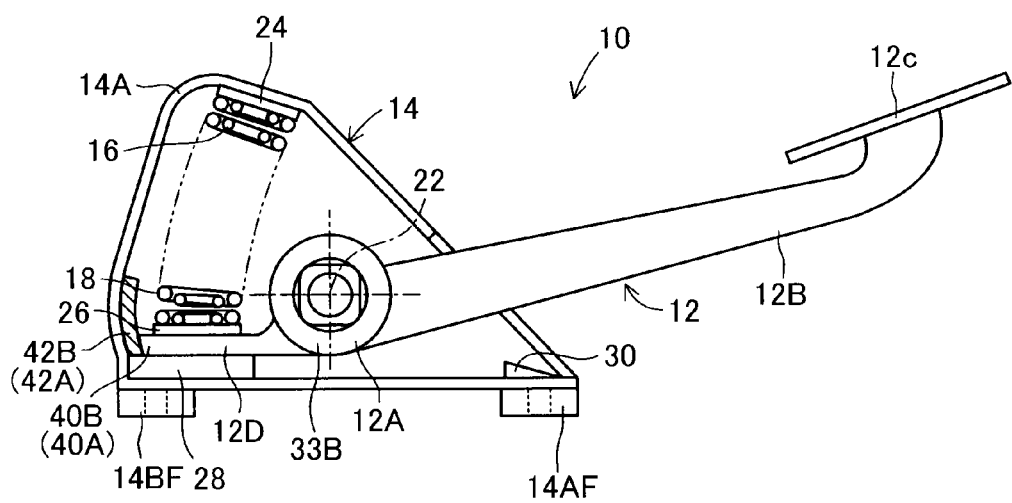
FIG. 13 is a side view showing the third embodiment with a sub-housing member removed.

FIG. 12 is a horizontal sectional view showing a third embodiment of a pedal-operated operation device according to the present invention, the device being embodied as a drive-by-wire-type accelerator pedal device of an automobile. FIG. 13 is a side view showing the third embodiment with a sub-housing member removed.

According to the third embodiment, in order to avoid frictional engagement of the end surfaces of the shaft portion 12A of the pedal arm 12 with the main housing member 14A and the sub-housing member 14B, in place of the first shim 32A and the second shim 32B, antifriction washers 33A and 33B are disposed between the end surfaces of the shaft portion 12A of the pedal arm 12 and the main housing member 14A and the sub-housing member 14B, respectively. This structural feature is also applied to a fourth embodiment to be described later.

In the third embodiment, the projecting end of the second arm portion 12D of the pedal arm 12 forks into a first projection 40A and a second projection 40B, which are spaced apart from each other in a direction along the axis 22. The peripheral wall portion of the main housing member 14A has partially cylindrical regions which are partially cylindrical about the axis 22 and face the first projection 40A and the second projection 40B when the pedal arm 12 pivotally move about the axis 22.

A first friction plate 42A and a second friction plate 42B are fixed on the inner surfaces of the partially cylindrical regions of the peripheral wall portion of the main housing member 14A by fixing means, such as bonding, in such a manner as to arcuately extend along a circumferential direction about the axis 22. The first friction plate 42A and the second friction plate 42B are spaced apart from each other in a direction along the axis 22 and are in contact with the first projection 40A and the second projection 40B, respectively.

The first friction plate 42A functions as first resistance force imposition means for imposing a first resistance force against a pivotal movement of the pedal arm 12 relative to the support housing 14. The second friction plate 42B functions as second resistance force imposition means for imposing a second resistance force against a pivotal movement of the pedal arm 12 relative to the support housing 14.

The first friction plate 42A and the second friction plate 42B are formed of the same resin. However, since the first friction plate 42A and the second friction plate 42B are structurally similar to the first shim 32A and the second shim 32B in the above-described first embodiment, the relation between the first friction plate 42A and the second friction plate 42B is similar to that between the first shim 32A and the second shim 32B with respect to the coefficient of friction between the first friction plate 42A and the first projection 40A and the coefficient of friction between the second friction plate 42B and the second projection 40B and with respect to the elastic modulus of elastic deformation associated with relative motions of these members about the axis 22.

Thus, a surface of the first friction plate 42A and a surface of the first projection 40A which are frictionally engaged with each other define a first friction surface pair for generating a first resistance force by means of a friction force. A surface of the second friction plate 42B and a surface of the second projection 40B which are frictionally engaged with each other define a second friction surface pair for generating a second resistance force by means of a friction force. The second friction plate 42B also functions as a displacement member which allows, through its elastic deformation, the second friction surface pair higher in the coefficient of static friction to move in association with the relative displacement of the pedal arm 12 relative to the support housing 14. Thus, according to the illustrated third embodiment, a first frictional engagement portion defined by the first projection 40A and the first friction plate 42A and a second frictional engagement portion defined by the second projection 40B and the second friction plate 42B are radially spaced apart from the axis 22 to a greater extent than in the case of the above-described first embodiment. Therefore, in addition to attainment of actions and effects similar to those of the above-described first embodiment, the first and second resistance forces for attainment of a desired F-S characteristic can be ensured without need to increase friction forces of the first and second frictional engagement portions and a reaction force of elastic deformation to such an extent as in the case of the above-described first embodiment.

Fourth Embodiment

Figure 14:
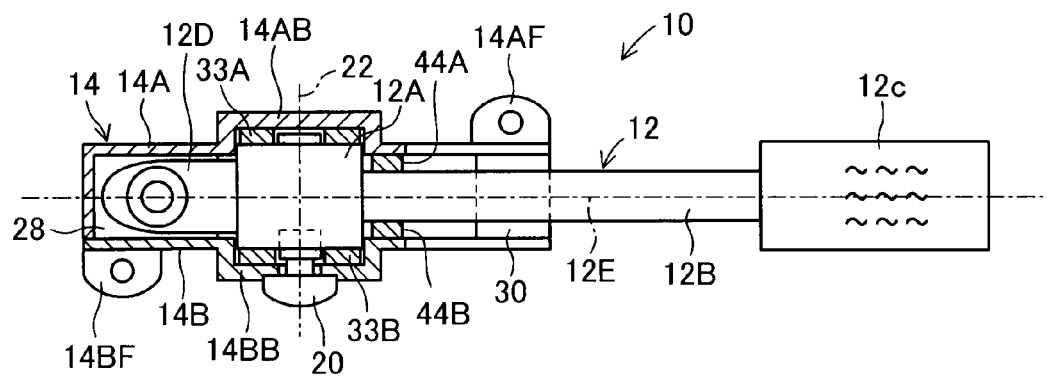
FIG. 14 is a horizontal sectional view showing a fourth embodiment of a pedal-operated operation device according to the present invention, the device being embodied as a drive-by-wire-type accelerator pedal device of an automobile.
Figure 15:
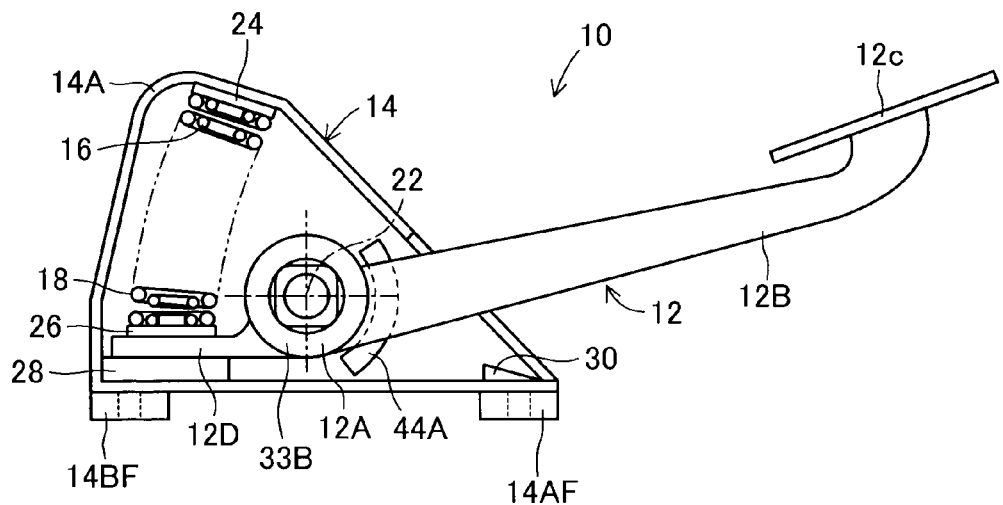
FIG. 15 is a side view showing the fourth embodiment with a sub-housing member removed.

FIG. 14 is a horizontal sectional view showing a fourth embodiment of a pedal-operated operation device according to the present invention, the device being embodied as a drive-by-wire-type accelerator pedal device of an automobile. FIG. 15 is a side view showing the fourth embodiment with a sub-housing member removed.

In the fourth embodiment, while the projecting end of the second arm portion 12D of the pedal arm 12 is formed in a manner similar to that of the above-described first embodiment, a first friction plate 44A and a second friction plate 44B, both in the form of a flat plate, are fixed on the inner wall surfaces of the main housing member 14A and the sub-housing member 14B, respectively, by means of fixing means, such as bonding, the inner wall surfaces facing the first arm portion 12B of the pedal arm 12. The first friction plate 44A and the second friction plate 44B are curved arcuately about the axis 22 at respective positions slightly spaced apart in a radial direction from the outer circumference of the shaft portion 12A of the pedal arm 12.

Similar to the first and second shims 32A and 32B in the above-described first embodiment and the first and second friction plates 42A and 42B in the above-described third embodiment, the first and second friction plates 44A and 44B of the fourth embodiment also function as first and second resistance force imposition means, respectively, for imposing first and second resistance forces against the pivotal movement of the pedal arm 12 relative to the support housing 14.

In the fourth embodiment, the first friction plate 44A and the second friction plate 44B are also formed of the same resin. However, since the first friction plate 44A and the second friction plate 44B are structurally similar to the first shim 32A and the second shim 32B in the above-described first embodiment, the relation between the first friction plate 44A and the second friction plate 44B is similar to that between the first shim 32A and the second shim 32B with respect to the coefficient of friction between the first friction plate 44A and the first arm portion 12B of the pedal arm 12 and the coefficient of friction between the second friction plate 44B and the first arm portion 12B and with respect to the elastic modulus of elastic deformation associated with relative motions of these members about the axis 22.

Accordingly, a surface of the first friction plate 44A and a surface of the first arm portion 12B which are frictionally engaged with each other define a first friction surface pair for generating a first resistance force by means of a friction force. A surface of the second friction plate 44B and a surface of the first arm portion 12B which are frictionally engaged with each other define a second friction surface pair for generating a second resistance force by means of a friction force. The second friction plate 44B also functions as a displacement member which allows, through its elastic deformation, the second friction surface pair higher in the coefficient of static friction to move in association with the relative displacement of the pedal arm 12 relative to the support housing 14.

Thus, according to the illustrated fourth embodiment, similar to the above-described third embodiment, a first frictional engagement portion defined by the first arm portion 12B of the pedal arm 12 and the first friction plate 44A and a second frictional engagement portion defined by the first arm portion 12B of the pedal arm 12 and the second friction plate 44B are radially spaced apart from the axis 22 as compared with the case of the above-described first embodiment. Therefore, in addition to attainment of actions and effects similar to those of the above-described first embodiment, the first and second resistance forces for attainment of a desired F-S characteristic can be ensured without need to increase friction forces of the first and second frictional engagement portions and a reaction force of elastic deformation to such an extent as in the case of the above-described first embodiment.

Fifth Embodiment

Figure 16:
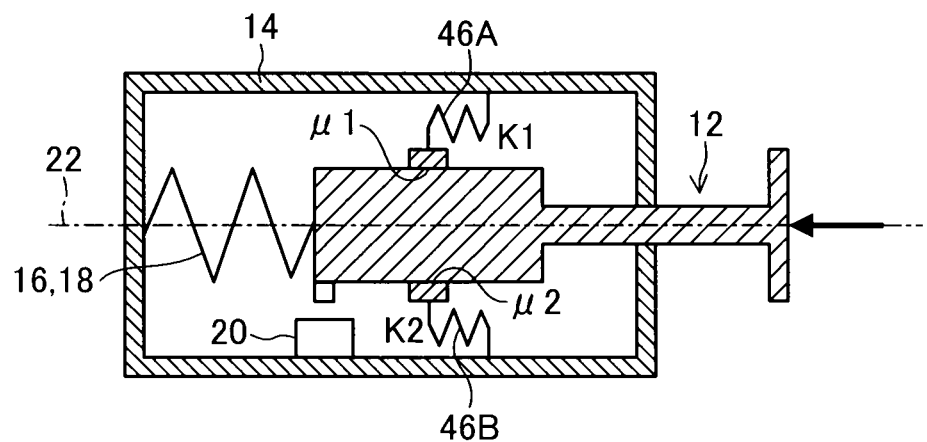
FIG. 16 is a horizontal sectional view showing, in a simplified fashion, a fifth embodiment of a pedal-operated operation device according to the present invention, the device being embodied as a drive-by-wire-type accelerator pedal device of an automobile.

FIG. 16 is a horizontal sectional view showing, in a simplified fashion, a fifth embodiment of a pedal-operated operation device according to the present invention, the device being embodied as a drive-by-wire-type accelerator pedal device of an automobile.

In the fifth embodiment, the pedal arm 12 is supported by the support housing 14 in such a manner as to be reciprocally movable along the center axis 12E. A first friction plate 46A and a second friction plate 46B function as first resistance force imposition means and second resistance force imposition means, respectively, for imposing a first resistance force and a second resistance force against a relative rectilinear motion of the pedal arm 12 relative to the support housing 14. The opening sensor 20 is a displacement sensor for detecting a relative rectilinear displacement, in a direction along the axis 22, of the pedal arm 12 relative to the support housing 14 to thereby detect the magnitude of operation of the pedal arm 12. Other configurational features of the fifth embodiment are similar to those of the above-described fourth embodiment.

Accordingly, a surface of the first friction plate 46A and a surface of the pedal arm 12 which are frictionally engaged with each other define a first friction surface pair for generating a first resistance force by means of a friction force. A surface of the second friction plate 46B and a surface of the pedal arm 12 which are frictionally engaged with each other define a second friction surface pair for generating a second resistance force by means of a friction force. The second friction plate 46B also functions as a displacement member which allows, through its elastic deformation, the second friction surface pair higher in the coefficient of static friction to move in association with the relative displacement of the pedal arm 12 relative to the support housing 14.

Thus, according to the illustrated fifth embodiment, in addition to attainment of actions and effects similar to those of the above-described first embodiment, even a reciprocating pedal-operated operation device can reliably attain a desired F-S characteristic.

Figure 17:
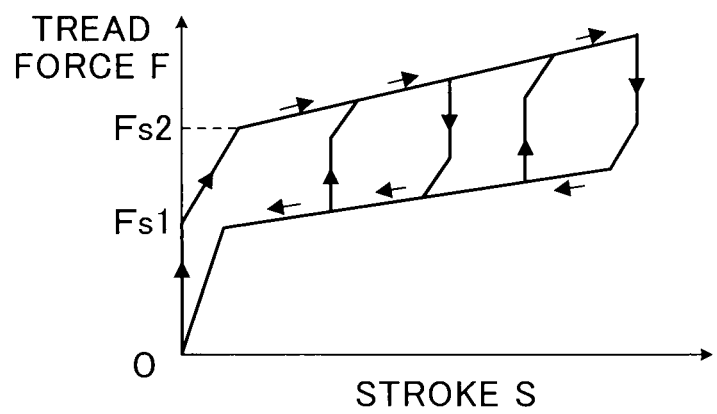
FIG. 17 is a graph showing hysteresis of the F-S characteristic curve in a modified embodiment, which is modified such that, as the angle of pivotal movement of the pedal arm relative to the support housing increases, the contact surface pressures of the first and second frictional engagement portions increase gradually.

In the above-described first to fifth embodiments, the contact surface pressures of the first and second frictional engagement portions are constant, irrespective of the angle of pivotal movement of the pedal arm 12 relative to the support housing 14. However, the present invention may be modified such that, as the angle of pivotal movement of the pedal arm 12 relative to the support housing 14 increases, the contact surface pressures of the first and second frictional engagement portions increase gradually. In this case, as the stroke S of the pedal portion 12C of the pedal arm 12 increases, the maximum static friction force of the first frictional engagement portion increases; thus, the hysteresis widths of the first and second frictional engagement portions increase gradually with the stroke S, for example, as shown in FIG. 17.

In the above-described first to fifth embodiments, the friction members, such as the first shim 32A and the second shim 32B, are not displaced relative to the support housing 14, but are displaced relative to the pedal arm 12 and are frictionally engaged with the pedal arm 12. However, this configuration may be modified as follows: the friction members are not displaced relative to the pedal arm 12, but are displaced relative to the support housing 14 and are frictionally engaged with the support housing 14.

In the above-described first to fifth embodiments, the friction members, such as the first shim 32A and the second shim 32B, are provided separately from the pedal arm 12 and the support housing 14. However, the friction members may be eliminated, and surface treatment and setting of elastic modulus similar to those conducted on the first shim 32A and the second shim 32B may be conducted directly on one or both of a region of the pedal arm 12 and a region of the support housing 14 which are frictionally engaged with each other.

In the above-described second embodiment, pressing forces exerted on the first shim 32A and the second shim 32B can be adjusted simultaneously. However, this configuration may be modified as follows: the contact surface pressures of two friction members, such as the first shim 32A and the second shim 32B, can be adjusted individually. In the above-described third to fifth embodiments, means for adjusting the contact surface pressures of friction members is not provided; however, this configuration may be modified so as to be able to adjust the contact surface pressures of the friction members simultaneously or individually.

Sixth Embodiment

Figure 18:
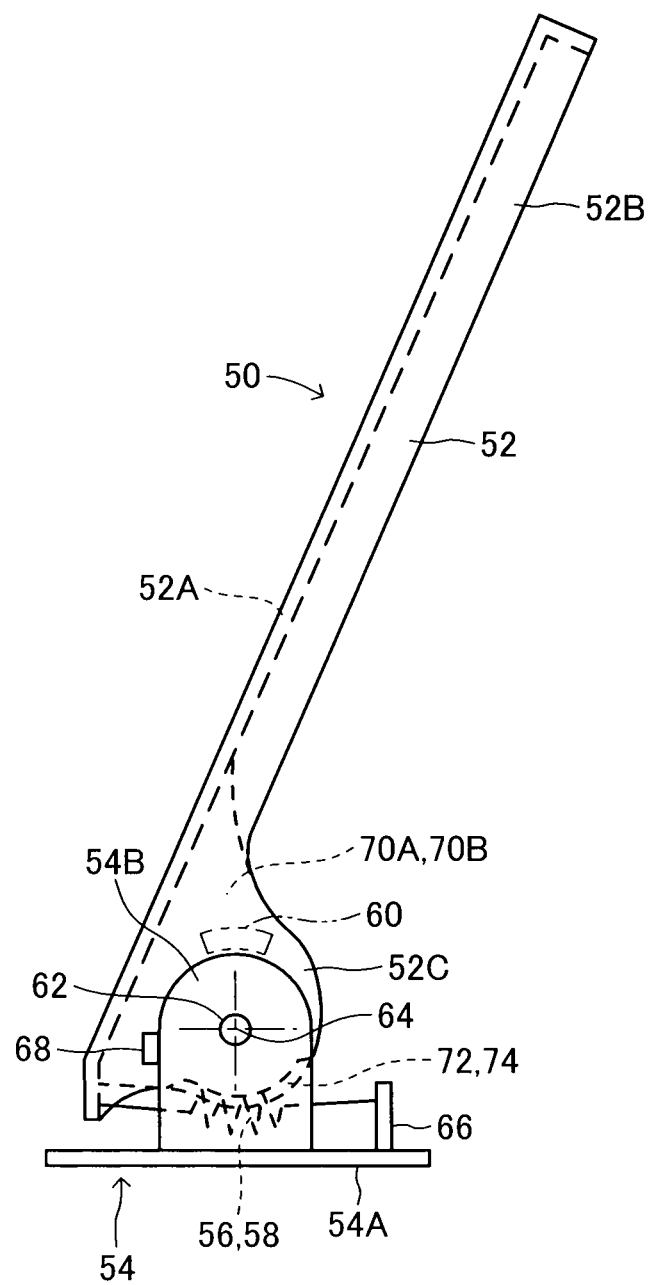
FIG. 18 is a side view showing a sixth embodiment of a pedal-operated operation device according to the present invention, the device being embodied as a drive-by-wire-type accelerator pedal device of an automobile.
Figure 19:
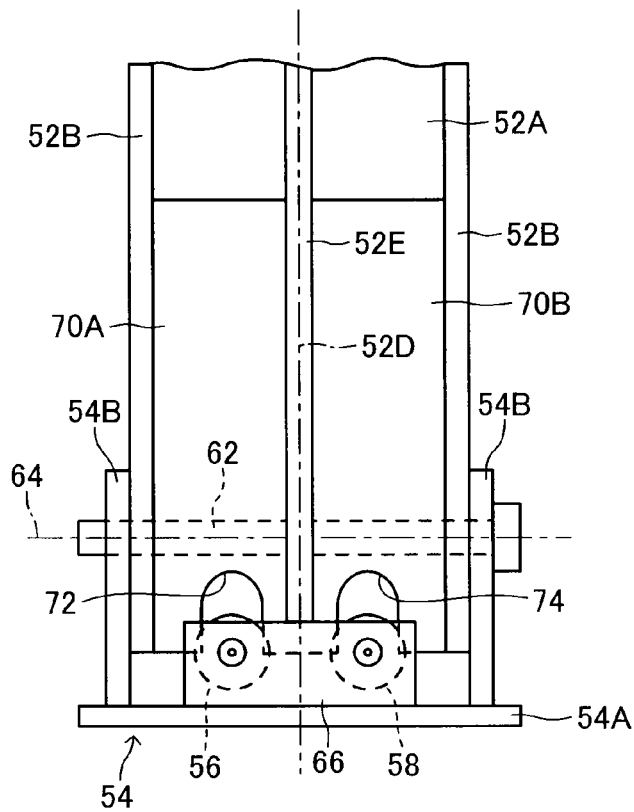
FIG. 19 is an enlarged partial rear view showing the sixth embodiment.
Figure 20:
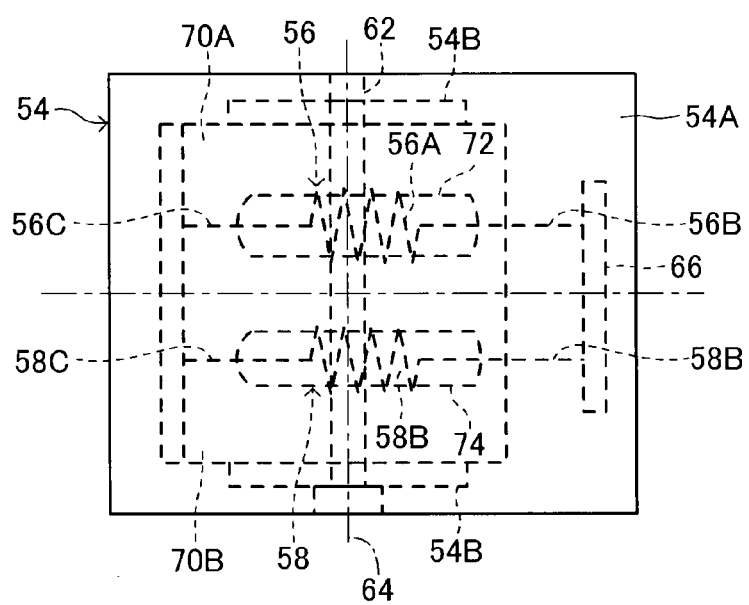
FIG. 20 is an enlarged partial bottom view showing the sixth embodiment

FIG. 18 is a side view showing a sixth embodiment of a pedal-operated operation device according to the present invention, the device being embodied as a drive-by-wire-type accelerator pedal device of an automobile. FIGS. 19 and 20 are an enlarged partial rear view and an enlarged partial bottom view, respectively, showing the sixth embodiment.

In these drawings, reference numeral 50 denotes an entire accelerator pedal device. The accelerator pedal device 50 has a pedal arm 52, which serves as an operating element to be foot-operated, and a support bracket 54, which serves as support means for supporting the pedal arm 52 in a pivotally movable manner. Also, the accelerator pedal device 50 has a first coil spring 56 and a second coil spring 58, which serve as a first return-urging means and a second return-urging means, respectively, for pivotally urging the pedal arm 52 relative to the support bracket 54 in a reverse direction of increase in the magnitude of operation of the pedal arm 52, and an opening sensor 60, which serves as means for detecting the magnitude of operation of the pedal arm 52.

In the sixth embodiment, the pedal arm 52 has a rectangular flat plate portion 52A and a peripheral wall portion 52B. The peripheral wall portion 52B extends along the periphery of the flat plate portion 52A and perpendicularly to the flat plate portion 52A on a side opposite the tread surface (upper surface as viewed in FIGS. 18 and 19) of the flat plate portion 52A. The peripheral wall portion 52B defines a pair of pivotal portions 52C of the pedal arm 52 at a lower end portion of the pedal arm 52. The pair of pivotal portions 52C extend in parallel with each other. In FIG. 20, reference numeral 52D denotes the centerline of width of the pedal arm 52. Reference numeral 52E denotes a reinforcement rib provided on the back surface of the flat plate portion 52A and extending along the centerline 52D.

The support bracket 54 has a base portion 54A in the form of a rectangular flat plate and fixed to an unillustrated vehicle body with bolts or the like, and a pair of trunnions 54B formed integral with the base portion 54A and extending perpendicularly from the base portion 54A and in parallel with each other. The pair of trunnions 54B are disposed on respectively far sides with respect to the pair of pivotal portions 52C of the pedal arm 52. A surface of each pivotal portion 52C and a surface of each trunnion 54B which face each other are set low in the coefficient of friction through reception of surface treatment, such as Teflon (registered trademark) lining.

A shaft member 62 extends along an axis 64 through the pair of pivotal portions 52C and the pair of trunnions 54B; thus, the pedal arm 52 is supported by the support bracket 54 in such a manner as to be pivotally movable about the axis 64. In order to prevent the shaft member 62 from coming out of the pivotal portion 52C and the trunnion 54B, although unillustrated, detachment prevention means, such as a nut, a pin, or a C-ring, is attached to an end portion of the shaft member 62 opposite a head portion of the shaft member 62.

A spring attachment plate 66 is formed integral with the base portion 54A of the support bracket 54. A first coil spring 56 has nonelastic portions 56B and 56C at respective opposite ends of a coil 56A; is attached, at the distal end of the nonelastic portion 56B, to the spring attachment plate 66; and is attached, at the distal end of the nonelastic portion 56C, to the lower end of the flat plate portion 52A of the pedal arm 52. Similarly, a second coil spring 58 has nonelastic portions 58B and 58C at respective opposite ends of a coil 58A; is attached, at the distal end of the nonelastic portion 58B, to the spring attachment plate 66; and is attached, at the distal end of the nonelastic portion 58C, to the lower end of the flat plate portion 52A of the pedal arm 52. The first coil spring 56 and the second coil spring 58 are spaced apart from each other in a direction along the axis 64 and extends in a direction which crosses the axis 64 as viewed from above.

The first coil spring 56 and the second coil spring 58 are tension coil springs; thus, the pedal arm 52 is urged counterclockwise about the axis 64 as viewed in FIG. 18. The outer surfaces of the paired pivotal portions 52C of the pedal arm 52 have respective stoppers 68 integrally formed thereon. In a state in which a tread force is not imposed on the pedal arm 52, the stoppers 68 are in contact with peripheral portions of the respective trunnions 54B of the support bracket 54, thereby positioning the pedal arm 52 at its initial position relative to the support bracket 54.

A first sliding contact member 70A, which functions as first resistance force generation means, and a second sliding contact member 70B, which functions as second resistance force generation means, are fixed to a lower end portion of the pedal arm 52 on a side opposite a tread surface. The sliding contact members 70A and 70B gradually increase in thickness toward their lower ends and have a first sliding contact groove 72 and a second sliding contact groove 74, respectively, formed at their lower end portions. The first and second sliding contact grooves 72 and 74 are spaced apart from each other in a direction along the axis 64 and extend in a direction which crosses the axis 64 as viewed from above.

The first and second sliding contact grooves 72 and 74 each have a substantially semicircular or U-shaped cross section and receive the coil 56A of the first coil spring 56 and the coil 58A of the second coil spring 58, respectively, in such a state as to slightly press the coils 56A and 58A downward in the drawing. Furthermore, the first and second sliding contact grooves 72 and 74 have a sufficient length to receive the coil 56A of the first coil spring 56 and the coil 58A of the second coil spring 58 in a state of contact over their whole length even when the first and second coil springs 56 and 58 expand and contract in association with a pivotal movement of the pedal arm 52 relative to the support bracket 54.

The first and second sliding contact grooves 72 and 74 extend in a substantially arcuate fashion about the axis 64; however, the distance between the axis 64 and the bottom of each of the first and second sliding contact grooves 72 and 74 gradually increases toward the right as viewed in FIG. 18. Accordingly, as the pedal arm 52 pivotally moves, from the initial position, clockwise about the axis 64 as viewed in FIG. 18, the forces with which the first and second sliding contact grooves 72 and 74 press downward the first and second coil springs 56 and 58, respectively, gradually increase.

As shown in detail in FIG. 20, the first coil spring 56 has a coil portion 56A and a straight-line portion 56B, 56C which are integral with each other; is attached, at the distal end of the straight-line portion 56C, to the lower end of the flat plate portion 52A of the pedal arm 52; and is attached, at the distal end of the straight-line portion 56B, to the spring attachment plate 66. The straight-line portions 56B and 56C are substantially not elastically deformed in an expansion-contraction direction of the spring. The first sliding contact groove 72 comes into contact with an end portion of the coil portion 56A of the first coil spring 56 located on a side toward the straight-line portion 56B, irrespective of the pivotal movement position of the pedal arm 52. The second coil spring 58 has the same structural feature as the first coil spring 56.

Furthermore, in the present embodiment, the pedal arm 52, the support bracket 54, and the sliding contact members 70A and 70B may be formed of either resin or metal. However, preferably, at least the sliding contact members 70A and 70B are formed of resin. Preferably, the elastic modulus K1 of a resin used to form the sliding contact member 70A is relatively high, and the elastic modulus K2 of a resin used to form the sliding contact member 70B is lower than the elastic modulus K1 of the resin used to form the sliding contact member 70A.

The first and second sliding contact grooves 72 and 74 of the sliding contact members 70A and 70B are set low in the coefficient of friction through reception of surface treatment, such as Teflon (registered trademark) lining. Particularly, the coefficient of static friction of the first sliding contact groove 72 against the first coil spring 56 (first coefficient of static friction µs1) is set lower than the coefficient of static friction of the second sliding contact groove 74 against the second coil spring 58 (second coefficient of static friction µs2).

A pressing force with which the first coil spring 56 presses the first sliding contact groove 72 and a pressing force with which the second coil spring 58 presses the second sliding contact groove 74 are substantially equivalent to each other. Accordingly, the maximum static friction force between the second coil spring 58 and the second sliding contact groove 74 is greater than the maximum static friction force between the first coil spring 56 and the first sliding contact groove 72.

Thus, a surface of the first sliding contact groove 72 of the first sliding contact member 70A and a surface of the first coil spring 56 which are frictionally engaged with each other define a first friction surface pair for generating a first resistance force by means of a friction force. A surface of the second sliding contact groove 74 of the second sliding contact member 70B and a surface of the second coil spring 58 which are frictionally engaged with each other define a second friction surface pair for generating a second resistance force by means of a friction force. The second sliding contact member 70B also functions as a displacement member which allows, through its elastic deformation, the second friction surface pair higher in the coefficient of static friction to move in association with the relative displacement of the pedal arm 12 relative to the support bracket 54.

Figure 21:
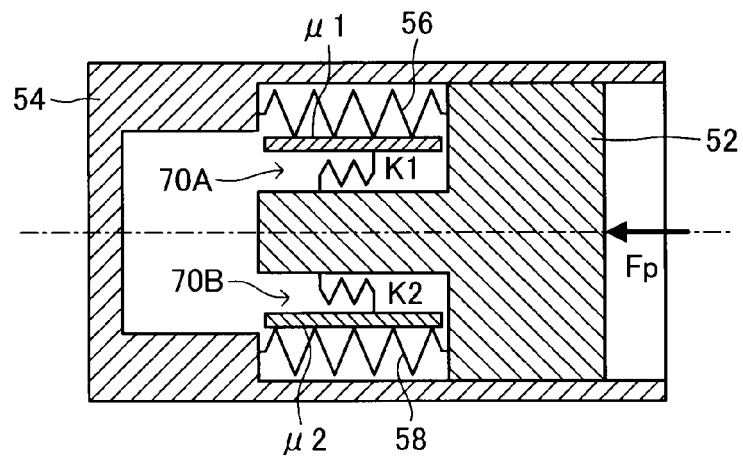
FIG. 21 is an explanatory view showing the accelerator pedal device of the sixth embodiment which is modeled as a device of rectilinear motion, showing a state in which the pedal arm is not displaced relative to the support housing.
Figure 22:
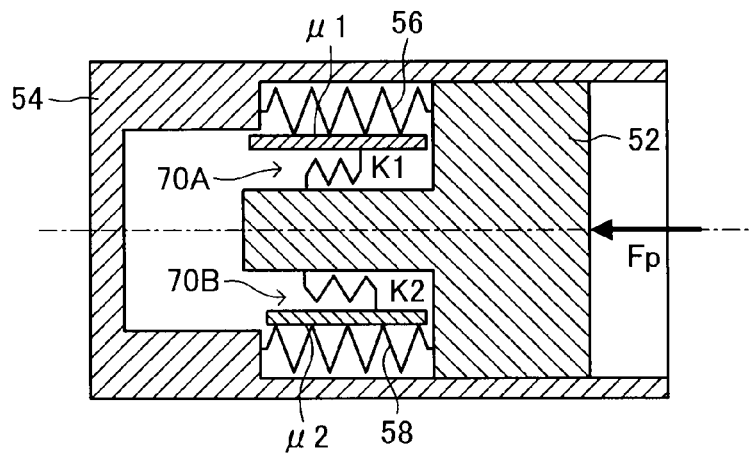
FIG. 22 is an explanatory view showing the accelerator pedal device of the sixth embodiment which is modeled as a device of rectilinear motion, showing a state in which the pedal arm is slightly displaced relative to the support housing.
Figure 23:
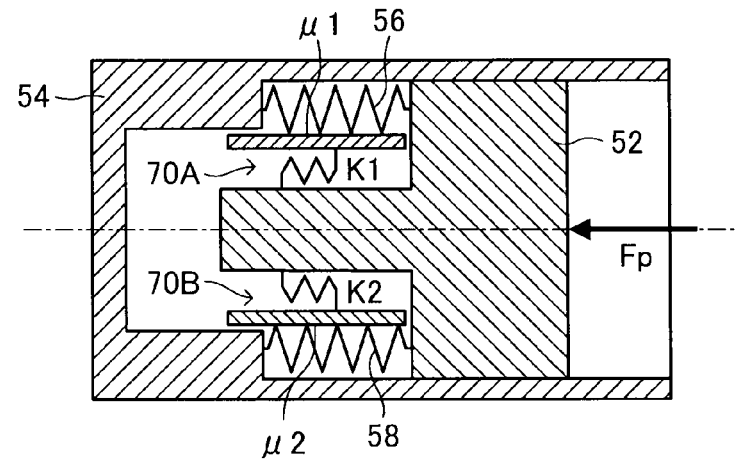
FIG. 23 is an explanatory view showing the accelerator pedal device of the sixth embodiment which is modeled as a device of rectilinear motion, showing a state in which the pedal arm is relatively greatly displaced relative to the support housing.

As will be understood from the above description, the accelerator pedal device 50 of the sixth embodiment can be modeled as a device of rectilinear motion as shown in FIGS. 21 to 23.

In the sixth embodiment, when a driver imposes a tread force Fp on the pedal arm 52, the pedal arm 52 attempts to pivotally move, from the initial position, clockwise about the axis 64 as viewed in FIG. 18, and attempts to move leftward relative to the support bracket 54 as viewed in FIGS. 21 to 23. However, the first sliding contact groove 72 is frictionally engaged with an end portion of the coil portion of the first coil spring 56 located on a side toward the straight-line portion of the first coil spring 56. Accordingly, when a force exerted on the first sliding contact groove 72 relative to the coil portion of the first coil spring 56 is equal to or less than the maximum static friction force therebetween, the pedal arm 52 does substantially not pivotally move as viewed in FIG. 18 and, as shown in FIG. 21, does not move relative to the support bracket 54.

When a force exerted on the first sliding contact groove 72 relative to the coil portion of the first coil spring 56 exceeds the maximum static friction force therebetween, the coil portion 56A of the first coil spring 56 is displaced relative to the first sliding contact groove 72. Accordingly, the pedal arm 52 pivotally moves about the axis 64 as viewed in FIG. 18 and, as shown in FIG. 22, moves leftward relative to the support bracket 54.

However, since the second sliding contact groove 74 is frictionally engaged with the coil portion 58A of the second coil spring 58, at this frictional engagement portion, the second coil spring 58 is not displaced relative to the second sliding contact groove 74, and the coil portion 58A of the second coil spring 58 expands through elastic deformation of the sliding contact member 70B. Thus, in this state, the spring forces which attempt to return the pedal arm 52 to the initial position are a spring force of the first coil spring 56, a spring force of the second coil spring 58, and a spring force of the sliding contact member 70B.

When a force exerted on the second sliding contact groove 74 relative to the coil portion of the second coil spring 58 exceeds the maximum static friction force therebetween, as shown in FIG. 23, the coil portion 58A of the second coil spring 58 is displaced relative to the second sliding contact groove 74. Thus, in this state, the coil portion 58A of the second coil spring 58 expands without involvement of elastic deformation of the sliding contact member 70B, so that the spring forces which attempt to return the pedal arm 52 to the initial position are a spring force of the first coil spring 56 and a spring force of the second coil spring 58. Accordingly, also, in the sixth embodiment, the relation between the tread force F imposed on the pedal arm 52 by a driver in a process of increase in the tread force F from 0 and the stroke S of the center of the tread surface of the flat plate portion 52A is similar to that in the above-described first embodiment; i.e., the F-S characteristic is a two-bend characteristic as shown in FIG. 6.

In the sixth embodiment, as the stroke S of the pedal arm 52 increases, the forces with which the sliding contact members 70 press the first coil spring 56 and the second coil spring 58, respectively, increase gradually, so that the friction forces between the sliding contact members 70A and 70B and the first and second coil springs 56 and 58 increase gradually. Thus, the F-S characteristic curve in a process of increase and decrease in tread force imposed on the pedal arm 52 follows a hysteresis curve as shown in FIG. 17. Therefore, the sixth embodiment can also yield actions and effects similar to those of the above-described first to fifth embodiments. Additionally, the hysteresis width of the F-S characteristic curve can be increased with the stroke S of the pedal arm 52.

In the sixth embodiment, major forces which attempt to return the pedal arm 52 to the initial position are, in the second linear region L2 of FIG. 6, a spring force of the first coil spring 56, a spring force of the second coil spring 58, and a spring force of the sliding contact member 70B, and are, in the third linear region L3 of FIG. 6, a spring force of the first coil spring 56 and a spring force of the second coil spring 58. Therefore, the first coil spring 56 and the second coil spring 58 may have the same spring constant or different spring constants.

In the sixth embodiment, the first sliding contact member 70A and the second sliding contact member 70B of different materials are provided as resistance force generation means in sliding contact with the first coil spring 56 and the second coil spring 58, respectively. However, this configuration may be as follows: while the first sliding contact member 70A and the second sliding contact member 70B are formed of the same material or are formed integral with each other, the elastic modulus K2 of the sliding contact member as measured in the vicinity of the second sliding contact groove 74 is set lower than the elastic modulus K1 of the sliding contact member as measured in the vicinity of the first sliding contact groove 72 by means of irregularities, such as slits.

Seventh Embodiment

Figure 24:
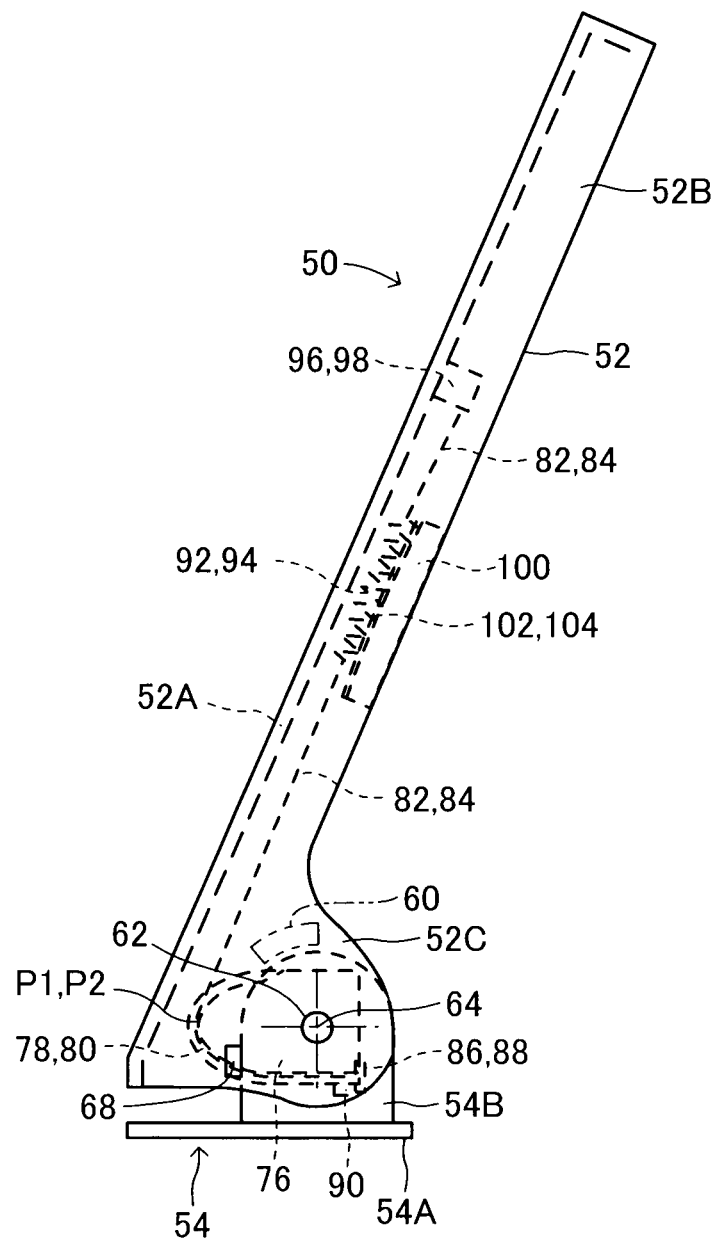
FIG. 24 is a side view showing a seventh embodiment of a pedal-operated operation device according to the present invention, the device being embodied as a drive-by-wire-type accelerator pedal device of an automobile.
Figure 25:
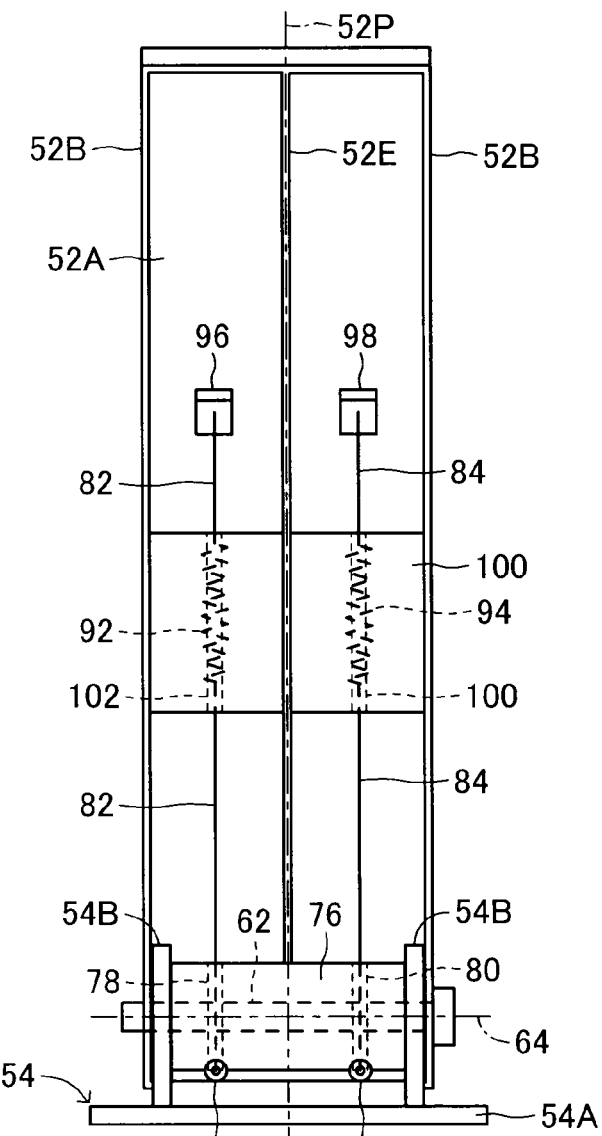
FIG. 25 is a rear view showing the seventh embodiment.

FIG. 24 is a side view showing a seventh embodiment of a pedal-operated operation device according to the present invention, the device being embodied as a drive-by-wire-type accelerator pedal device of an automobile. FIG. 25 is a rear view showing the seventh embodiment. In FIGS. 24 and 25, members similar to those appearing in FIGS. 18 to 20 are denoted by like reference numerals used in FIGS. 18 to 20, and this convention is applied to other embodiments to be described later.

In the seventh embodiment, the pedal arm 52 and the support bracket 54 are configured similarly to those of the above-described sixth embodiment. However, the trunnions 54B of the support bracket 54 are disposed on respectively near sides with respect to the pivotal portions 52C of the pedal arm 52. A surface of each pivotal portion 52C and a surface of each trunnion 54B which face each other are set low in the coefficient of friction through reception of surface treatment, such as Teflon (registered trademark) lining.

A stationary cam member 76 is disposed between the paired trunnions 54B and is fixed at its opposite ends to the respective trunnions 54B. Thus, the shaft member 62 of the present embodiment extends along the axis 64 through the paired pivotal portions 52C, the paired trunnions 54B, and the stationary cam member 76. The stationary cam member 76 has a cross-sectional shape consisting of a semi-ellipse and a rectangle, which extends from the semi-ellipse and is disposed in such a manner that the major axis of the semi-ellipse of the cross section extends horizontally.

Two cam grooves 78 and 80 are formed on the surface of the stationary cam member 76, excluding the upper surface and end surfaces of a portion having the rectangular cross section, in such a manner as to be spaced apart from each other in a direction along the axis 64. Each of the cam grooves 78 and 80 has a semicircular or U-shaped sectional shape and extends about the axis 64. Wires 82 and 84 are looped around and mounted in the cam grooves 78 and 80, respectively. Stopper rings 86 and 88 are fixed to one ends of the wires 82 and 84, respectively. The wires 82 and 84 are formed of a material which is flexible, but neither expands nor contracts. The one ends of the wires 82 and 84 are fixed to the stationary cam member 76 by means of a stopper 90 which is fixed to the bottom surface of a portion having a rectangular cross section of the stationary cam member 76 with unillustrated screws.

A first tension coil spring 92, which serves as first return-urging means, and a second tension coil spring 94, which serves as second return-urging means, are connected to intermediate portions of the wires 82 and 84, respectively. The tension coil springs 92 and 94 extend in parallel with each other along the longitudinal direction of the pedal arm 52. The other ends of the wires 82 and 84 are fixed to the back surface of the flat plate portion 52A of the pedal arm 52 by means of fixing members 96 and 98, respectively.

A sliding contact member 100, which functions as first and second resistance force generation means, is fixed to the peripheral wall portion 52B on the back side of the flat plate portion 52A of the pedal arm 52. The sliding contact member 100 has a semicylindrical shape. A first sliding contact groove 102 and a second sliding contact groove 104 are provided on the ridge surface of the sliding contact member 100 which faces the flat plate portion 52A, in such a manner as to extend along the longitudinal direction of the pedal arm 52 and to be spaced apart from each other. Each of the sliding contact grooves 102 and 104 has a semicircular or U-shaped cross section and receive the first tension coil spring 92 and the second tension coil spring 94, respectively, in such a manner that the tension coil springs 92 and 94 are reciprocally movable.

The wall surfaces of the sliding contact groove 104 of the sliding contact member 100 have irregularities, such as a plurality of slits, formed thereon and extending along the extending direction of the groove. By virtue of this structural feature, in terms of elastic deformation in the expansion-contraction direction of the tension coil springs 92 and 94, the elastic modulus K2 of a portion of the sliding contact member 100 in the vicinity of the wall surfaces of the sliding contact groove 104 is set lower than the elastic modulus K1 of a portion of the sliding contact member 100 in the vicinity of the wall surfaces of the sliding contact groove 102.

The first and second sliding contact grooves 102 and 104 have a sufficient length to receive the first tension coil spring 92 and the second tension coil spring 94 in a state of contact over their whole length even when the first and second tension coil springs 92 and 94 expand and contract in association with a pivotal movement of the pedal arm 52 relative to the support bracket 54.

The shaft member 62 extends along the axis 64 through the paired pivotal portions 52C, the paired trunnions 54B, and the stationary cam member 76. By virtue of this structural feature, the pedal arm 52 is supported by the support bracket 54 in such a manner as to be pivotally movable about the axis 64. However, in the present embodiment, the shaft member 62 is located at a position which is biased from the center of a semi-elliptic portion of the stationary cam member 76 toward a rectangular portion of the stationary cam member 76.

Thus, as viewed in FIG. 24, when P1 and P2 represent a point of contact between the cam groove 78 and the wire 82 and a point of contact between the cam groove 80 and the wire 84, respectively, as the stroke of the pedal arm 52 from the initial position increases, the distance from the points of contact P1 and P2 to the axis 64 decreases gradually. Accordingly, as the stroke of the pedal arm 52 increases, forces with which the wires 82 and 84 press the first and second sliding contact grooves 102 and 104, respectively, increase gradually, so that friction forces between the wires 82 and 84 and the first and second sliding contact grooves 102 and 104, respectively, increase gradually.

Furthermore, also, in the present embodiment, the pedal arm 52, the stationary cam member 76, and the sliding contact member 100 may be formed of either resin or metal. However, preferably, at least the sliding contact member 100 is formed of resin. The first and second sliding contact grooves 102 and 104 of the sliding contact member 100 are set low in the coefficient of friction through reception of surface treatment, such as Teflon (registered trademark) lining. Particularly, the coefficient of static friction of the first sliding contact groove 102 against the wire 82 (first coefficient of static friction $\mu s1$) is set lower than the coefficient of static friction of the second sliding contact groove 104 against the wire 84 (second coefficient of static friction $\mu s2$).

A pressing force with which the first tension coil spring 92 presses the first sliding contact groove 102 and a pressing force with which the second tension coil spring 94 presses the second sliding contact groove 104 are substantially equivalent to each other. Accordingly, the maximum static friction force between the second tension coil spring 94 and the second sliding contact groove 104 is greater than the maximum static friction force between the first tension coil spring 92 and the first sliding contact groove 102.

Notably, in order to greatly lower the coefficient of friction between the cam grooves 78 and 80 and the wires 82 and 84, a lubricant, such as grease, is applied to the cam grooves 78 and 80. Although unillustrated, the fixing members 96 and 98 may be provided with respective adjustment devices for adjusting spring forces of the tension coil springs 92 and 94 when the pedal arm 52 is positioned at the initial position.

Thus, a surface of the first sliding contact groove 102 of the sliding contact member 100 and a surface of the first tension coil spring 92 which are frictionally engaged with each other define a first friction surface pair for generating a first resistance force by means of a friction force. A surface of the second sliding contact groove 104 of the sliding contact member 100 and a surface of the second tension coil spring 94 which are frictionally engaged with each other define a second friction surface pair for generating a second resistance force by means of a friction force. A portion of the sliding contact member 100 which is peripheral to the second sliding contact groove 104 also functions as a displacement member which allows, through its elastic deformation, the second friction surface pair higher in the coefficient of static friction to move in association with the relative displacement of the pedal arm 12 relative to the support bracket 54.

Other configurational features of the seventh embodiment are similar to those of the above-described sixth embodiment. Accordingly, although the first tension coil spring 92 and the second tension coil spring 94 are disposed between the pedal arm 52 and the support bracket 54 via the wires 82 and 84, respectively, the seventh embodiment operates in a manner similar to that of the above-described sixth embodiment. Therefore, the seventh embodiment can yield actions and effects similar to those of the above-described sixth embodiment.

Figure 26:
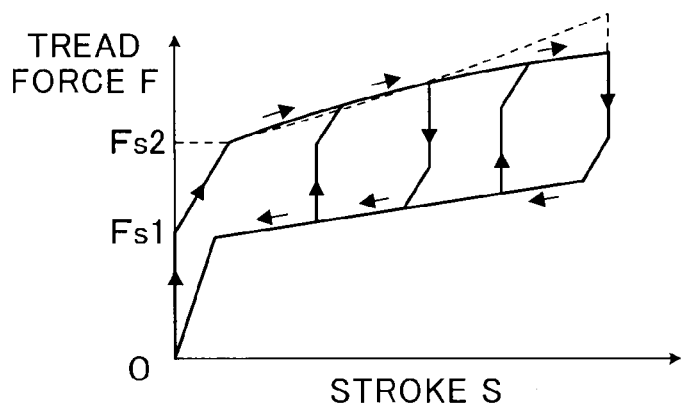
FIG. 26 is a graph showing hysteresis of the F-S characteristic curve in the seventh embodiment.

Particularly, according to the seventh embodiment, as the stroke of the pedal arm 52 increases, the forces with which the wires 82 and 84 press the first and second sliding contact grooves 102 and 104, respectively, increase gradually; however, as the stroke increases, the rate of increase in the pressing forces decrease gradually. Thus, the F-S characteristic curve in the seventh embodiment follows a hysteresis curve as represented with the solid line in FIG. 26.

Meanwhile, through selection of a relevant shape for the stationary cam member 76, the following operational feature can be attained: as the stroke of the pedal arm 52 increases, the rate of increase in the forces with which the wires 82 and 84 press the first and second sliding contact grooves 102 and 104, respectively, increase gradually. In this case, the F-S characteristic curve follows a hysteresis curve as represented with the dashed line in FIG. 26.

The seventh embodiment described above is provided with only a single sliding contact member 100 which serves as first and second resistance force generation means in sliding contact with the tension coil springs 92 and 94, respectively. However, similar to the first sliding contact member 70A and the second sliding contact member 70B in the above-described sixth embodiment, a first sliding contact member and a second sliding contact member formed of different materials may be provided as first and second resistance force generation means in sliding contact with the tension coil springs 92 and 94, respectively.

Eighth Embodiment

Figure 27:
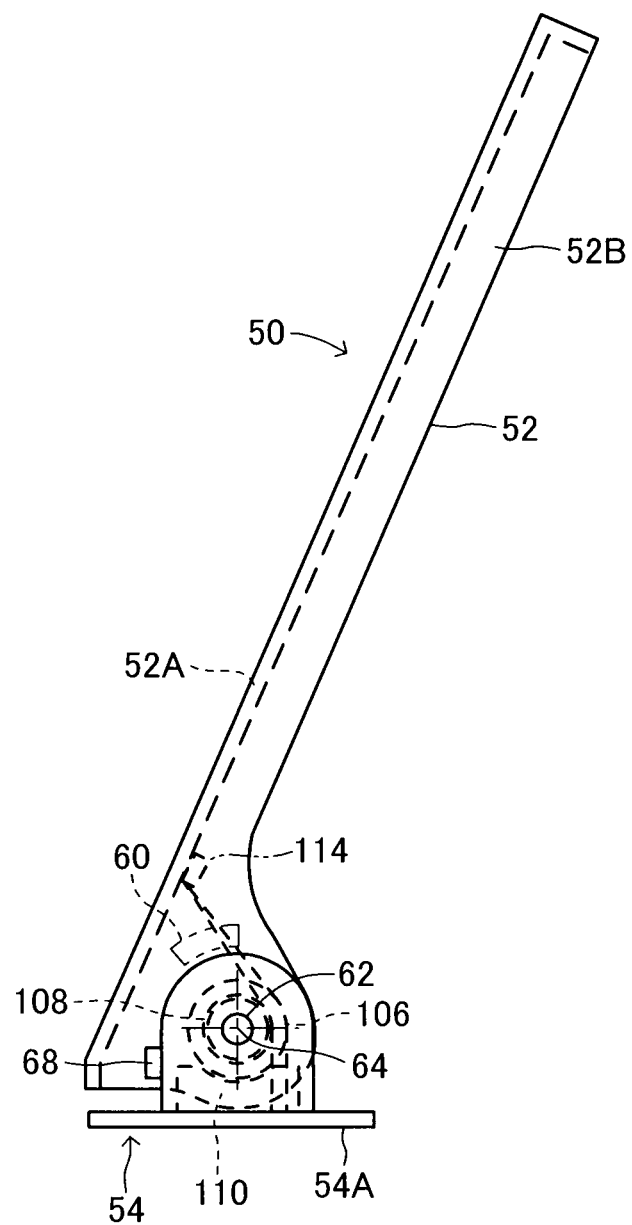
FIG. 27 is a side view showing an eighth embodiment of a pedal-operated operation device according to the present invention, the device being embodied as a drive-by-wire-type accelerator pedal device of an automobile.
Figure 28:
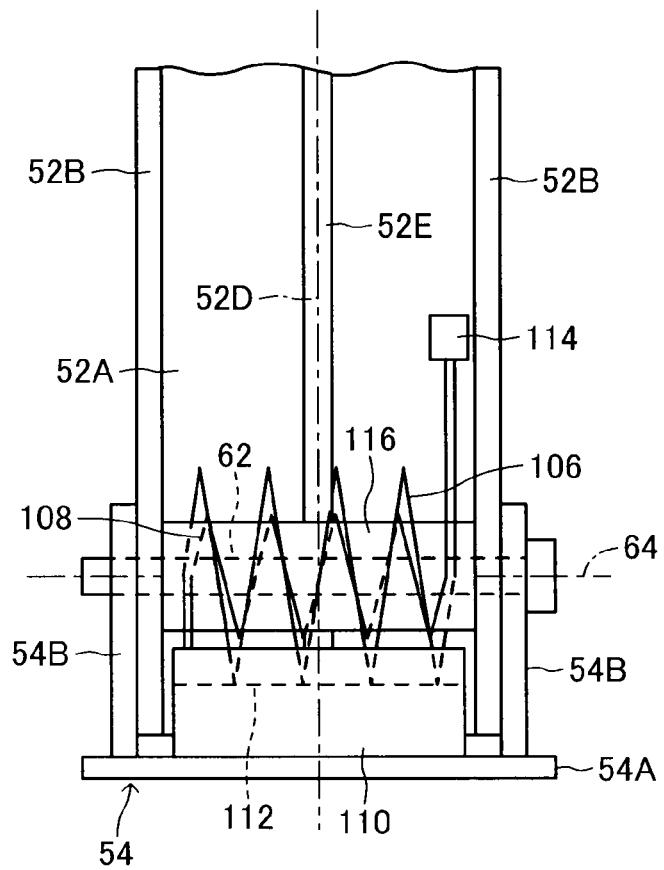
FIG. 28 is an enlarged partial rear view showing the eighth embodiment.

FIG. 27 is a side view showing an eighth embodiment of a pedal-operated operation device according to the present invention, the device being embodied as a drive-by-wire-type accelerator pedal device of an automobile. FIG. 28 is an enlarged partial rear view showing the eighth embodiment.

In the eighth embodiment, a first coil spring 106, which serves as a first return-urging means, and a second coil spring 108, which serves as a second return-urging means, are disposed around the shaft member 62. The coil springs 106 and 108 are torsion coil springs; are aligned with the axis 64; and extend concentrically with each other. The coil spring 106 is located on the outside of the coil spring 108, and is separated from the coil spring 108 in the radial direction.

Figure 29:
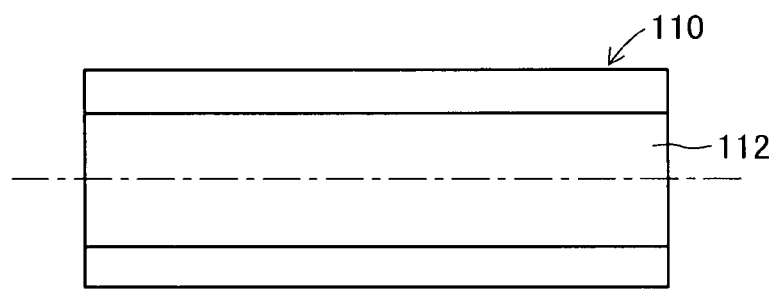
FIG. 29 is a plan view showing a sliding contact member.
Figure 30:
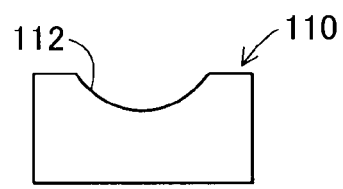
FIG. 30 is an end view showing the sliding contact member.

A sliding contact member 110, which is formed of resin and functions as a first resistance force generation means, is fixed on the upper surface of the base portion 54A of the support bracket 54. As shown in FIGS. 29 and 30, the sliding contact member 110 has a sliding contact groove 112 formed on the upper surface of the sliding contact member 110 and having an arcuate cross section. One ends of the coil springs 106 and 108 are fixed to the sliding contact member 110 or the base portion 54A of the support bracket 54, and the other ends are attached to the back surface of the flat plate portion 52A of the pedal arm 52 by means of a fixing member 114. A cylindrical sleeve 116, which is formed of resin and functions as a second resistance force generation means, is fixedly fitted onto the shaft member 62. The sleeve 116 extends between the paired pivotal portions 52C and around the shaft member 62.

The coil springs 106 and 108 are in contact with the sliding contact groove 112 and the sleeve 116, respectively, over substantially the whole length between one end and the other end of a coil portion of each of the coil springs 106 and 108, and slightly press the sliding contact groove 112 and the sleeve 116 radially outward and radially inward, respectively. The coil spring 106 is disposed in such a manner that, as the angle of pivotal movement of the pedal arm 52 from the initial position increases, the coil spring 106 is elastically deformed in a coil-unwinding direction to thereby be gradually increased in diameter. By contrast, the coil spring 108 is disposed in such a manner that, as the angle of pivotal movement of the pedal arm 52 from the initial position increases, the coil spring 108 is elastically deformed in a coil-winding direction to thereby be gradually decreased in diameter.

Accordingly, as the angle of pivotal movement of the pedal arm 52 from the initial position increases, forces with which the coil springs 106 and 108 press the sliding contact groove 112 and the sleeve 116, respectively, increase gradually, so that friction forces between the coil springs 106 and 108 and the sliding contact groove 112 and the sleeve 116 increase gradually. Straight-line portions of the coil springs 106 and 108 between the fixing member 114 and the coil portions of the coil springs 106 and 108 may be reinforced so as not to be excessively bent.

Also, in the present embodiment, the elastic modulus K1 of a resin used to form the sliding contact member 110 is relatively high, and the elastic modulus K2 of a resin used to form the sleeve 116 is set lower than the elastic modulus K1 of the resin used to form the sliding contact member 110. The sleeve 116 is located closer to the axis 64 than is the sliding contact member 110; thus, the amount of elastic deformation of the sleeve 116 in a circumferential direction may be smaller than the amount of elastic deformation of the sliding contact member 110 in a circumferential direction. Therefore, the difference between the elastic modulus K1 of a resin used to form the sliding contact member 110 and the elastic modulus K2 of a resin used to form the sleeve 116 may be smaller than the difference in elastic modulus between the sliding contact members 70A and 70B in the above-described sixth embodiment.

The sliding contact groove 112 and the outer surface of the sleeve 116 are set low in the coefficient of friction through reception of surface treatment, such as Teflon (registered trademark) lining. Particularly, the coefficient of static friction of the sliding contact groove 112 against the coil spring 106 (first coefficient of static friction $\mu s1$) is set lower than the coefficient of static friction of the outer surface of the sleeve 116 against the coil spring 108 (second coefficient of static friction $\mu s2$).

A pressing force with which the first coil spring 106 presses the sliding contact groove 112 and a pressing force with which the second coil spring 108 presses the outer surface of the sleeve 116 are substantially equivalent to each other. Accordingly, the maximum static friction force between the second coil spring 108 and the outer surface of the sleeve 116 is greater than the maximum static friction force between the first coil spring 106 and the sliding contact groove 112.

Thus, a surface of the sliding contact groove 112 of the sliding contact member 110 and a surface of the first coil spring 106 which are frictionally engaged with each other define a first friction surface pair for generating a first resistance force by means of a friction force. An outer surface of the sleeve 116 and a surface of the second coil spring 108 which are frictionally engaged with each other define a second friction surface pair for generating a second resistance force by means of a friction force. The sleeve 116 also functions as a displacement member which allows, through its elastic deformation, the second friction surface pair higher in the coefficient of static friction to move in association with the relative displacement of the pedal arm 12 relative to the support bracket 54.

Other configurational features of the eighth embodiment are similar to those of the above-described sixth and seventh embodiments. Accordingly, the eighth embodiment operates in a manner similar to that of the above-described sixth and seventh embodiments, except that the direction of sliding of the first coil spring 106 against the sliding contact groove 112 and the direction of sliding of the second coil spring 108 against the outer surface of the sleeve 116 are a circumferential direction around the axis 64 and that the direction of elastic deformation of the first coil spring 106 in the sliding contact groove 112 and the direction of elastic deformation of the second coil spring 108 on the outer surface of the sleeve 116 are a circumferential direction around the axis 64. Therefore, the eighth embodiment can yield actions and effects similar to those of the above-described sixth embodiment.

Ninth Embodiment

Figure 31:
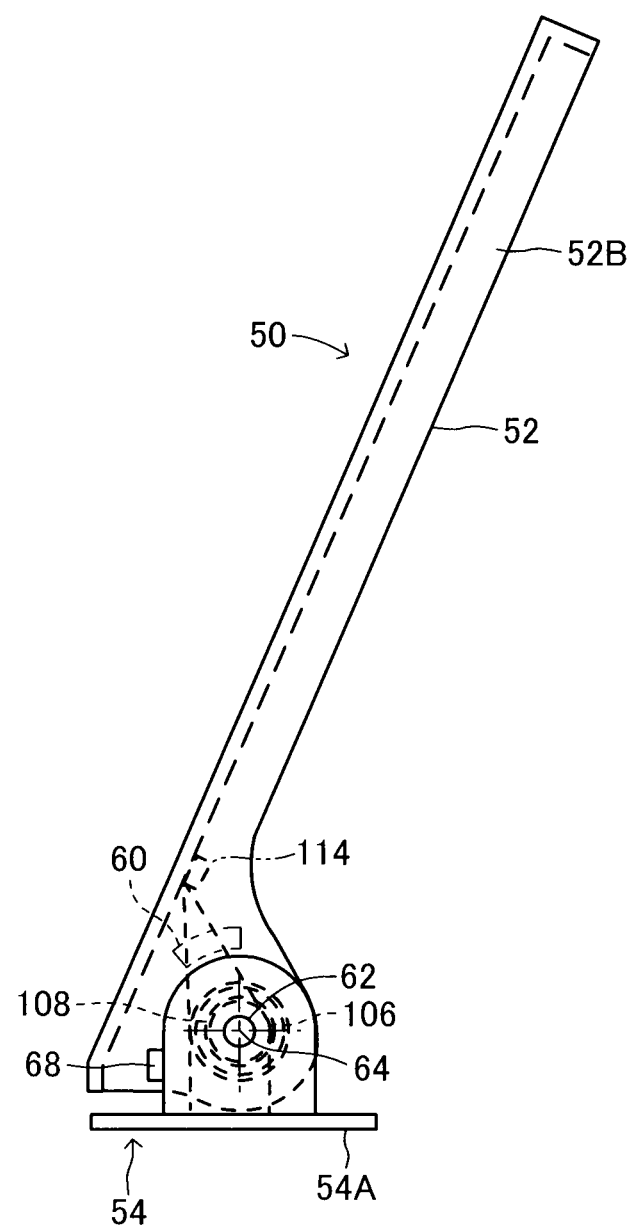
FIG. 31 is a side view showing a ninth embodiment of a pedal-operated operation device according to the present invention, the device being embodied as a drive-by-wire-type accelerator pedal device of an automobile.
Figure 32:
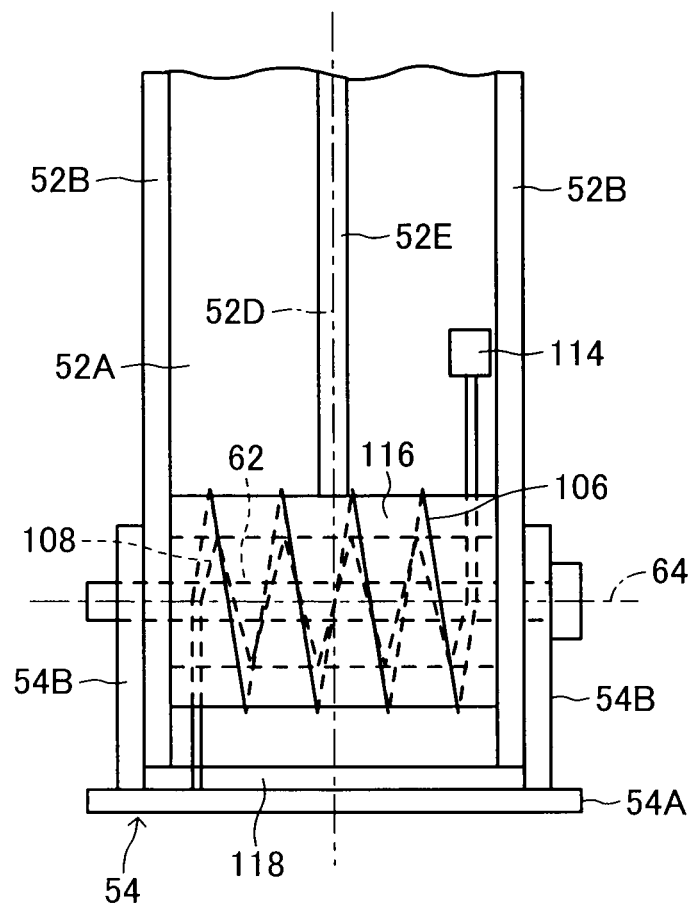
FIG. 32 is an enlarged partial rear view showing the ninth embodiment.

FIG. 31 is a side view showing a ninth embodiment of a pedal-operated operation device according to the present invention, the device being embodied as a drive-by-wire-type accelerator pedal device of an automobile. FIG. 32 is an enlarged partial rear view showing the ninth embodiment.

In the ninth embodiment, the cylindrical sleeve 116 of resin is provided; however, the sliding contact member 110 in the eighth embodiment is not provided. The sleeve 116 surrounds the shaft member 62 in a loosely fitted condition and is fixed, at its opposite ends, to the peripheral wall portion 52B of the pedal arm 52. The first coil spring 106, which serves as a first return-urging means, is disposed at the outside of the sleeve 116. The second coil spring 108, which serves as a second return-urging means, is disposed between the sleeve 116 and the shaft member 62. One ends of the coil springs 106 and 108 are fixed to the upper surface of the base portion 54A of the support bracket 54 by means of a fixing member 118, and the other ends are fixed to the back surface of the flat plate portion 52A of the pedal arm 52 by means of the fixing member 114.

Straight-line portions of the coil springs 106 and 108 between the fixing member 114 and the coil portions of the coil springs 106 and 108 may be reinforced so as not to be excessively bent. Although unillustrated, straight-line portions of the coil spring 108 extend through cutouts provided at end portions of the sleeve 116.

The coil springs 106 and 108 are in contact with the outer surface and the inner surface, respectively, of the sleeve 116 over substantially the whole length between one end and the other end of a coil portion of each of the coil springs 106 and 108, and slightly press the sleeve 116 radially inward and outward, respectively. Thus, the sleeve 116 functions on its outer-surface side as a first slide friction portion of a first resistance force generation means and as a first elastic deformation portion and functions on its inner-surface side as a second slide friction portion of a second resistance force generation means and as a second elastic deformation portion.

The coil spring 106 is disposed in such a manner that, as the angle of pivotal movement of the pedal arm 52 from the initial position increases, the coil spring 106 is elastically deformed in a coil-winding direction to thereby be gradually increased in diameter. By contrast, the coil spring 108 is disposed in such a manner that, as the angle of pivotal movement of the pedal arm 52 from the initial position increases, the coil spring 108 is elastically deformed in a coil-unwinding direction to thereby be gradually increased in diameter. Accordingly, as the angle of pivotal movement of the pedal arm 52 from the initial position increases, forces with which the coil springs 106 and 108 radially press the sleeve 116 increase gradually, so that friction forces between the sleeve 116 and the coil springs 106 and 108 increase gradually.

In the present embodiment, the elastic modulus of a resin used to form the sleeve 116 is relatively high, and the elastic modulus K2 of the sleeve 116 on the inner-surface side is set lower than the elastic modulus K1 of the sleeve 116 on the outer-surface side through provision of a plurality of circumferentially extending slits or the like on the inner surface of the sleeve 116. The inner surface of the sleeve 116 is located closer to the axis 64 than is the outer surface of the sleeve 116; thus, the amount of elastic deformation of the inner surface of the sleeve 116 in a circumferential direction may be smaller than the amount of elastic deformation of the outer surface of the sleeve 116 in a circumferential direction. Therefore, the difference between the elastic modulus K1 of the sleeve 116 on the outer-surface side and the elastic modulus K2 of the sleeve 116 on the inner-surface side may be smaller than the difference in elastic modulus between the sliding contact members 70A and 70B in the above-described sixth embodiment.

The outer and inner surfaces of the sleeve 116 are set low in the coefficient of friction through reception of surface treatment, such as Teflon (registered trademark) lining. Particularly, the coefficient of static friction of the outer surface of the sleeve 116 against the coil spring 106 (first coefficient of static friction $\mu s1$) is set lower than the coefficient of static friction of the inner surface of the sleeve 116 against the coil spring 108 (second coefficient of static friction $\mu s2$).

A pressing force with which the first coil spring 106 presses the outer surface of the sleeve 116 and a pressing force with which the second coil spring 108 presses the inner surface of the sleeve 116 are substantially equivalent to each other. Accordingly, the maximum static friction force between the second coil spring 108 and the inner surface of the sleeve 116 is greater than the maximum static friction force between the first coil spring 106 and the outer surface of the sleeve 116.

Thus, the outer surface of the sleeve 116 and a surface of the first coil spring 106 which are frictionally engaged with each other define a first friction surface pair for generating a first resistance force by means of a friction force. An inner surface of the sleeve 116 and a surface of the second coil spring 108 which are frictionally engaged with each other define a second friction surface pair for generating a second resistance force by means of a friction force. The sleeve 116 also functions as a displacement member which allows, through its elastic deformation, the second friction surface pair higher in the coefficient of static friction to move in association with the relative displacement of the pedal arm 12 relative to the support bracket 54.

Other configurational features of the ninth embodiment are similar to those of the above-described sixth to eighth embodiments. Accordingly, the ninth embodiment operates in a manner similar to that of the above-described eighth embodiment, except that, as the angle of pivotal movement of the pedal arm 52 from the initial position increases, the coil spring 106 reduces in diameter, and the coil spring 108 increases in diameter. Therefore, the ninth embodiment can yield actions and effects similar to those of the above-described sixth embodiment.

Tenth Embodiment

Figure 33:
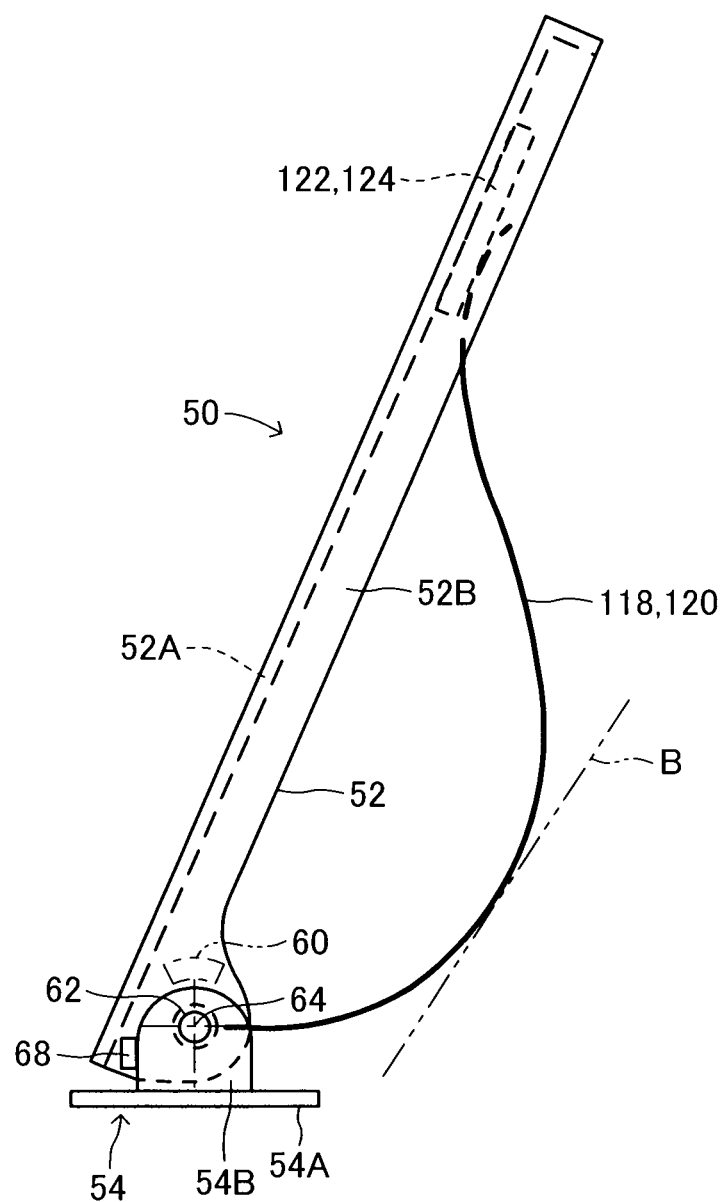
FIG. 33 is a side view showing a tenth embodiment of a pedal-operated operation device according to the present invention, the device being embodied as a drive-by-wire-type accelerator pedal device of an automobile.
Figure 34:
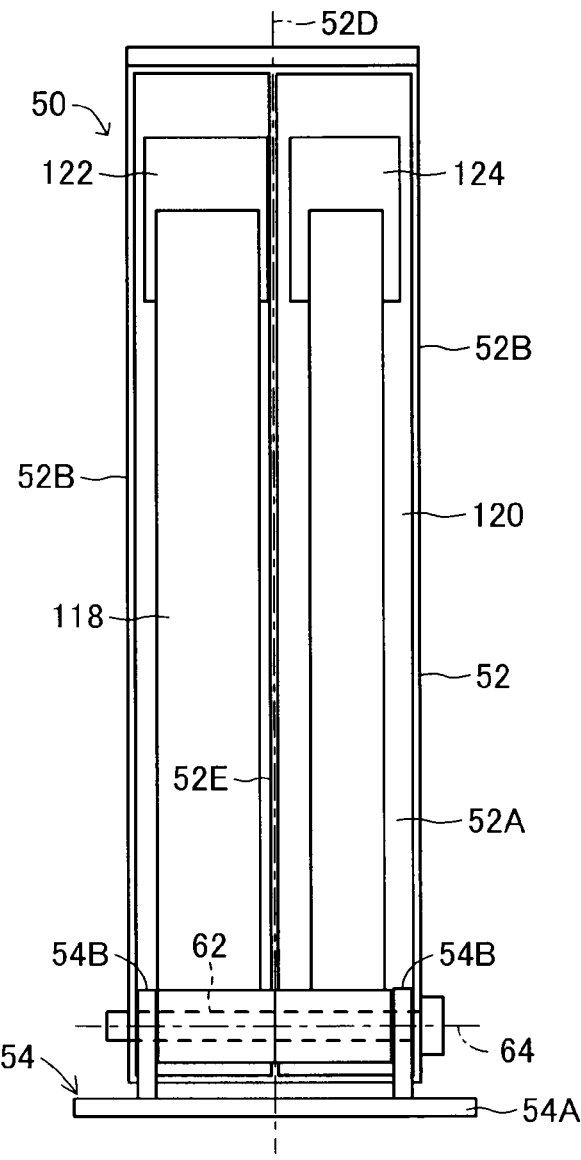
FIG. 34 is a rear view showing the tenth embodiment.

FIG. 33 is a side view showing a tenth embodiment of a pedal-operated operation device according to the present invention, the device being embodied as a drive-by-wire-type accelerator pedal device of an automobile. FIG. 34 is a rear view showing the tenth embodiment.

In the tenth embodiment, a first plate spring 118, which serves as a first return-urging means, and a second plate spring 120, which serves as a second return-urging means, are disposed on the back side of the flat plate portion 52A of the pedal arm 52. The plate springs 118 and 120 are slightly spaced apart from each other along the width direction of the flat plate portion 52A of the pedal arm 52. The plate springs 118 and 120 surround, at their hinge portions located at their lower ends, the shaft member 62, thereby being pivotally supported by the shaft member 62. The plate springs 118 and 120 are curved at their central portions in a direction away from the flat plate portion 52A and are, at the outer surfaces of their central portions, in contact with an inclined portion of a vehicle body B.

The width of the first plate spring 118 is greater than that of the second plate spring 120. The spring constant of the first plate spring 118 is set substantially equal to or lower than that of the second plate spring 120. Distal end portions of the plate springs 118 and 120 are also slightly curved in a direction away from the flat plate portion 52A of the pedal arm 52. The widths of the plate springs 118 and 120 are constant over their whole length. However, distal end portions of the plate springs 118 and 120 may be set smaller in width than the remaining portions.

A first sliding contact plate 122, which is formed of resin and serves as a first resistance force generation means, and a second sliding contact plate 124, which is formed of resin and serves as a second resistance force generation means, are fixed on the back surface of the flat plate portion 52A of the pedal arm 52. Distal end portions of the plate springs 118 and 120 are in contact with the first sliding contact plate 122 and the second sliding contact plate 124, respectively, and slightly press the corresponding sliding contact plates against the flat plate portion 52A.

When the pedal arm 52 is treaded to thereby pivotally move relative to the support bracket 54, the plate springs 118 and 120 increase respective return-urging forces imposed on the pedal arm 52, thereby increasing respective pressing forces exerted on the sliding contact plates 122 and 124. Also, the plate springs 118 and 120 apply such forces as to elastically cause shear deformations of the sliding contact plates 122 and 124, respectively, along thee flat plate portion 52A in a direction away from the shaft member 62.

In view of the shear deformation direction of the sliding contact plates 122 and 124, the elastic modulus K1 of a resin used to form the sliding contact plate 122 is relatively high, and the elastic modulus K2 of a resin used to form the sliding contact plate 124 is set lower than the elastic modulus K1 of the resin used to form the sliding contact plate 122. The setting of these elastic moduli may be achieved through use of different resins to form the sliding contact plates 122 and 124 or through formation of irregularities, such as a plurality of slits extending in the longitudinal direction of the pedal arm 52.

The surfaces of the sliding contact plates 122 and 124 are set low in the coefficient of friction through reception of surface treatment, such as Teflon (registered trademark) lining. Particularly, the coefficient of static friction of the outer surface of the first sliding contact plate 122 against the first plate spring 118 (first coefficient of static friction μs1) is set lower than the coefficient of static friction of the inner surface of the second sliding contact plate 124 against the second plate spring 120 (second coefficient of static friction μs2).

Since the first plate spring 118 and the second plate spring 120 are set as mentioned above, a pressing force with which the second plate spring 120 presses the second sliding contact plate 124 is substantially the same as or greater than a pressing force with which the first plate spring 118 presses the first sliding contact plate 122. Accordingly, the maximum static friction force between the second plate spring 120 and the second sliding contact plate 124 is greater than the maximum static friction force between the first plate spring 118 and the first sliding contact plate 122.

Thus, a surface of the first plate spring 118 and a surface of the first sliding contact plate 122 which are frictionally engaged with each other define a first friction surface pair for generating a first resistance force by means of a friction force. A surface of the second plate spring 120 and a surface of the second sliding contact plate 124 which are frictionally engaged with each other define a second friction surface pair for generating a second resistance force by means of a friction force. The second sliding contact plate 124 also functions as a displacement member which allows, through its elastic deformation, the second friction surface pair higher in the coefficient of static friction to move in association with the relative displacement of the pedal arm 12 relative to the support bracket 54.

The spring forces of the first plate spring 118 and the second plate spring 120 urge the pedal arm 52 counterclockwise about the shaft member 62 as viewed in FIG. 33. Accordingly, when a tread force is not imposed on the pedal arm 52, the pedal arm 52 is positioned at its initial position at which stoppers 68 provided at the lower end of the peripheral wall portion 52B are in contact with the peripheral portions of the respective trunnions 54B of the support bracket 54.

As the angle of pivotal movement of the pedal arm 52 from the initial position increases as a result of the pedal arm 52 being treaded, the spring forces of the first plate spring 118 and the second plate spring 120 increase gradually. Accordingly, as the angle of pivotal movement of the pedal arm 52 from the initial position increases, the forces with which the first plate spring 118 and the second plate spring 120 press perpendicularly the first sliding contact plate 122 and the second sliding contact plate 124, respectively, increase gradually; thus, a friction force between the first plate spring 118 and the first sliding contact plate 122 and a friction force between the second plate spring 120 and the second sliding contact plate 124 increase gradually. Also, as the angle of pivotal movement of the pedal arm 52 from the initial position increases, the forces with which the first plate spring 118 and the second plate spring 120 cause shear deformations of the first sliding contact plate 122 and the second sliding contact plate 124, respectively, increase gradually.

When a force exerted relatively between the first plate spring 118 and the first sliding contact plate 122 along their surfaces is equal to or less than the maximum static friction force therebetween, a friction force between the second plate spring 120 and the second sliding contact plate 124 is also equal to or less than the maximum static friction force therebetween. Also, the amounts of shear deformations of the first sliding contact plate 122 and the second sliding contact plate 124, respectively, are modest. Therefore, the pedal arm 52 does substantially not pivotally move as viewed in FIG. 33.

When a force exerted relatively between the first plate spring 118 and the first sliding contact plate 122 along their surfaces exceeds the maximum static friction force therebetween, a distal end portion of the first plate spring 118 is displaced relative to the first sliding contact plate 122 along the flat plate portion 52A in a direction away from the shaft member 62. When a force exerted relatively between the second plate spring 120 and the second sliding contact plate 124 along their surfaces is equal to or less than the maximum static friction force therebetween, the second plate spring 120 causes shear deformation of the second sliding contact plate 124, and a spring force associated with the shear deformation acts in such a direction as to restrain the pivotal movement of the pedal arm 52. Accordingly, the pedal arm 52 pivotally moves slightly about the axis 64 as viewed in FIG. 33.

Further, when a force exerted relatively between the second plate spring 120 and the second sliding contact plate 124 along their surfaces exceeds the maximum static friction force therebetween, a distal end portion of the second plate spring 120 is also displaced relative to the second sliding contact plate 124 along the flat plate portion 52A in a direction away from the shaft member 62. Therefore, the spring forces which act in such a direction as to return the pedal arm 52 to the initial position are substantially the spring forces of the first plate spring 118 and the second plate spring 120.

Thus, the tenth embodiment operates in a manner similar to that of the above-described sixth embodiment, except that the spring forces of the first plate spring 118 and the second plate spring 120 are exerted directly on the first sliding contact plate 122 and the second sliding contact plate 124, respectively, and that the distal end portions of the first plate spring 118 and the second plate spring 120 cause the shear deformations of the first sliding contact plate 122 and the second sliding contact plate 124, respectively. Therefore, the tenth embodiment can yield actions and effects similar to those of the above-described sixth embodiment through use of the plate springs as the first and second return-urging means.

Figure 35:
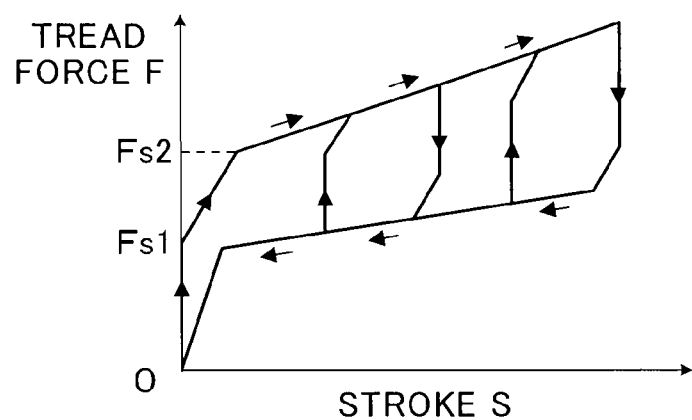
FIG. 35 is a graph showing hysteresis of the F-S characteristic curve in the tenth embodiment.

Particularly, according to the tenth embodiment, the rate of increase in each of the forces with which the first plate spring 118 and the second plate spring 120 press the first sliding contact plate 122 and the second sliding contact plate 124, respectively, in association with increase in the angle of pivotal movement of the pedal arm 52 from the initial position is higher than that in the above-described sixth and seventh embodiments. Therefore, the F-S characteristic curve of the tenth embodiment follows a hysteresis curve as shown in FIG. 35.

Eleventh Embodiment

Figure 36:
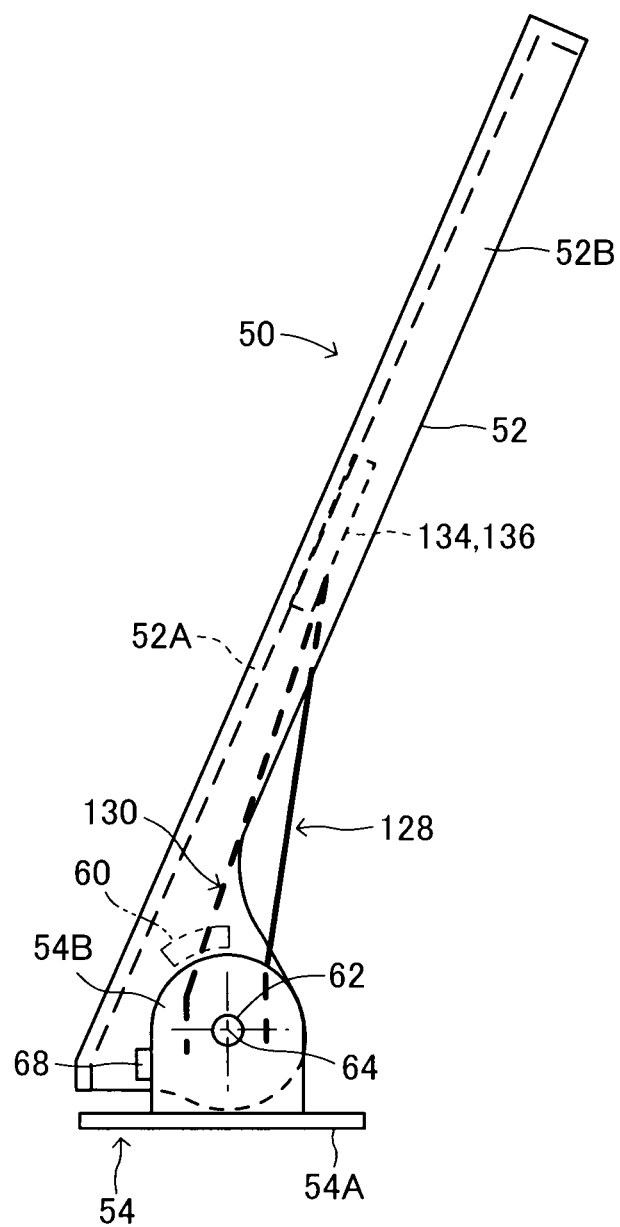
FIG. 36 is a side view showing an eleventh embodiment of a pedal-operated operation device according to the present invention, the device being embodied as a drive-by-wire-type accelerator pedal device of an automobile.
Figure 37:
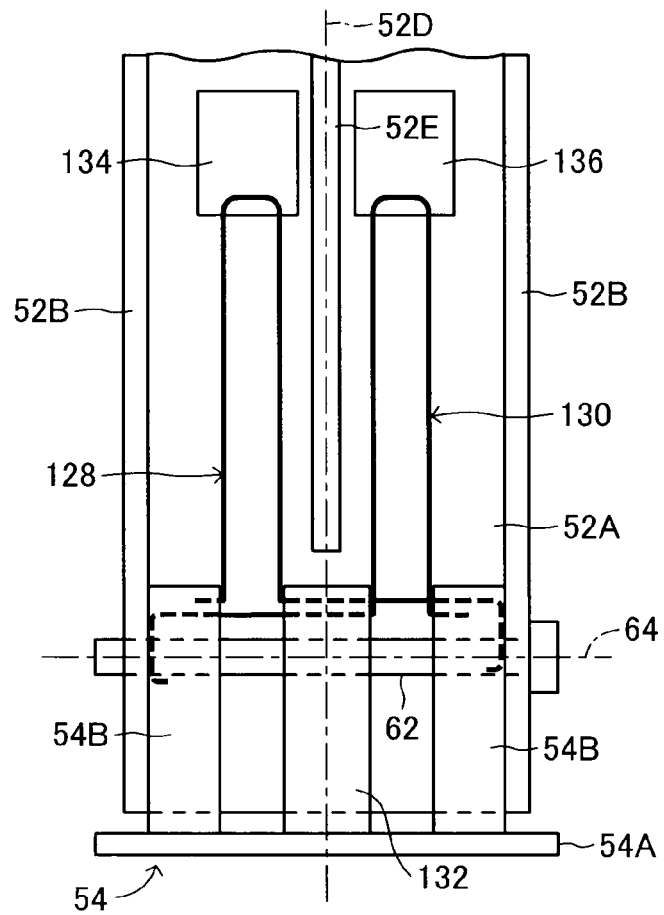
FIG. 37 is an enlarged partial rear view showing the eleventh embodiment.
Figure 38:
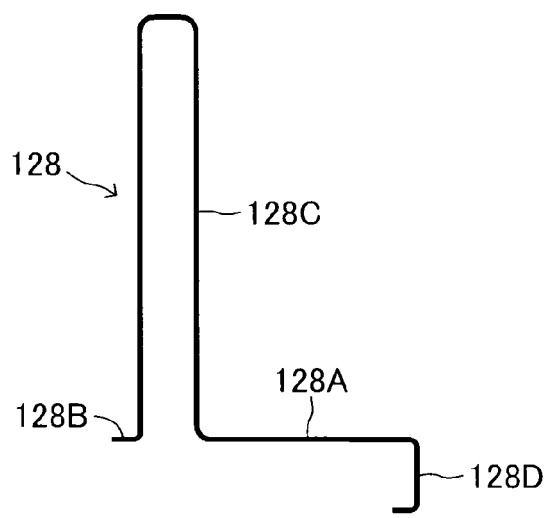
FIG. 38 is a front view showing a first torsion bar.
Figure 39:
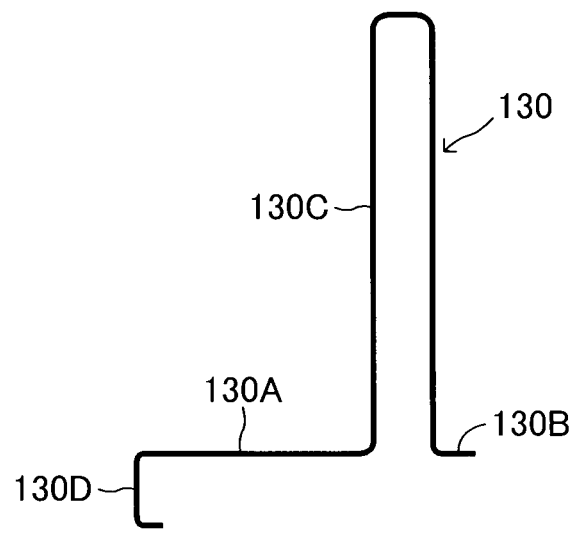
FIG. 39 is a front view showing a second torsion bar.
Figure 40:
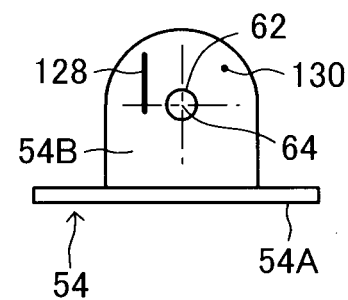
FIG. 40 is a front view showing one trunnion of a support bracket as viewed from a direction of an axis of a pedal arm.
Figure 41:
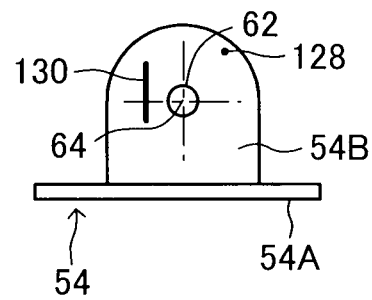
FIG. 41 is a front view showing the other trunnion of the support bracket as viewed from a direction of the axis of the pedal arm.

FIG. 36 is a side view showing an eleventh embodiment of a pedal-operated operation device according to the present invention, the device being embodied as a drive-by-wire-type accelerator pedal device of an automobile. FIG. 37 is an enlarged partial rear view showing the eleventh embodiment. FIGS. 38 and 39 are front views showing a first torsion bar and a second torsion bar, respectively. FIGS. 40 and 41 are enlarged front views showing one trunnion and the other trunnion of a support bracket as viewed from a direction of an axis of a pedal arm. In the eleventh embodiment, a first torsion bar 128, which serves as a first return-urging means, and a second torsion bar 130, which serves as a second return-urging means, are disposed on the back side of the flat plate portion 52A of the pedal arm 52. The torsion bars 128 and 130 are formed of a bar having a circular cross section. The diameter of the torsion bar 130 is greater than that of the torsion bar 128. Accordingly, the spring constant of the torsion bar 130 is higher than the spring constant of the torsion bar 128. However, these torsion bars may have the same spring constant, or the magnitude relationship of spring constant may be reverse to the above-mentioned relationship.

As shown in FIG. 38, the first torsion bar 128 has a torsion bar portion 128A and a guide portion 128B, which extend in parallel with the axis 64 and align with each other; a pivotal arm portion 128C, which extends perpendicularly from the mutually closer ends of the torsion bar portion 128A and the guide portion 128B in such a manner as to have a shape resembling the letter U; and a stationary arm portion 128D extending perpendicularly from the other end of the torsion bar portion 128A.

Similarly, as shown in FIG. 39, the second torsion bar 130 has a torsion bar portion 130A and a guide portion 130B, which extend in parallel with the axis 64 and align with each other; a pivotal arm portion 130C, which extends perpendicularly from the mutually closer ends of the torsion bar portion 130A and the guide portion 130B in such a manner as to have a shape resembling the letter U; and a stationary arm portion 130D extending perpendicularly from the other end of the torsion bar portion 130A.

In the eleventh embodiment, the paired trunnions 54B of the support bracket 54 are set greater in thickness than the trunnions of the above-described other embodiments. As shown in FIG. 40, the torsion bar portion 128A and the stationary arm portion 128D are fitted into a groove provided in one trunnion 54B, whereas, as shown in FIG. 41, the guide portion 128B is fitted into a hole provided in the other trunnion 54B. The distal end of the stationary arm portion 128D is bent perpendicularly and is fitted into a hole provided in the one trunnion 54B, whereby the stationary arm portion 128D is fixed to the trunnion 54B.

Similarly, as shown in FIG. 41, the torsion bar portion 130A and the stationary arm portion 130D are fitted into a groove provided in the other trunnion 54B, whereas, as shown in FIG. 40, the guide portion 130B is fitted into a hole provided in the one trunnion 54B. The distal end of the stationary arm portion 130D is also bent perpendicularly and is fitted into a hole provided in the other trunnion 54B, whereby the stationary arm portion 130D is fixed to the trunnion 54B.

A semicylindrical guide bracket 132 is provided between the paired trunnions 54B of the support bracket 54 and is unitarily fixed on the upper surface of the base portion 54A of the support bracket 54. The torsion bar portions 128A and 130A extend through respective holes provided in the guide bracket 132 and can freely rotate relative to the guide bracket 132. The guide portions 128B and 130B can freely rotate relative to the corresponding trunnions 54B.

A first sliding contact plate 134, which is formed of resin and serves as a first resistance force generation means, and a second sliding contact plate 136, which is formed of resin and serves as a second resistance force generation means, are fixed on the back surface of the flat plate portion 52A of the pedal arm 52. Distal end portions of the pivotal arm portions 128C and 130C are in contact with the first sliding contact plate 134 and the second sliding contact plate 136, respectively, and slightly press the corresponding sliding contact plates against the flat plate portion 52A.

When the pedal arm 52 is treaded to thereby pivotally move relative to the support bracket 54, the torsion bars 128 and 130 increase respective return-urging forces imposed on the pedal arm 52, thereby increasing respective pressing forces exerted on the sliding contact plates 134 and 136. Also, the pivotal arm portions 128C and 130C of the torsion bars 128 and 130 apply such forces as to elastically cause shear deformations of the sliding contact plates 134 and 136, respectively, along the flat plate portion 52A in a direction away from the shaft member 62.

In view of the shear deformation direction of the sliding contact plates 134 and 136, the elastic modulus K1 of a resin used to form the sliding contact plate 134 is relatively high, and the elastic modulus K2 of a resin used to form the sliding contact plate 136 is set lower than the elastic modulus K1 of the resin used to form the sliding contact plate 134. The setting of these elastic moduli may be achieved through use of different resins to form the sliding contact plates 134 and 136 or through formation of irregularities, such as a plurality of slits extending along the longitudinal direction of the pedal arm 52.

The surfaces of the sliding contact plates 134 and 136 are set low in the coefficient of friction through reception of surface treatment, such as Teflon (registered trademark) lining. Particularly, the coefficient of static friction of the surface of the first sliding contact plate 134 against the pivotal arm portion 128C (first coefficient of static friction μs1) is set lower than the coefficient of static friction of the surface of the second sliding contact plate 136 against the pivotal arm portion 130C (second coefficient of static friction μs2).

Since the spring constants of the torsion bars 128 and 130 are set as mentioned above, a pressing force with which the pivotal arm portion 130C of the torsion bar 130 presses the second sliding contact plate 136 is greater than a pressing force with which the pivotal arm portion 128C of the torsion bar 128 presses the first sliding contact plate 134. Accordingly, the maximum static friction force between the pivotal arm portion 130C and the second sliding contact plate 136 is greater than the maximum static friction force between the pivotal arm portion 128C and the first sliding contact plate 134.

Thus, a surface of the pivotal arm portion 128C and a surface of the first sliding contact plate 134 which are frictionally engaged with each other define a first friction surface pair for generating a first resistance force by means of a friction force. A surface of the pivotal arm portion 130C and a surface of the second sliding contact plate 136 which are frictionally engaged with each other define a second friction surface pair for generating a second resistance force by means of a friction force. The second sliding contact plate 136 also functions as a displacement member which allows, through its elastic deformation, the second friction surface pair higher in the coefficient of static friction to move in association with the relative displacement of the pedal arm 12 relative to the support bracket 54.

The torsion bar portion 128A of the first torsion bar 128 and the torsion bar portion 130A of the second torsion bar 130 are spaced apart from the axis 64 and extend in parallel with the axis 64. Accordingly, when the pedal arm 52 pivotally moves about the axis 64, the distal ends of the pivotal arm portions 128C and 130C attempt to undergo displacement relative to the first and second sliding contact plates 134 and 136, respectively, in the longitudinal direction of the pedal arm 52.

However, the distal ends of the pivotal arm portions 128C and 130C are frictionally engaged with the first and second sliding contact plates 134 and 136, respectively. Accordingly, when forces exerted relatively between the distal ends of the pivotal arm portions 128C and 130C and the first and second sliding contact plates 134 and 136, respectively, along their surfaces are equal to or less than the respective maximum static friction forces therebetween, the distal ends of the pivotal arm portions 128C and 130C are not displaced relative to the first and second sliding contact plates 134 and 136, respectively. Therefore, the pedal arm 52 does not pivotally move relative to the support bracket 54.

When a force exerted relatively between the distal end of the pivotal arm portion 128C and the first sliding contact plate 134 along their surfaces exceeds the maximum static friction force therebetween, the distal end of the pivotal arm portion 128C is displaced relative to the first sliding contact plate 134. Therefore, the pedal arm 52 pivotally moves about the axis 64 relative to the support bracket 54.

However, since the distal end of the pivotal arm portion 130C is frictionally engaged with the second sliding contact plate 136, at this frictional engagement portion, the distal end of the pivotal arm portion 130C is not displaced relative to the second sliding contact plate 136 and causes the second sliding contact plate 136 to be elastically deformed in a shear direction. Thus, in this state, the spring forces which attempt to return the pedal arm 52 to the initial position are spring forces of the torsion bars 128 and 130 and a spring force associated with the elastic deformation of the second sliding contact plate 136.

When a force exerted relatively between the distal end of the pivotal arm portion 130C and the second sliding contact plate 136 along their surfaces exceeds the maximum static friction force therebetween, the distal end of the pivotal arm portion 130C is also displaced relative to the second sliding contact plate 136. Thus, in this state, the second sliding contact plate 136 is not elastically deformed in the shear direction by the distal end of the pivotal arm portion 130C. Therefore, the spring forces which attempt to return the pedal arm 52 to the initial position are spring forces of the torsion bars 128 and 130.

Accordingly, also, in the eleventh embodiment, the relation between the tread force F imposed on the pedal arm 52 by a driver in a process of increase in the tread force F from 0 and the stroke S of the center of the tread surface of the flat plate portion 52A is similar to that in the above-described first embodiment; i.e., the F-S characteristic is a two-bend characteristic as shown in FIG. 6. Also, in the eleventh embodiment, as the stroke S of the pedal arm 52 increases, the forces with which distal ends of the pivotal arm portions 128C and 130C press the first and second sliding contact plates 134 and 136, respectively, increase gradually, so that the friction forces between the distal ends of the pivotal arm portions 128C and 130C and the first and second sliding contact plates 134 and 136, respectively, increase gradually. Thus, the F-S characteristic curve in a process of increase and decrease in the tread force imposed on the pedal arm 52 follows a hysteresis curve as shown in FIG. 35.

Thus, the eleventh embodiment operates in a manner similar to that of the above-described sixth embodiment, except that the spring forces of the torsion bars 128 and 130 are exerted directly on the first sliding contact plate 134 and the second sliding contact plate 136, respectively, and that the distal end portions of the pivotal arm portions 128C and 130C cause the shear deformations of the first sliding contact plate 134 and the second sliding contact plate 136, respectively. Therefore, the eleventh embodiment can yield actions and effects similar to those of the above-described tenth embodiment through use of the torsion bars as the first and second return-urging means.

Twelfth Embodiment

Figure 42:
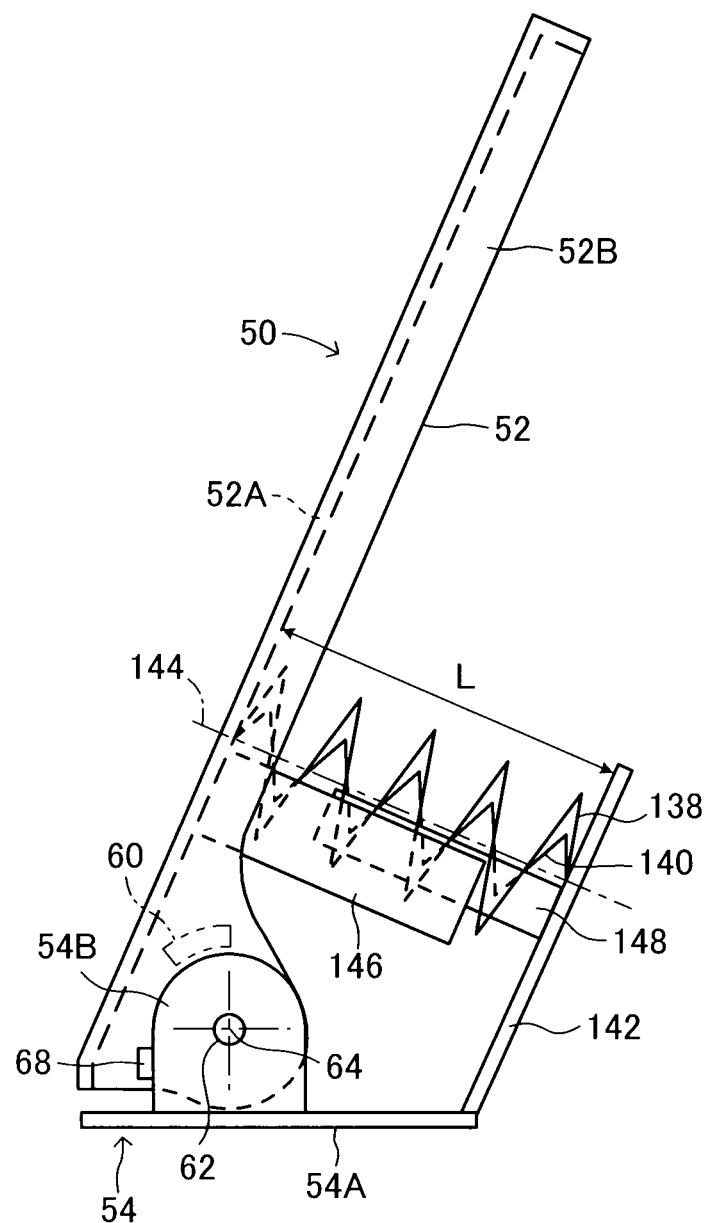
FIG. 42 is a side view showing a twelfth embodiment of a pedal-operated operation device according to the present invention, the device being embodied as a drive-by-wire-type accelerator pedal device of an automobile.
Figure 43:
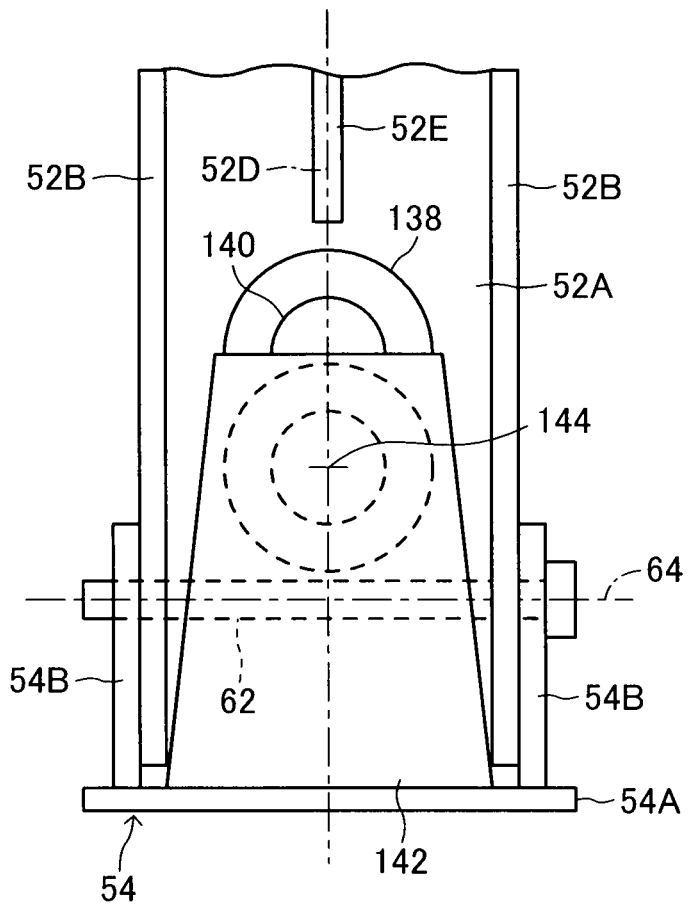
FIG. 43 is an enlarged partial rear view showing the twelfth embodiment.

FIG. 42 is a side view showing a twelfth embodiment of a pedal-operated operation device according to the present invention, the device being embodied as a drive-by-wire-type accelerator pedal device of an automobile. FIG. 43 is an enlarged partial rear view showing the twelfth embodiment.

Figure 44:
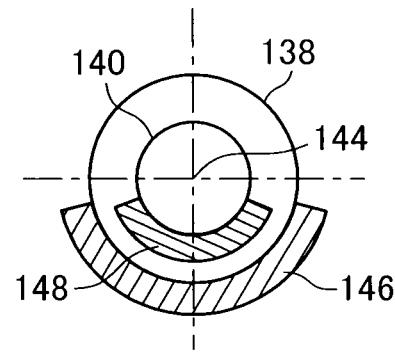
FIG. 44 is an enlarged cross-sectional view showing an essential portion of the twelfth embodiment.

FIG. 44 is an enlarged cross-sectional view showing an essential portion of the twelfth embodiment.

In the twelfth embodiment, a first compression coil spring 138, which serves as a first return-urging means, and a second compression coil spring 140, which serves as a second return-urging means, are disposed on the back side of the flat plate portion 52A of the pedal arm 52. A spring attachment plate 142 is formed integral with the base portion 54A of the support bracket 54. The first compression coil spring 138 and the second compression coil spring 140 are elastically disposed between the back surface of the flat plate portion 52A of the pedal arm 52 and the spring attachment plate 142. As shown in FIG. 42, the flat plate portion 52A of the pedal arm 52 and the spring attachment plate 142 are set in such a manner as to be substantially parallel with each other when the pedal arm 52 is positioned at its initial position.

The compression coil springs 138 and 140 extend concentric with each other in alignment with an axis 144 which extends tangential to an imaginary arcuate line about the axis 64. The axis 144 extends substantially perpendicular to the flat plate portion 52A of the pedal arm 52 and to the spring attachment plate 142 when the pedal arm 52 is positioned at its initial position. The compression coil spring 138 is located at the outside of the compression coil spring 140 and is radially spaced apart from the compression coil spring 140. The diameter of a wire material used to form the compression coil spring 138 is greater than the diameter of a wire material used to form the compression coil spring 140. Accordingly, the spring constant of the compression coil spring 138 is higher than the spring constant of the compression coil spring 140. However, these compression coil springs may have the same spring constant, or the magnitude relationship of spring constant may be reverse to the above-mentioned relationship.

One end of a first sliding contact plate 146, which functions as a first resistance force generation means, is fixed to the back surface of the flat plate portion 52A of the pedal arm 52, whereas one end of a second sliding contact plate 148, which functions as a second resistance force generation means, is fixed to the spring attachment plate 142. The first sliding contact plate 146 and the second sliding contact plate 148 are formed of resin and each assume a substantially semicylindrical shape extending along the axis 144.

Each of the sliding contact plates 146 and 148 has a length shorter than a distance L between the flat plate portion 52A and the spring attachment plate 142 when the pedal arm 52 is positioned at its initial position, and longer than one-half of the distance L. Accordingly, even when the pedal arm 52 is positioned at its initial position, the sliding contact plates 146 and 148 extend while overlapping each other. The sliding contact plates 146 and 148 are located on a side toward the axis 64 with respect to the compression coil springs 138 and 140 and are, at their inner cylindrical surfaces, in contact with the compression coil springs 138 and 140, respectively, thereby slightly pressing the corresponding compression coil springs.

The elastic modulus K1 of the first sliding contact plate 146 as measured on its inner cylindrical surface along its longitudinal direction is relatively high, and the elastic modulus K2 of the second sliding contact plate 148 as measured on its inner cylindrical surface along its longitudinal direction is set lower than the elastic modulus K1 of the first sliding contact plate 146 as measured on its inner cylindrical surface along its longitudinal direction. The setting of these elastic moduli may be achieved through use of different resins to form the sliding contact plates 146 and 148 or through formation of irregularities, such as a plurality of slits extending along the longitudinal direction of the sliding contact plates.

The inner cylindrical surfaces of the sliding contact plates 146 and 148 are set low in the coefficient of friction through reception of surface treatment, such as Teflon (registered trademark) lining. Particularly, the coefficient of static friction of the inner cylindrical surface of the first sliding contact plate 146 against the compression coil spring 138 (first coefficient of static friction $\mu s1$) is set lower than the coefficient of static friction of the inner cylindrical surface of the second sliding contact plate 148 against the compression coil spring 140 (second coefficient of static friction $\mu s2$).

A pressing force with which the compression coil spring 138 presses the first sliding contact plate 146 and a pressing force with which the compression coil spring 140 presses the second sliding contact plate 148 are substantially equivalent to each other. Accordingly, the maximum static friction force between the compression coil spring 140 and the second sliding contact plate 148 is greater than the maximum static friction force between the compression coil spring 138 and the first sliding contact plate 146.

Thus, a surface of the compression coil spring 138 and a surface of the first sliding contact plate 146 which are frictionally engaged with each other define a first friction surface pair for generating a first resistance force by means of a friction force. A surface of the compression coil spring 140 and a surface of the second sliding contact plate 148 which are frictionally engaged with each other define a second friction surface pair for generating a second resistance force by means of a friction force. The second sliding contact plate 148 also functions as a displacement member which allows, through its elastic deformation, the second friction surface pair higher in the coefficient of static friction to move in association with the relative displacement of the pedal arm 12 relative to the support bracket 54.

The compression coil springs 138 and 140 and the sliding contact plates 146 and 148 extend along the axis 144 when the pedal arm 52 is positioned at its initial position, and the compression coil springs 138 and 140 are elastically disposed between the flat plate portion 52A of the pedal arm 52 and the spring attachment plate 142. Accordingly, as the pedal arm 52 pivotally moves about the axis 64, the distance L between the flat plate portion 52A of the pedal arm 52 and the spring attachment plate 142 changes; thus, the compression coil springs 138 and 140 attempt to undergo displacement relative to the sliding contact plates 146 and 148 along the axis 144.

However, the sliding contact plates 146 and 148 are in contact with the compression coil springs 138 and 140, respectively, and extend in an overlapping condition. Accordingly, when forces exerted relatively between the compression coil springs 138 and 140 and the sliding contact plates 146 and 148, respectively, along their longitudinal direction are equal to or less than the respective maximum static friction forces therebetween, the coils of the compression coil springs 138 and 140 are not displaced relative to the sliding contact plates 146 and 148, respectively. Therefore, the pedal arm 52 does not pivotally move relative to the support bracket 54.

When a force exerted relatively between the compression coil spring 138 and the sliding contact plate 146 along its longitudinal direction exceeds the maximum static friction force therebetween, the coils of the compression coil spring 138 are displaced relative to the sliding contact plate 146. Therefore, the pedal arm 52 pivotally moves about the axis 64 relative to the support bracket 54.

However, since the compression coil spring 140 is frictionally engaged with the sliding contact plate 148, at this frictional engagement portion, the coils of the compression coil spring 140 are not displaced relative to the sliding contact plate 148. Accordingly, the compression coil spring 140 is compressively deformed freely at its portion between the flat plate portion 52A and the projecting end of the sliding contact plate 148; however, a portion of the compression coil spring 140 which is frictionally engaged with the sliding contact portion 148 is compressively deformed while compressing a semicylindrical inner surface portion of the sliding contact plate 148. Thus, in this state, the spring forces which attempt to return the pedal arm 52 to the initial position are a spring force of the compression coil spring 138, a spring force of the above-mentioned compressively deformed portion of the compression coil spring 140, and a spring force associated with the compressive deformation of the sliding contact plate 148.

When a force exerted relatively between the compression coil spring 140 and the sliding contact plate 148 along its longitudinal direction exceeds the maximum static friction force therebetween, the coils of the compression coil spring 140 are also displaced relative to the sliding contact plate 148. Thus, in this state, since the compression coil spring 140 is also compressively deformed over its whole length, the spring forces which attempt to return the pedal arm 52 to the initial position are the spring forces of the compression coil springs 138 and 140. Therefore, the spring constant of the entire spring for return-urging the pedal arm 52 drops.

Accordingly, also, in the twelfth embodiment, the relation between the tread force F imposed on the pedal arm 52 by a driver in a process of increase in the tread force F from 0 and the stroke S of the center of the tread surface of the flat plate portion 52A is similar to that in the above-described first embodiment; i.e., the F-S characteristic is a two-bend characteristic as shown in FIG. 6. Also, in the twelfth embodiment, as the stroke S of the pedal arm 52 increases, the compression coil springs 138 and 140 are curved in such a manner that their central portions are displaced downward, and the forces with which the compression coil springs 138 and 140 press the sliding contact plates 146 and 148, respectively, increase gradually, so that the friction forces therebetween increase gradually. Thus, the F-S characteristic curve in a process of increase and decrease in the tread force imposed on the pedal arm 52 follows a hysteresis curve as shown in FIG. 35.

Thus, the twelfth embodiment operates in a manner similar to that of the above-described sixth embodiment, except that the sliding contact plates 146 and 148 are in sliding contact with the compression coil springs 138 and 140, respectively, along their longitudinal direction and are elastically deformed along their longitudinal direction. Therefore, the twelfth embodiment can yield actions and effects similar to those of the above-described sixth embodiment through use of the compression coil springs as the first and second return-urging means.

Particularly, according to the twelfth embodiment, when the stroke of the pedal arm 52 becomes a certain value, the projecting ends of the sliding contact plates 146 and 148 come into contact with the spring attachment plate 142 and the flat plate portion 52A of the pedal arm 52, respectively, thereby restraining further pivotal movement of the pedal arm 52. Therefore, the full open stopper can be eliminated or reduced in size.

In the illustrated embodiment, one end of the first sliding contact plate 146 is fixed to the back surface of the flat plate portion 52A of the pedal arm 52, and one end of the second sliding contact plate 148 is fixed to the spring attachment plate 142. However, this configuration may be modified as follows: one end of the first sliding contact plate 146 is fixed to the spring attachment plate 142, and one end of the second sliding contact plate 148 is fixed to the back surface of the flat plate portion 52A of the pedal arm 52.

Thirteenth Embodiment

Figure 45:
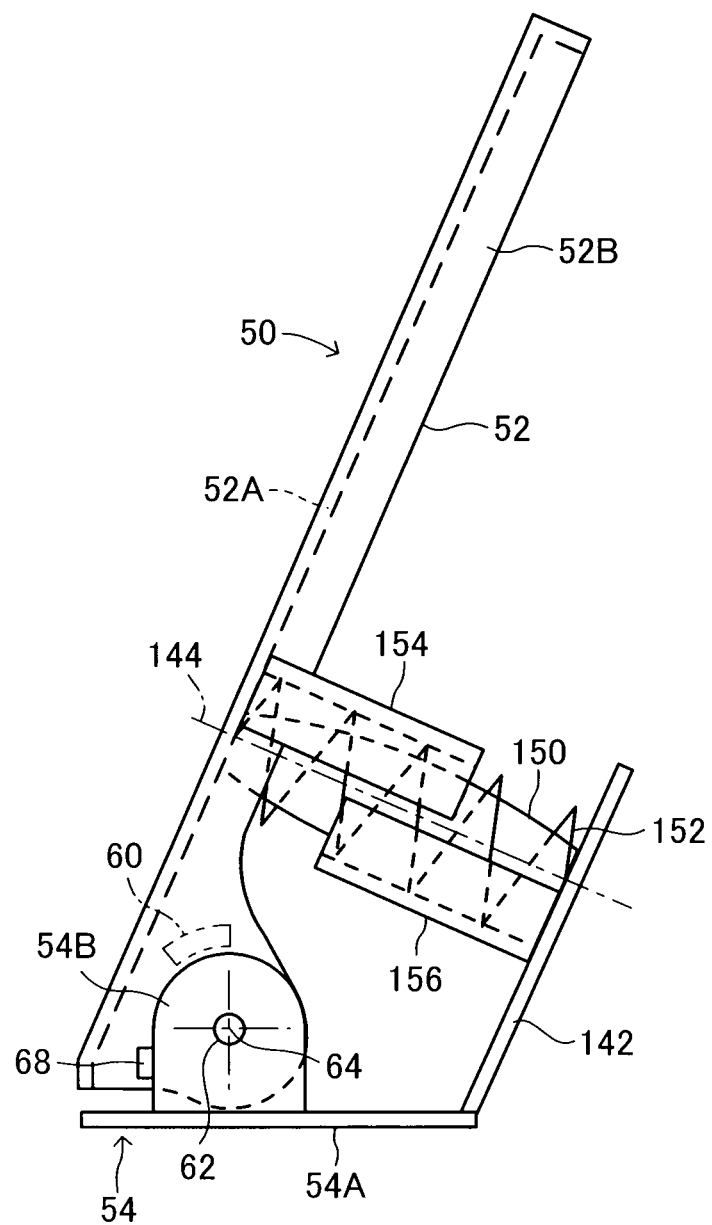
FIG. 45 is a side view showing a thirteenth embodiment of a pedal-operated operation device, according to the present invention, the device being embodied as a drive-by-wire-type accelerator pedal device of an automobile.
Figure 46:
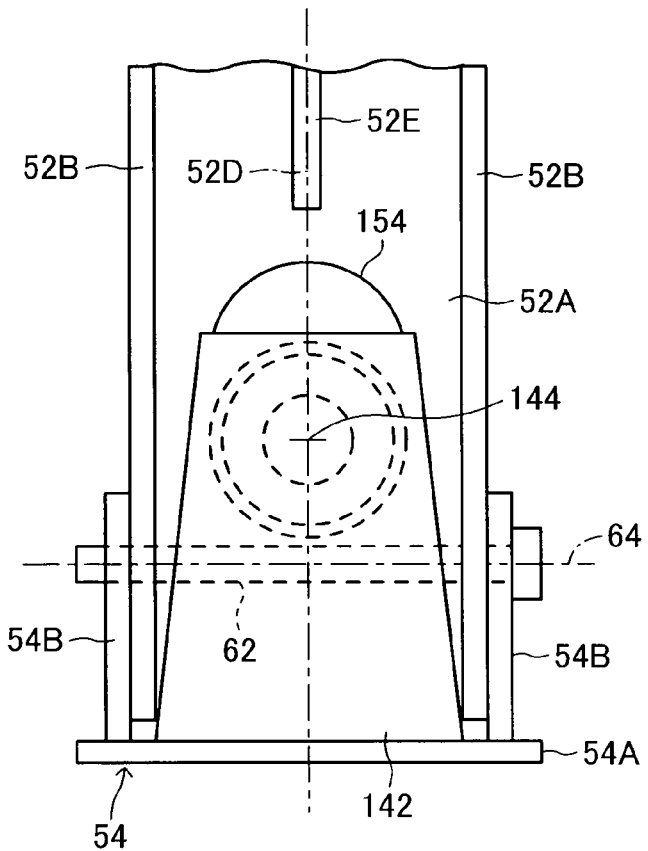
FIG. 46 is an enlarged partial rear view showing the thirteenth embodiment.
Figure 47:
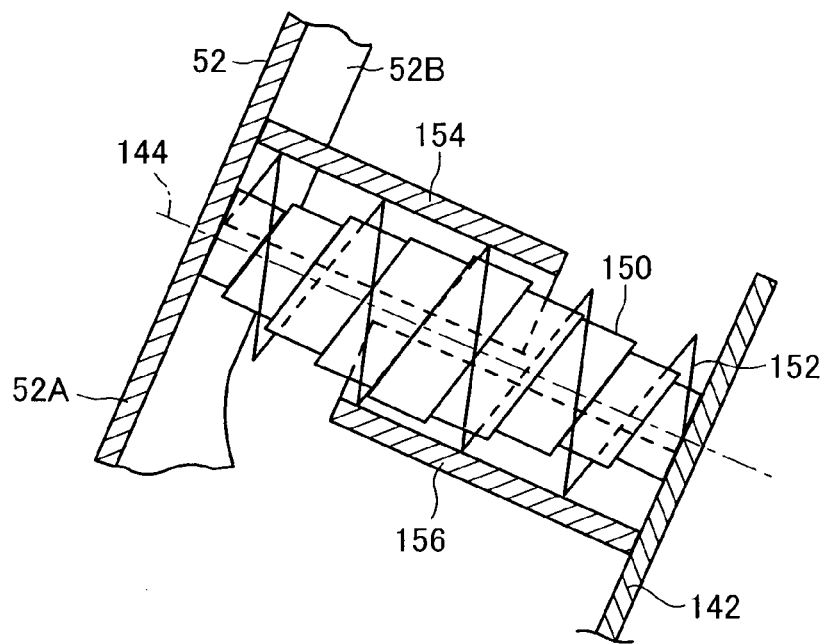
FIG. 47 is an enlarged partial sectional view showing an essential portion of the thirteenth embodiment.

FIG. 45 is a side view showing a thirteenth embodiment of a pedal-operated operation device according to the present invention, the device being embodied as a drive-by-wire-type accelerator pedal device of an automobile. FIG. 46 is an enlarged partial rear view showing the thirteenth embodiment. FIG. 47 is an enlarged partial sectional view showing an essential portion of the thirteenth embodiment.

In the thirteenth embodiment, similar to the above-described twelfth embodiment, the spring attachment plate 142 is formed integral with the base portion 54A of the support bracket 54, and a first compression coil spring 150 and a second compression coil spring 152 are elastically disposed between the back surface of the flat plate portion 52A of the pedal arm 52 and the spring attachment plate 142. The compression coil spring 150 is a volute spring formed by coiling a strip steel into a shape resembling a beer barrel, and individual coils are frictionally engaged with one another. The compression coil spring 152 is an ordinary compression coil spring formed by coiling a steel wire into a cylindrical shape. The compression coil spring 150 may have a shape resembling a truncated cone or an hourglass.

Similar to the compression coil springs 138 and 140 of the above-described twelfth embodiment, the compression coil springs 150 and 152 extend concentric with each other in alignment with the axis 144. The compression coil spring 152 is located at the outside of the compression coil spring 150 and is radially spaced apart from the compression coil spring 150. The compression coil springs 150 and 152 may have the same spring constant or different spring constants.

One ends of semicylindrical sliding contact plates 154 and 156, which are formed of resin and function as second resistance force generation means, are fixed to the back surface of the flat plate portion 52A of the pedal arm 52 and to the spring attachment plate 142, respectively. The sliding contact plate 154 is in contact with the compression coil spring 152 at its upper side, and the sliding contact plate 156 is in contact with the compression coil spring 152 at its lower side. The sliding contact plates 154 and 156 extend about the axis 144 in a range less than 180 degrees about the axis 144. Forces with which the sliding contact plates 154 and 156 radially press the compression coil spring 152 are set equivalent to a force with which the coils of the compression coil spring 150 radially press one another.

Similar to the sliding contact plates 146 and 148 of the above-described twelfth embodiment, each of the sliding contact plates 154 and 156 has a length shorter than the distance L between the flat plate portion 52A and the spring attachment plate 142 at the time when the pedal arm 52 is positioned at its initial position, and longer than one-half of the distance L. Accordingly, even when the pedal arm 52 is positioned at its initial position, the sliding contact plates 154 and 156 extend while overlapping each other. The sliding contact plates 154 and 156 may be spaced apart from each other in a direction other than a perpendicular direction to the axis 144; for example, in a horizontal direction, so long as the sliding contact plates 154 and 156 do not interfere with each other even when the distance L between the flat plate portion 52A and the spring attachment plate 142 becomes short as a result of pivotal movement of the pedal arm 52.

The coil surfaces of the compression coil spring 150 which are frictionally engaged with one another, and the inner cylindrical surfaces of the sliding contact plates 154 and 156 are set low in the coefficient of friction through reception of surface treatment, such as Teflon (registered trademark) lining. Particularly, the coefficient of static friction of the coil surfaces of the compression coil spring 150 which are frictionally engaged with one another (first coefficient of static friction μs1) is set lower than the coefficient of static friction of the inner cylindrical surfaces of the sliding contact plates 154 and 156 against the compression coil spring 152 (second coefficient of static friction μs2).

As mentioned above, a pressing force with which the compression coil spring 150 presses the first sliding contact plate 146 and a pressing force with which the compression coil spring 152 presses the sliding contact plates 154 and 156 are substantially equivalent to each other. Accordingly, the maximum static friction force between the compression coil spring 152 and the sliding contact plates 154 and 156 is greater than the maximum static friction force between the coils of the compression coil spring 150. The individual coils of the compression coil spring 150 function as first resistance force generation means in relation to one another.

Thus, coil surfaces of the compression coil spring 150 which are frictionally engaged with each other define a first friction surface pair for generating a first resistance force by means of a friction force. A surface of the compression coil spring 152 and surfaces of the sliding contact plates 154 and 156 which are frictionally engaged with each other define a second friction surface pair for generating a second resistance force by means of a friction force. The sliding contact plates 154 and 156 also jointly function as a displacement member which allows, through their elastic deformation, the second friction surface pair higher in the coefficient of static friction to move in association with the relative displacement of the pedal arm 12 relative to the support bracket 54.

As mentioned above, the coils of the compression coil spring 150 are frictionally engaged with one another, and the sliding contact plates 154 and 156 are, at their inner cylindrical surfaces, frictionally engaged with the compression coil spring 152. Accordingly, even when a tread force is imposed on the pedal arm 52, if a force exerted along the axis 144 between frictionally engaged coil surfaces of the compression coil spring 150 and a force exerted relatively along the axis 144 between the sliding contact plates 154 and 156 and the compression coil spring 152 are equal to or less than the respective maximum static friction forces therebetween, the coils of the compression coil spring 150 are not displaced relative to one another, and the compression coil spring 152 is not displaced relative to the sliding contact plates 154 and 156. Therefore, the pedal arm 52 does not pivotally move relative to the support bracket 54.

When a force exerted along the axis 144 between frictionally engaged coil surfaces of the compression coil spring 150 exceeds the maximum static friction force therebetween, the coils of the compression coil spring 150 are displaced along the axis 144 relative to one another; thus, the compression coil spring 150 is elastically compressively deformed. Therefore, the pedal arm 52 pivotally moves about the axis 64 relative to the support bracket 54.

However, since the compression coil spring 152 is frictionally engaged with the sliding contact plates 154 and 156, the coils of the compression coil spring 152 are not displaced relative to the sliding contact plates 154 and 156. Accordingly, the compression coil spring 152 is compressively deformed while compressing the semicylindrical inner surface portions of the sliding contact plates 154 and 156. Thus, in this state, the spring forces which attempt to return the pedal arm 52 to the initial position are spring forces of the compression coil springs 150 and 152 and spring forces associated with the compressive deformations of the sliding contact plates 154 and 156.

When a force exerted relatively along the axis 144 between the sliding contact plates 154 and 156 and the compression coil spring 152 exceeds the maximum static friction force therebetween, the coils of the compression coil spring 152 are displaced relative to the sliding contact plates 154 and 156. Thus, in this state, since the compression coil spring 152 is compressively deformed substantially without causing elastic deformations of the sliding contact plates 154 and 156, the spring forces which attempt to return the pedal arm 52 to the initial position are the spring forces of the compression coil springs 150 and 152. Therefore, the spring constant of the entire spring for return-urging the pedal arm 52 drops.

Accordingly, also, in the thirteenth embodiment, the relation between the tread force F imposed on the pedal arm 52 by a driver in a process of increase in the tread force F from 0 and the stroke S of the center of the tread surface of the flat plate portion 52A is similar to that in the above-described first embodiment; i.e., the F-S characteristic is a two-bend characteristic as shown in FIG. 6. Also, in the thirteenth embodiment, as the stroke S of the pedal arm 52 increases, the compression coil spring 152 decreases in length and increases in diameter, whereas the sliding contact plates 154 and 156 restrain the compression coil spring 152 from increasing in diameter. Accordingly, the force with which the compression coil spring 152 presses the sliding contact plates 154 and 156 increases gradually. Thus, the F-S characteristic curve in a process of increase and decrease in the tread force imposed on the pedal arm 52 follows a hysteresis curve as shown in FIG. 17.

Thus, the thirteenth embodiment also operates in a manner similar to that of the above-described twelfth embodiment. Therefore, according to the thirteenth embodiment, even when a compression coil spring which serves as the first return-urging means is a volute spring having coils which are frictionally engaged with one another, actions and effects similar to those of the above-described sixth embodiment can be yielded.

Particularly, according to the thirteenth embodiment, similar to the above-described twelfth embodiment, when the stroke of the pedal arm 52 becomes a certain value, the projecting ends of the sliding contact plates 154 and 156 come into contact with the spring attachment plate 142 and the flat plate portion 52A of the pedal arm 52, respectively, thereby restraining further pivotal movement of the pedal arm 52. Therefore, the full open stopper can be eliminated or reduced in size.

According to the above-described sixth to thirteenth embodiments, the return-urging means has the first and second return-urging means, and the first and second resistance force generation means are in sliding contact with the first and second return-urging means, respectively. Thus, as compared with the first to fifth embodiments described previously and fourteenth and fifteenth embodiments to be described later in which only a single return-urging means is provided, there can be enhanced the degree of freedom in setting a characteristic of an operation force imposed on the pedal arm 52 versus a relative displacement of the pedal arm 52 relative to the support bracket 54.

According to the above-described sixth to thirteenth embodiments, there is no need to interpose an elastic member, such as a shim, in a region where the support bracket 54 pivotally supports the pedal arm 52. Thus, as compared with the above-described first to fifth embodiments, the support bracket 54 can pivotally support the pedal arm 52 in a good condition without involvement of play, and there can be mitigated fluctuations of F-S characteristic caused by a prying action of the pedal arm 52 on the support bracket 54.

Fourteenth Embodiment

Figure 48:
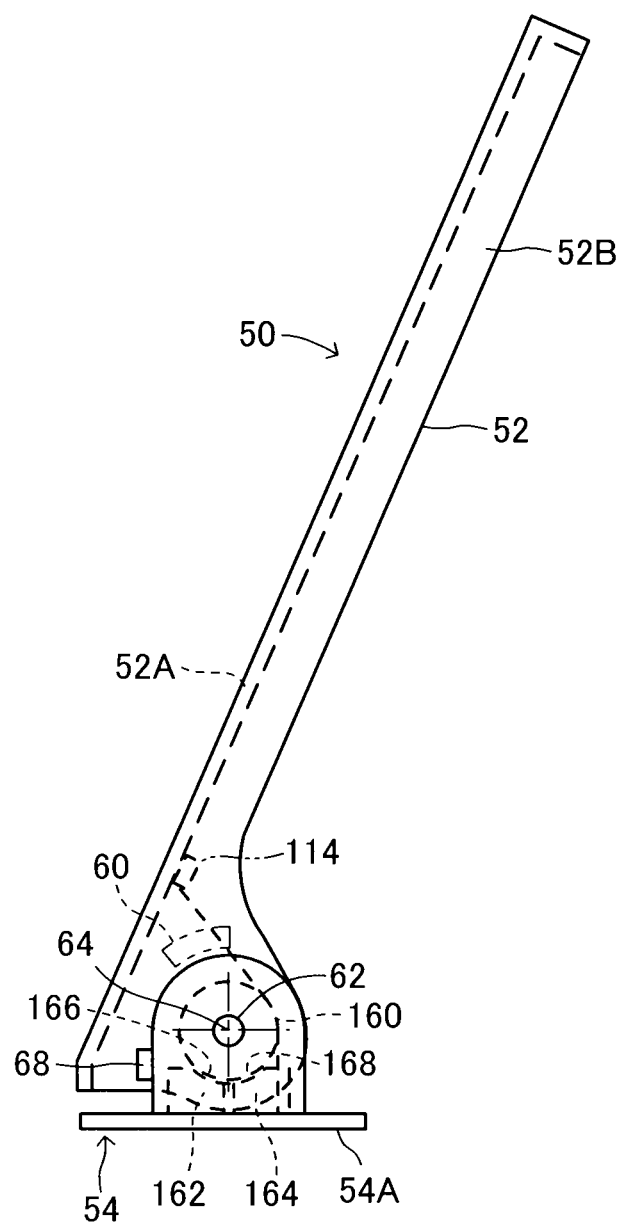
FIG. 48 is a side view showing a fourteenth embodiment of a pedal-operated operation device according to the present invention, the device being embodied as a drive-by-wire-type accelerator pedal device of an automobile.
Figure 49:
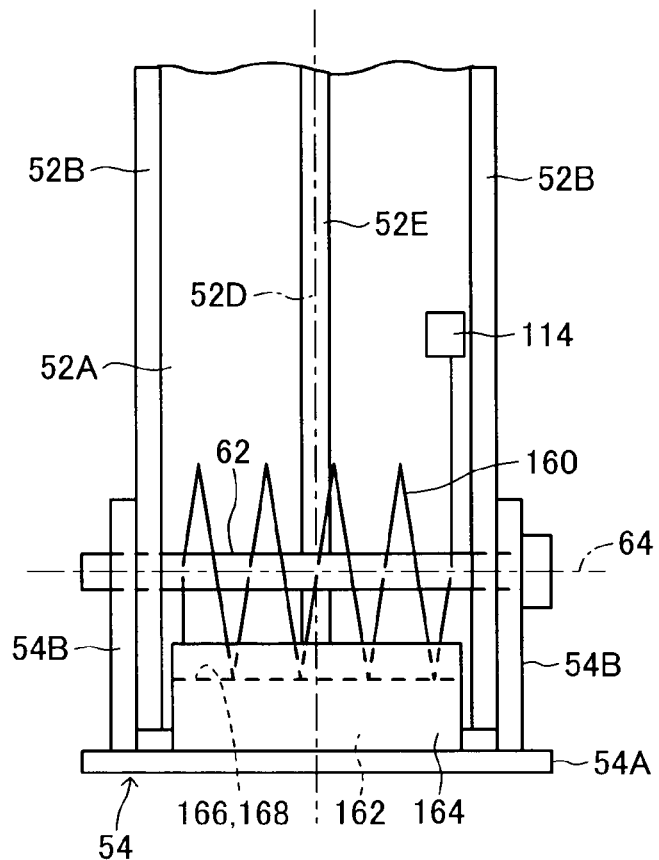
FIG. 49 is an enlarged partial rear view showing the fourteenth embodiment.

FIG. 48 is a side view showing a fourteenth embodiment of a pedal-operated operation device according to the present invention, the device being embodied as a drive-by-wire-type accelerator pedal device of an automobile. FIG. 49 is an enlarged partial rear view showing the fourteenth embodiment.

In the fourteenth embodiment, a single torsion coil spring 160, which serves as a return-urging means, is disposed on the back side of the flat plate portion 52A of the pedal arm 52. The coil spring 160 extends along the axis 64 in such a manner as to surround the shaft member 62. A first sliding contact member 162, which is formed of resin and functions as a first resistance force generation means, and a second sliding contact member 164, which is formed of resin and functions as a second resistance force generation means, are disposed under the coil spring 160. The sliding contact members 162 and 164 are fixed on the upper surface of the base portion 54A of the support bracket 54 in such a state as to extend along the axis 64 and to be spaced apart from each other in a direction perpendicular to the axis 64.

The sliding contact members 162 and 164 assume a form similar to that obtained by longitudinally halving the sliding contact member 110 of the above-described eighth embodiment and have a first sliding contact groove 166 and a second sliding contact groove 168, respectively, formed on their upper surfaces and each having a quadrant section. The coil spring 160 is in contact with the sliding contact grooves 166 and 168 of the sliding contact members 162 and 164 over their whole length and slightly presses the sliding contact grooves 166 and 168 radially outward.

In view of circumferential elastic deformations of the first and second sliding contact grooves 166 and 168, preferably, the elastic modulus K1 of a resin used to form the first sliding contact member 162 is relatively high, and the elastic modulus K2 of a resin used to form the second sliding contact member 164 is lower than the elastic modulus K1 of the resin used to form the first sliding contact member 162.

The coil spring 160 is disposed in such a manner that, as the angle of pivotal movement of the pedal arm 52 from the initial position increases, the coil spring 160 is elastically deformed in a coil-unwinding direction. Accordingly, as the angle of pivotal movement of the pedal arm 52 from the initial position increases, a force with which the coil spring 160 presses the sliding contact grooves 166 and 168 increases gradually, so that friction forces between the coil spring 160 and the sliding contact grooves 166 and 168 increase gradually.

The sliding contact grooves 166 and 168 are set low in the coefficient of friction through reception of surface treatment, such as Teflon (registered trademark) lining. Particularly, the coefficient of static friction of the first sliding contact groove 166 against the coil spring 160 (first coefficient of static friction μs1) is set lower than the coefficient of static friction of the second sliding contact groove 168 against the coil spring 160 (second coefficient of static friction μs2).

A pressing force with which the coil spring 160 presses the first sliding contact groove 166 and a pressing force with which the coil spring 160 presses the second sliding contact groove 168 are substantially equivalent to each other. Accordingly, the maximum static friction force between the coil spring 160 and the second sliding contact groove 168 is greater than the maximum static friction force between the coil spring 160 and the first sliding contact groove 166.

Thus, a surface of the coil spring 160 and a surface of the first sliding contact groove 166 which are frictionally engaged with each other define a first friction surface pair for generating a first resistance force by means of a friction force. A surface of the coil spring 160 and a surface of the second sliding contact groove 168 which are frictionally engaged with each other define a second friction surface pair for generating a second resistance force by means of a friction force. The second sliding contact groove 168 also functions as a displacement member which allows, through its elastic deformation, the second friction surface pair higher in the coefficient of static friction to move in association with the relative displacement of the pedal arm 12 relative to the support bracket 54.

Figure 52:
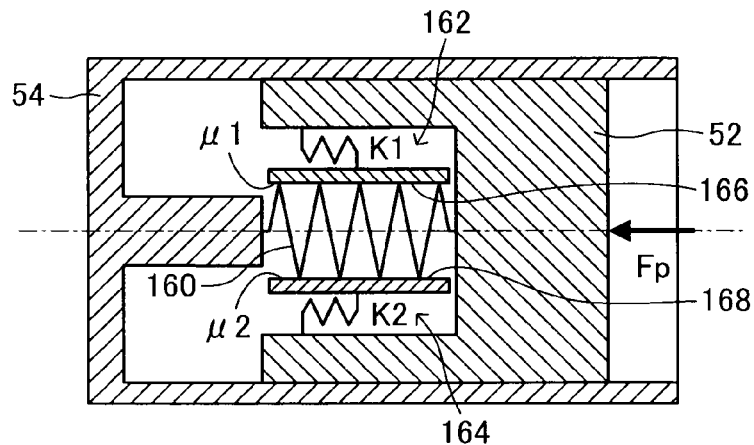
FIG. 52 is an explanatory view showing the accelerator pedal device of the fourteenth embodiment which is modeled as a device of rectilinear motion, showing a state in which the pedal arm is not displaced relative to the support housing.
Figure 53:
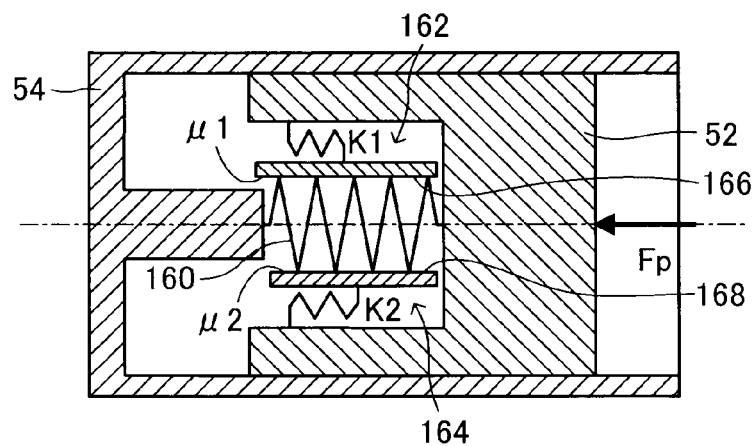
FIG. 53 is an explanatory view showing the accelerator pedal device of the fourteenth embodiment which is modeled as a device of rectilinear motion, showing a state in which the pedal arm is slightly displaced relative to the support housing.
Figure 54:
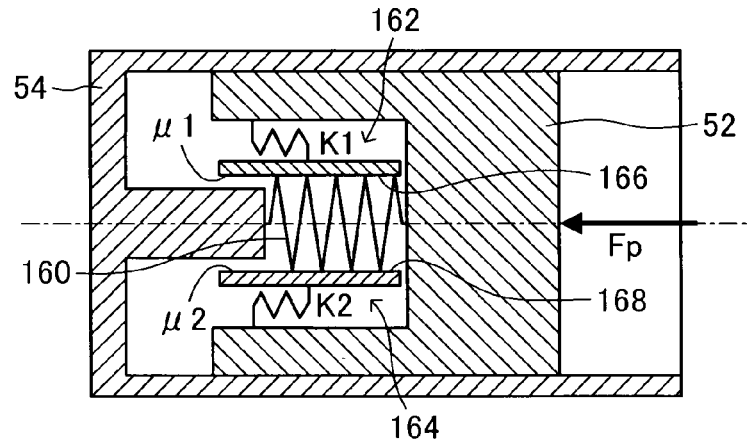
FIG. 54 is an explanatory view showing the accelerator pedal device of the fourteenth embodiment which is modeled as a device of rectilinear motion, showing a state in which the pedal arm is relatively greatly displaced relative to the support housing.

As will be understood from the above description, the accelerator pedal device 50 of the fourteenth embodiment can be modeled as a device of rectilinear motion as shown in FIGS. 52 to 54.

In the fourteenth embodiment, when a driver imposes a tread force Fp on the pedal arm 52, the pedal arm 52 attempts to pivotally move, from the initial position, clockwise about the axis 64 as viewed in FIG. 48, and attempts to move leftward relative to the support bracket 54 as viewed in FIG. 52. However, the coil spring 160 is frictionally engaged with the first and second sliding contact grooves 166 and 168. Accordingly, when a force exerted about the axis 64 on a coil portion of the coil spring 160 relative to the sliding contact grooves 166 and 168 is equal to or less than the maximum static friction force therebetween, the pedal arm 52 does substantially not pivotally move as viewed in FIG. 48 and, as shown in FIG. 52, does not move relative to the support bracket 54.

When a force exerted about the axis 64 on the coil portion of the coil spring 160 relative to the first sliding contact groove 166 exceeds the maximum static friction force therebetween, the coil portion of the coil spring 160 is displaced about the axis 64 relative to the first sliding contact groove 166. Accordingly, the pedal arm 52 pivotally moves about the axis 64 as viewed in FIG. 48 and, as shown in FIG. 53, moves leftward relative to the support bracket 54.

However, since the second sliding contact groove 168 is frictionally engaged with the coil spring 160, at this frictional engagement portion, the coil spring 160 causes a portion of the second sliding contact member 164 in the vicinity of the second sliding contact groove 168 to be elastically deformed about the axis 64. Thus, in this state, the spring forces which attempt to return the pedal arm 52 to the initial position are a spring force of the coil spring 160 and a spring force associated with the elastic deformation of the second sliding contact member 164.

When a force exerted about the axis 64 on the coil portion of the coil spring 160 relative to the second sliding contact groove 168 exceeds the maximum static friction force therebetween, as shown in FIG. 54, the coil portion of the coil spring 160 is displaced about the axis 64 relative to the second sliding contact groove 168. Accordingly, the pedal arm 52 pivotally moves about the axis 64 as viewed in FIG. 48 and, as shown in FIG. 54, moves leftward relative to the support bracket 54. Thus, in this state, since the coil spring 160 substantially fails to cause elastic deformation of the second sliding contact member 164, the spring force which attempts to return the pedal arm 52 to the initial position is a spring force of the coil spring 160. Therefore, the spring constant of the entire spring for return-urging the pedal arm 52 drops.

Accordingly, also, in the fourteenth embodiment, the relation between the tread force F imposed on the pedal arm 52 by a driver in a process of increase in the tread force F from 0 and the stroke S of the center of the tread surface of the flat plate portion 52A is similar to that in the above-described first embodiment; i.e., the F-S characteristic is a two-bend characteristic as shown in FIG. 6. Also, in the fourteenth embodiment, as the stroke S of the pedal arm 52 increases, the force with which the coil spring 160 presses the sliding contact grooves 166 and 168 of the sliding contact members 162 and 164, respectively, increases gradually, so that the friction forces between the coil spring 160 and the sliding contact grooves 166 and 168 increase gradually. Thus, the F-S characteristic curve in a process of increase and decrease in the tread force imposed on the pedal arm 52 follows a hysteresis curve as shown in FIG. 17.

Thus, the fourteenth embodiment operates in a manner similar to that of the above-described sixth embodiment, except that the sliding contact members 162 and 164 are in sliding contact with the compression coil spring 160 to thereby be elastically deformed in a circumferential direction by the compression coil spring 160. Therefore, the fourteenth embodiment can yield actions and effects similar to those of the above-described sixth embodiment through use of the compression coil spring as a single return-urging means as well as the two sliding contact members in sliding contact with the compression coil spring.

Figure 50:
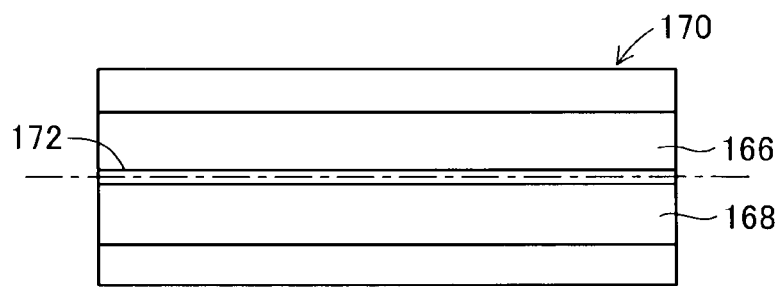
FIG. 50 is a plan view showing a modified sliding contact member.
Figure 51:
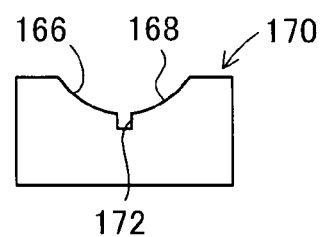
FIG. 51 is an end view showing the modified sliding contact member.

According to the above-described present embodiment, the first sliding contact member 162 and the second sliding contact member 164 are mutually isolated members formed of different materials. However, as shown in FIGS. 50 and 51, the first sliding contact member and the second sliding contact member may be formed as a single sliding contact member 170. The sliding contact member 170 assumes a form similar to that of the sliding contact member 110 of the above-described eighth embodiment; however, the sliding contact grooves 166 and 168 are spaced apart from each other by means of a central separation groove 172. Also, although unillustrated, the sliding contact groove 168 has irregularities formed thereon, such as slits extending in a circumferential direction. This configuration enables reduction in the number of components as compared with the case of the above-described fourteenth embodiment.

Fifteenth Embodiment

Figure 55:
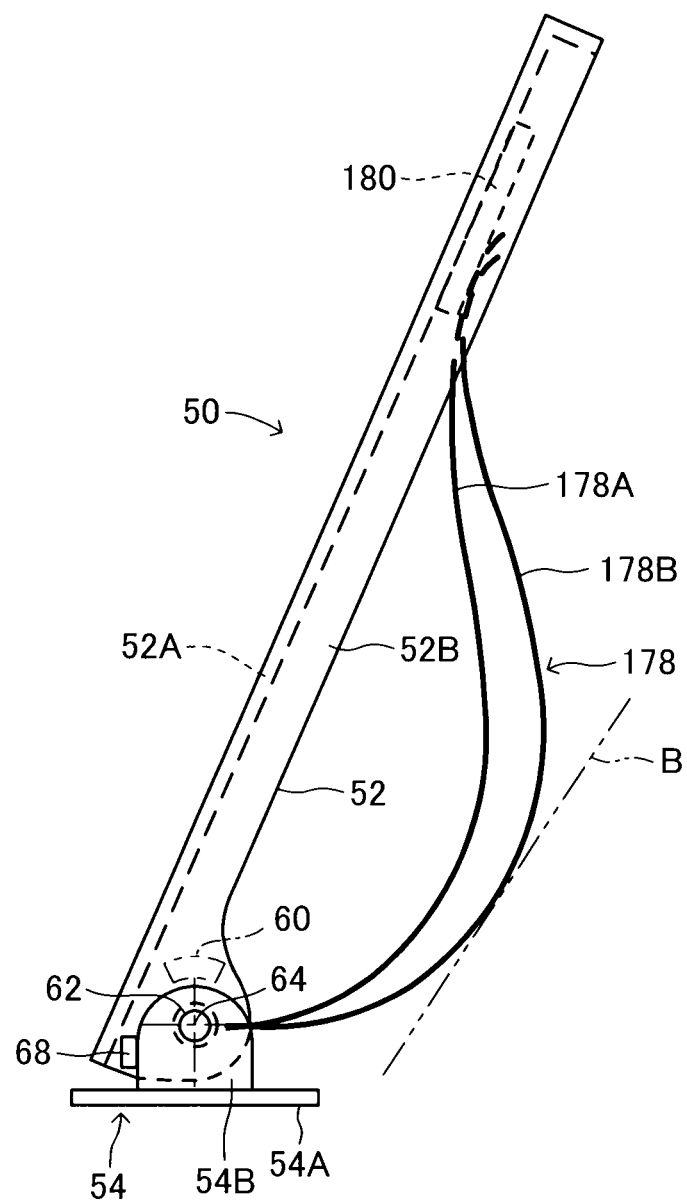
FIG. 55 is a side view showing a fifteenth embodiment of a pedal-operated operation device according to the present invention, the device being embodied as a drive-by-wire-type accelerator pedal device of an automobile.
Figure 56:
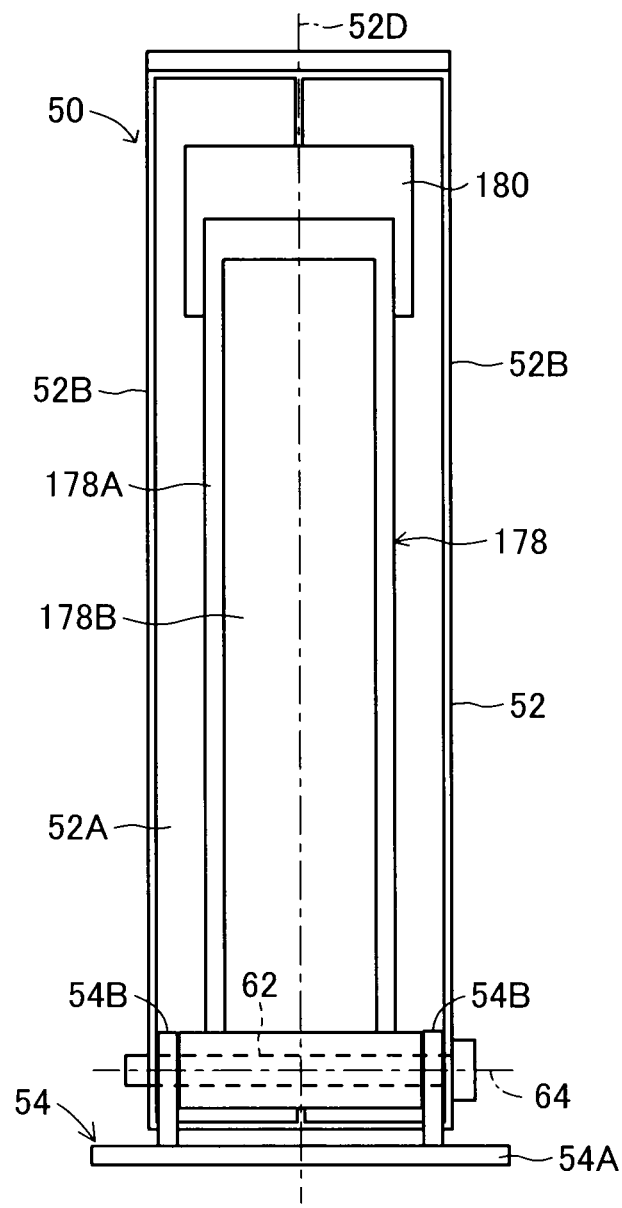
FIG. 56 is a rear view showing the fifteenth embodiment.

FIG. 55 is a side view showing an fifteenth embodiment of a pedal-operated operation device according to the present invention, the device being embodied as a drive-by-wire-type accelerator pedal device of an automobile. FIG. 56 is a rear view showing the fifteenth embodiment.

In the fifteenth embodiment, a plate spring 178, which serves as a return-urging means, is disposed on the back side of the flat plate portion 52A of the pedal arm 52. The plate spring 178 has a primary plate spring member 178A having a large degree of curvature and a secondary plate spring member 178B having a small degree of curvature. The primary plate spring member 178A is located on a side toward the flat plate portion 52A of the pedal arm 52 with respect to the secondary plate spring member 178B. The primary plate spring portion 178A and the secondary plate spring member 178B are connected together at their lower ends and are pivotally supported by the shaft member 62. The primary spring member 178A and the secondary plate spring member 178B are curved at their central portions in a direction away from the flat plate portion 52A, and the secondary plate spring member 178B is in contact with an inclined portion of a vehicle body B of a vehicle.

A sliding contact member 180, which is formed of resin and serves as a second resistance force generation means is fixed on the back surface of the flat plate portion 52A of the pedal arm 52. An upper end portion of the primary plate spring member 178A is frictionally engaged with the sliding contact member 180. An upper end portion of the secondary plate spring member 178b is frictionally engaged with an outer surface of the primary plate spring member 178A in the proximity of the upper end of the primary plate spring portion 178A. Accordingly, the secondary plate spring member 178B functions as a first resistance force generation means.

In view of elastic deformations of the secondary plate spring member 178B and the sliding contact member 180 along the longitudinal direction of the flat plate portion 52A of the pedal arm 52, the elastic modulus K1 of a material used to form the secondary plate spring member 178B is relatively high, and the elastic modulus K2 of a resin used to form the sliding contact member 180 is set lower than the elastic modulus K1 of a resin used to form the secondary plate spring member 178B.

The surface of the sliding contact member 180 which is frictionally engaged with the primary plate spring member 178A and the surfaces of upper end portions of the primary and secondary plate spring members 178A and 178B which are frictionally engaged with each other are set low in the coefficient of friction through reception of surface treatment, such as Teflon (registered trademark) lining. Particularly, the coefficient of static friction of the surface of the sliding contact member 180 against the primary plate spring member 178A (first coefficient of static friction μs1) is set lower than the coefficient of static friction of the surface of the secondary plate spring member 178B against the primary plate spring member 178A (second coefficient of static friction μs2).

A pressing force with which the secondary plate spring member 178B presses the primary plate spring member 178A and a pressing force with which the primary plate spring member 178A presses the sliding contact member 180 are substantially equivalent to each other. Accordingly, the maximum static friction force between the primary plate spring member 178A and the sliding contact member 180 is greater than the maximum static friction force between the secondary plate spring member 178B and the primary plate spring member 178A.

Thus, a surface of the secondary plate spring member 178B and a surface of the primary plate spring member 178A which are frictionally engaged with each other define a first friction surface pair for generating a first resistance force by means of a friction force. A surface of the primary plate spring member 178A and a surface of the sliding contact member 180 which are frictionally engaged with each other define a second friction surface pair for generating a second resistance force by means of a friction force. The sliding contact member 180 also functions as a displacement member which allows, through its elastic deformation, the second friction surface pair higher in the coefficient of static friction to move in association with the relative displacement of the pedal arm 12 relative to the support bracket 54.

As the angle of pivotal movement of the pedal arm 52 from the initial position increases as a result of the pedal arm 52 being treaded, the spring forces of the primary plate spring member 178A and the secondary plate spring member 178B increase gradually. Accordingly, as the angle of pivotal movement of the pedal arm 52 from the initial position increases, a force with which the primary plate spring member 178A presses the sliding contact member 180 and a force with which the secondary plate spring member 178B presses the primary plate spring member 178A increase gradually; thus, a friction force between the primary plate spring member 178A and the sliding contact member 180 and a friction force between the secondary plate spring member 178B and the primary plate spring member 178A increase gradually.

Thus, the fifteenth embodiment operates in a manner similar to that of the above-described fourteenth embodiment, except that the spring force of the plate spring 178 is exerted directly on the sliding contact member 180 and that the distal end portion of the primary plate spring member 178A causes the shear deformation of the sliding contact member 180. Therefore, the fifteenth embodiment can yield actions and effects similar to those of the above-described fourteenth embodiment through use of the plate spring as the return-urging means.

Particularly, according to the fifteenth embodiment, the rate of increase in the force with which the secondary plate spring member 178B presses the primary plate spring member 178A and in the force with which the primary plate spring member 178A presses the sliding contact member 180, in association with increase in the angle of pivotal movement of the pedal arm 52 from the initial position, is higher than that in the above-described fourteenth embodiment. Therefore, the F-S characteristic curve of the fifteenth embodiment follows a hysteresis curve as shown in FIG. 35.

According to the fourteenth and fifteenth embodiments, a single return-urging means suffices. Thus, as compared with the configurations of the above-described first to thirteenth embodiments, the number of required components can be reduced, so that the structure of the pedal-operated operation device can be simplified.

According to the fourteenth and fifteenth embodiment, similar to the above-described sixth to thirteenth embodiments, there is no need to interpose an elastic member, such as a shim, in a region where the support bracket 54 pivotally supports the pedal arm 52. Thus, as compared with the above-described first to fifth embodiments, the support bracket 54 can pivotally support the pedal arm 52 in a good condition without involvement of play, and there can be mitigated fluctuations of F-S characteristic caused by a prying action of the pedal arm 52 on the support bracket 54.

While the present invention has been described in detail with reference to the above particular embodiment, it will be apparent to those skilled in the art that the present invention is not limited thereto, but may be embodied in various other forms without departing from the scope of the invention.

For example, in the above-described sixth to thirteenth embodiments, the return-urging means has the first and second return-urging means, and the first and second resistance force generation means are in sliding contact with the first and second return-urging means, respectively. However, in addition to the first and second return-urging means, an auxiliary return-urging means which is not in sliding contact with the first and second return-urging means may be provided. Similarly, in the above-described fourteenth and fifteenth embodiments, an auxiliary return-urging means may be provided in addition to the return-urging means in sliding contact with the first and second resistance force generation means.

In the above-described first to fifteenth embodiments, as an operation force imposed on the pedal arm 12 or 50 increases, a pressing force between the members in frictional sliding contact with each other of the first and second slide friction portions increases. However, as an operation force imposed on the pedal arm 12 or 50 increases, only a pressing force between the members in frictional sliding contact with each other of the second slide friction portion may increase.

In the above-described sixth to fifteenth embodiments, by means of the coefficient of static friction of the first resistance force generation means against the return-urging means (first coefficient of static friction $\mu s1$) being set lower than the coefficient of static friction of the second resistance force generation means against the return-urging means (second coefficient of static friction $\mu s2$), the maximum static friction force between the return-urging means and the first resistance force generation means is rendered lower than the maximum static friction force between the return-urging means and the coefficient static friction of the second resistance force generation means. However, any means may be employed so long as the maximum static friction force between the return-urging means and the first resistance force generation means is lower than the maximum static friction force between the return-urging means and the coefficient static friction of the second resistance force generation means. Therefore, for example, the first coefficient of static friction $\mu s1$ may be set equal to or higher than the second coefficient of static friction $\mu s2$, whereby a pressing force between the return-urging means and the first resistance force generation means is rendered lower than a pressing force between the return-urging means and the coefficient of static friction of the second resistance force generation means.

Figure 57:
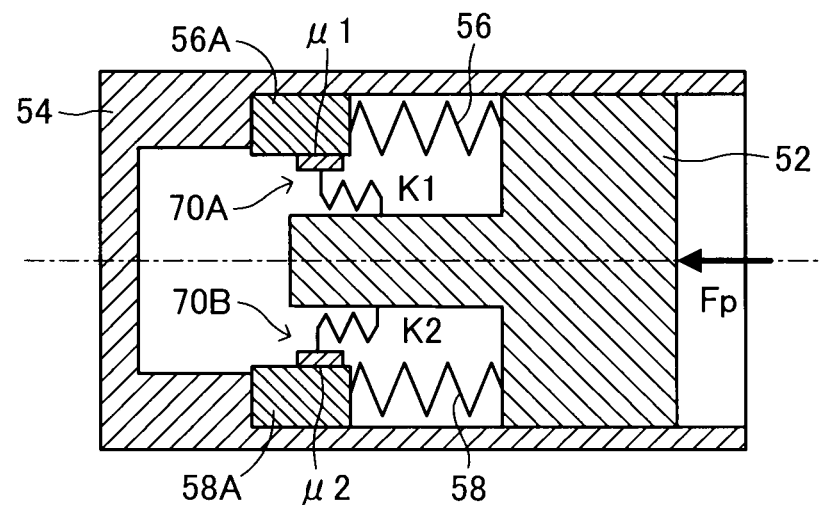
FIG. 57 is a view showing a model of a modified embodiment of the sixth to thirteenth embodiments.

In the above-described sixth to fifteenth embodiments, the first and second resistance force generation means are in sliding contact with the first and second return-urging means, respectively. However, these embodiments may be modified as shown in FIG. 57 which shows a modification example of the model shown in FIGS. 21 to 23. Specifically, these embodiments may be modified as follows: the first return-urging means 56 and the second return-urging means 58 are provided with less easy elastic deformation portions 56A and 58A, respectively, which are substantially not elastically deformed in a return-urging direction, and the first resistance force generation means 70A and the second resistance force generation means 70B are in sliding contact with the less easy elastic deformation portions 56A and 58A, respectively, without being in sliding contact with respective easy elastic deformation portions.

Figure 58:
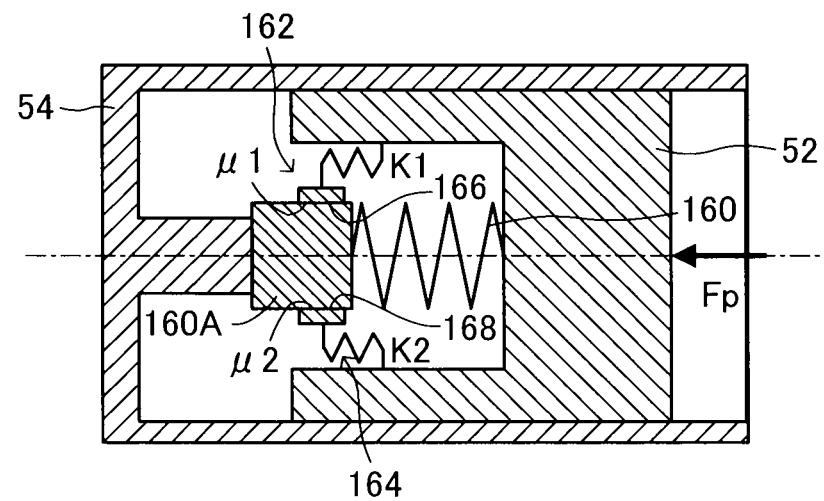
FIG. 58 is a view showing a model of a modified embodiment of the fourteenth and fifteenth embodiments.

Similarly, in the above-described fourteenth and fifteenth embodiments, the first and second resistance force generation means are in sliding contact with a single return-urging means. However, these embodiments may be modified as shown in FIG. 58 which shows a modification example of the model shown in FIGS. 52 to 54. Specifically, these embodiments may be modified as follows: the return-urging means 160 is provided with a less easy elastic deformation portion 160A, which is substantially not elastically deformed in a return-urging direction, and the first resistance force generation means 70A and the second resistance force generation means 70B are in sliding contact with respective different regions of the less easy elastic deformation portion 160A without being in sliding contact with respective easy elastic deformation portions.

In the above-described embodiments, excluding the thirteenth and fifteenth embodiments, the first and second resistance force generation means have similar sliding contact structures. However, since the first and second resistance force generation means may have different sliding contact structures, the first resistance force generation means of a certain embodiment and the second resistance force generation means of another embodiment may be combined.

In the pedal-operated operation devices of the above-described embodiments, a characteristic of an operation input to the operating element versus a relative displacement of the operating element is a two-bend characteristic. However, the operation device of the present invention may have a three-or-more-bend characteristic having three or more bend points.

In the above-described embodiments, a two-bend characteristic in a process of increase in the relative displacement of the pedal arm 12 and a two-bend characteristic in a process of decrease in the relative displacement of the pedal arm 12 are the same except that the inclination of the relation between the operation input and the relative displacement of the operating element in the process of increase and that in the process of decrease are reverse to each other. However, for example, a characteristic in a process of increase in the relative displacement and a characteristic in a process of decrease in the relative displacement may be set different from each other by means of impartment of anisotropy to surface treatment of friction surfaces or use of different friction surfaces between a process of increase in the relative displacement and a process of decrease in the relative displacement.

In the above-described embodiments, the relative displacement of the operating element is in the form of pivotal movement or rectilinear motion, but may be in the form of rotation. A stopper may be provided for preventing further relative displacement of the operating element when an operation input to the operating element becomes a reference value or higher.

In the above-described embodiments, the coefficient of friction between two friction surfaces is rendered different between the friction surface pairs through employment of different surface treatments of shims or the like. However, the coefficient of friction between two friction surfaces may be rendered different between the friction surface pairs through employment of different fillers for materials used to form friction surfaces or through employment of different contact areas in the case where friction materials receive the same surface treatment.

The above-described embodiments achieve the above-mentioned two-bend characteristic by means of the first and second friction surface pairs as well as the displacement member which allows, through its elastic deformation, the second friction surface pair to move in association with the relative displacement of the pedal arm 12 relative to the support housing 14. However, the operation device of the present invention may achieve the above-mentioned two-bend characteristic through use of a controllable force.

For example, a pressing force with which a friction member of a friction surface pair presses the other friction member may be controlled through use of an electromagnetic force, and a resistance force against the relative displacement of the operating element may be generated through use of an electromagnetic force without use of friction surface pairs. Also, at least one of the first and second friction surface pairs may be replaced with a resistance force generation device which employs a piezoelectric element. These modification examples may be configured as follows: the relative displacement of the operating element is detected, and, on the basis of the detected relative displacement, the pressing force is controlled so as to attain the above-mentioned multi-bend characteristic.

In the above-described embodiments, a friction member which forms one friction surface of the second friction surface pair is integral with a displacement member which allows, through its elastic deformation, the second friction surface pair to move in association with the relative displacement of the pedal arm 12 relative to the support housing 14; i.e., the friction member and the displacement member are provided as a single member, such as the second shim 32B. However, the friction member which forms one friction surface of the second friction surface pair, and the displacement member may be formed as separate members. In the above-described embodiment, the return-urging means exerts a return-urging force to the pedal arm 12 by means of a spring force. However, the return-urging force may be exerted to the operating element by means of a magnetic force of a permanent magnet or an electromagnetic force.

In the above-described embodiments, the pedal-operated operation device is a drive-by-wire-type accelerator pedal device. However, the operation device of the present invention may be configured as other pedal-operated operation devices of a vehicle, such as an automobile; for example, a brake-by-wire-type brake pedal device, a wire-type accelerator pedal device, and a master-cylinder-connected brake pedal device. In this case, the detection means for detecting the magnitude of the driver's operation of the operating element may be eliminated. A configuration similar to that of the pedal-operated operation device of each of the above-described embodiments may be applied to a manually operated operation device in a vehicle, such as an automobile. Particularly, in the case where the operation device of the present invention is applied to a brake pedal device, while a feeling of treading at the initial stage of treading is ensured, a braking force can be restrained from being unnecessarily generated, thereby facilitating control of a braking force at the time when the braking force begins to become effective. Also, a braking force at the time when the brake pedal is gently treaded can be stabilized. In a situation requiring a strong braking force, a required braking force can be ensured by means of strong treading on a brake pedal.

The invention claimed is:

1. A pedal-operated operation device comprising:
an operating element to be foot-operated to provide an operating force on the operating element;
support means for supporting the operating element such that the operating element can undergo relative displacement relative to the support means; and
a first friction surface pair and a second friction surface pair, each of which includes paired friction surfaces for generating a resistance force against the relative displacement of the operating element by a friction force generated between the paired friction surfaces and which differ from each other in coefficient of static friction,
wherein
the first or second friction surface pair higher in coefficient of static friction includes a displacement member which allows the first or second friction surface pair higher in coefficient of static friction to move together with the operating element in association with the relative displacement thereof in response to the operating force being greater than a maximum static friction force of the first or second friction surface pair lower in coefficient of static friction and being equal to or less than a maximum static friction force of the first or second friction surface pair higher in coefficient of static friction.

2. A pedal-operated operation device according to claim 1, wherein the maximum static friction force of the first or second friction surface pair higher in coefficient of static friction is greater than the maximum static friction force of the other of the first or second friction surface pair.

3. A pedal-operated operation device comprising:
an operating element to be foot-operated to provide an operating force on the operating element;
support means for supporting the operating element such that the operating element can undergo relative displacement relative to the support means; and
a first friction surface pair and a second friction surface pair, each of which includes paired friction surfaces for generating a resistance force against the relative displacement of the operating element by a friction force generated between the paired friction surfaces and which differ from each other in coefficient of static friction,
wherein
the first or second friction surface pair higher in coefficient of static friction includes an elastic body which allows the first or second friction surface pair higher in coefficient of static friction to move together with the operating element in association with the relative displacement thereof in response to the operating force being greater than a maximum static friction force of the first or second friction surface pair lower in coefficient of static friction and being equal to or less than a maximum static friction force of the first or second friction surface pair higher in coefficient of static friction.

4. A pedal-operated operation device according to claim 3, wherein the elastic body defines one of the friction surfaces of the first or second friction surface pair higher in coefficient of static friction.

5. A vehicular operation device comprising:
an operating element to be foot-operated to provide an operating force on the operating element;
support means for supporting the operating element such that the operating element can undergo relative displacement relative to the support means; and
a first friction surface pair and a second friction surface pair, each of which includes paired friction surfaces for generating a resistance force against the relative displacement of the operating element by a friction force generated between the paired friction surfaces and which differ from each other in coefficient of static friction,
wherein
the first or second friction surface pair higher in coefficient of static friction includes a displacement member which allows the first or second friction surface pair higher in coefficient of static friction to move together with the operating element in association with the relative displacement thereof in response to the operating force being greater than a maximum static friction force of the first or second friction surface pair lower in coefficient of static friction and being equal to or less than a maximum static friction force of the first or second friction surface pair higher in coefficient of static friction,
a ratio of relative displacement of the operating element to the operating force to the operating element varies to at least three values, and,
in a process of increase in the operating force subsequent to start of increasing, the ratio is set to a high value at a time when the operating force is of large magnitude as compared with a time when the operating force is of small magnitude.

6. A vehicular operation device comprising:
an operating element to be foot-operated to provide an operating force on the operating element;
support means for supporting the operating element such that the operating element can undergo relative displacement relative to the support means; and
a first friction surface pair and a second friction surface pair, each of which includes paired friction surfaces for generating a resistance force against the relative displacement of the operating element by a friction force generated between the paired friction surfaces and which differ from each other in coefficient of static friction,
wherein
the first or second friction surface pair higher in coefficient of static friction includes a displacement member which allows the first or second friction surface pair higher in coefficient of static friction to move together with the operating element in association with the relative displacement thereof in response to the operating force being greater than a maximum static friction force of the first or second friction surface pair lower in coefficient of static friction and being equal to or less than a maximum static friction force of the first or second friction surface pair higher in coefficient of static friction,
a ratio of relative displacement of the operating element to the operating force to the operating element varies to at least three values, and,
in a process of decrease in the operating force subsequent to start of decreasing, the ratio is set to a low value at a time when the operating force is of large magnitude as compared with a time when the operating force is of small magnitude.

* * * * *